US011379899B2

(12) United States Patent
Toya

(10) Patent No.: US 11,379,899 B2
(45) Date of Patent: Jul. 5, 2022

(54) CONTROL METHOD OF INFORMATION TERMINAL

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 775 days.

(21) Appl. No.: 15/063,439

(22) Filed: Mar. 7, 2016

(65) Prior Publication Data

US 2016/0283999 A1 Sep. 29, 2016

(30) Foreign Application Priority Data

Mar. 27, 2015 (JP) .............................. JP2015-066329

(51) Int. Cl.
G06Q 30/06 (2012.01)
G01C 21/36 (2006.01)

(52) U.S. Cl.
CPC ..... *G06Q 30/0625* (2013.01); *G01C 21/3679* (2013.01); *G06Q 30/0639* (2013.01); *G06Q 30/0643* (2013.01); *G06Q 30/0645* (2013.01)

(58) Field of Classification Search
CPC ........... G06Q 30/0625; G06Q 30/0639; G06Q 30/0643; G06Q 30/0645; G01C 21/3679
USPC ....................................................... 705/307
See application file for complete search history.

(56) References Cited

U.S. PATENT DOCUMENTS

| 2005/0128074 | A1* | 6/2005 | Culpepper | ......... G08B 21/0269 340/539.1 |
| 2010/0201323 | A1* | 8/2010 | Okamura | .............. H02J 7/0031 320/134 |
| 2012/0007556 | A1* | 1/2012 | Matsui | .................. B60L 3/0046 320/112 |
| 2013/0238167 | A1* | 9/2013 | Stanfield | .................. G08G 1/20 701/2 |
| 2013/0325521 | A1* | 12/2013 | Jameel | ................... G06Q 10/02 705/5 |
| 2014/0368156 | A1* | 12/2014 | Aloe | ..................... H02J 7/0045 320/106 |

FOREIGN PATENT DOCUMENTS

| JP | H0341594 A | * | 2/1991 |
| JP | 5-137202 A | | 6/1993 |
| JP | 2004-215468 A | | 7/2004 |
| JP | 2007-148590 A | | 6/2007 |
| JP | 2012-017983 A | | 1/2012 |

(Continued)

OTHER PUBLICATIONS

MacCarley, A Review of Battery Exchange Technology for Refueling of Electric Vehicles, Proceedings of SAE Future Car Conference 2000: Washington, D.C., Jan. 1, 2000 (Year: 2000).*

*Primary Examiner* — Michael Young
(74) *Attorney, Agent, or Firm* — Greenblum & Bernstein, P.L.C.

(57) ABSTRACT

A control method of an information terminal includes acquiring, by a server device via a network, information relating to a device which leases battery packs and exists in an area set by a user, and displaying the acquired information relating to the device on a display screen provided with the information terminal.

23 Claims, 34 Drawing Sheets

(56) References Cited

FOREIGN PATENT DOCUMENTS

| | | |
|---|---|---|
| JP | 2013-024580 A | 2/2013 |
| JP | 2013-084198 A | 5/2013 |
| JP | 2015-015827 | 1/2015 |
| WO | 2015/001930 | 1/2015 |

* cited by examiner

FIG. 5

| CLASS (DETERIORATION LEVEL) | CONDITIONS |
|---|---|
| A | LESS THAN ONE YEAR FROM MANUFACTURE, OR LEARNING CAPACITY 90% OR MORE, OR NUMBER OF FULL CHARGES 500 TIMES OR LESS |
| B | MORE THAN ONE YEAR BUT LESS THAN TWO YEARS FROM MANUFACTURE, OR LEARNING CAPACITY 80% OR MORE BUT LESS THAN 90%, OR NUMBER OF FULL CHARGES 501 TIMES OR MORE BUT 1000 TIMES OR LESS |
| C | MORE THAN TWO YEARS BUT LESS THAN FIVE YEARS FROM MANUFACTURE, OR LEARNING CAPACITY 70% OR MORE BUT LESS THAN 80%, OR NUMBER OF FULL CHARGES 1001 TIMES OR MORE BUT 2000 TIMES OR LESS |
| D | MORE THAN FIVE YEARS BUT LESS THAN TEN YEARS FROM MANUFACTURE, OR LEARNING CAPACITY 60% OR MORE BUT LESS THAN 70%, OR NUMBER OF FULL CHARGES 2001 TIMES OR MORE |
| E | TEN YEARS OR MORE FROM MANUFACTURE, OR LEARNING CAPACITY LESS THAN 60% |

| NO. | CENTER ID | MEMBER NO. | DATE | LATE RETURNS | DROP-OFF BATTERY ID | DROP-OFF BATTERY INFORMATION | LEASE BATTERY ID | LEASE BATTERY INFORMATION | RENTAL PERIOD |
|---|---|---|---|---|---|---|---|---|---|
| 001 | S00001 | 001001 | FEB 27, 2015 | NONE | B01001 | 30% CLASS A | B01011 | 100% CLASS A | FIVE MONTHS |
| 002 | S00002 | 001002 | FEB 27, 2015 | NONE | B01002 | 20% CLASS B | B01012 | 100% CLASS B | THREE MONTHS |
| ... | ... | ... | ... | ... | ... | ... | ... | ... | ... |

| BATTERY ID | DATE OF MANUFACTURE | STORING SERVICE CENTER | REMAINING CHARGE | LEARNING CAPACITY | CLASS (DETERIORATION LEVEL) | DATES CHARGED |
|---|---|---|---|---|---|---|
| B00001 | FEB 27, 2005 | S00001 | 100% | 80% | B | FEB 27, 2005<br>MAY 1, 2005<br>JUNE 15, 2005<br>... |
| B00002 | FEB 27, 2005 | CURRENTLY LEASED | — | 80% | B | FEB 27, 2005<br>APRIL 30, 2005<br>JULY 1, 2005<br>... |
| ... | ... | ... | ... | ... | ... | ... |

114

CONTROL METHOD OF INFORMATION TERMINAL

BACKGROUND

1. Technical Field

The present disclosure relates to technology for displaying battery pack lease candidates on an information terminal.

2. Description of the Related Art

One example of equipment in which is installed a replaceable battery pack is an electric vehicle. When there is little remaining charge in the battery pack, the user of the electric vehicle will stop by a nearby battery station, and replace the battery pack mounted in the vehicle with a battery pack that has been charged at the battery station. Japanese Patent No. 5362930 describes conventional technology in which battery stations which the electric vehicle can reach with the remaining charge in the battery pack are selected as candidate battery stations, based on the remaining charge in the battery pack and the location of the electric vehicle, and so forth, as a way to convenience the user of the electric vehicle when replacing battery packs. However, the method of selecting candidate stations in the conventional technology may not be consistent with what users desire.

SUMMARY

One non-limiting and exemplary embodiment provides a control program and a control method of an information terminal to display, on the information terminal, information relating to devices that leases battery packs, in an area that the user desires.

In one general aspect, the techniques disclosed here feature a control method of an information terminal, the method including: (a) acquiring, from a server device via a network, information relating to a device which leases battery packs and exists in an area set by a user; and (b) displaying the acquired information relating to the device on a display screen provided with the information terminal.

The above-described control method of an information terminal enables displaying, on an information terminal, information relating to devices that lease battery packs, in an area that the user desires.

It should be noted that general or specific embodiments may be implemented using a system and a method, and any combination of systems and methods.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a class conditions database in FIG. 3;

FIG. 6 is a diagram illustrating an example of a rental management database in FIG. 3;

FIG. 7 is a diagram illustrating an example of a battery management database in FIG. 3;

DETAILED DESCRIPTION

Japanese Patent No. 5362930 was found to have room for improvement regarding the following points. For example, the user is capable of taking a battery pack and going to a battery station using a mode of transportation other than the electric vehicle (e.g., on foot or by bicycle). In a case where the electric vehicle is a pedelec, the user is capable of pedaling the pedelec to a battery station even if the remaining charge in the battery pack reaches zero. Further, the equipment in which replacement battery packs are mounted is not restricted to a mode of transportation like an electric vehicle.

In other words, the conventional technology may not be consistent with what users desire. Upon diligent study, the present Inventors arrived at the following. That is to say, according to one embodiment of the present disclosure, a control method of an information terminal includes: (a) acquiring, from a server device via a network, information relating to a device which leases battery packs and exists in an area set by a user; and (b) displaying the acquired information relating to the device on a display screen provided with the information terminal.

The control program and control method of the information terminal according to an embodiment of the present disclosure will be described below with reference to the drawings. It should be noted, however, that the control program and control method of the information terminal are for a corporation that runs a battery pack rental service (hereinafter referred to as a "rental service corporation") to provide users with a battery pack rental reservation system that the rental service corporation operates.

Note that the embodiments described below are all specific examples of the present disclosure. Values, shapes, materials, components, layout and connection forms of components, steps, orders of steps, and so forth in the following embodiments are only exemplary, and are not intended to restrict the present disclosure. Components in the following embodiments which are not included in an independent Claim indicating the highest concept are described as being optional components.

Overview of Battery Pack Rental Reservation System

Figure 1:
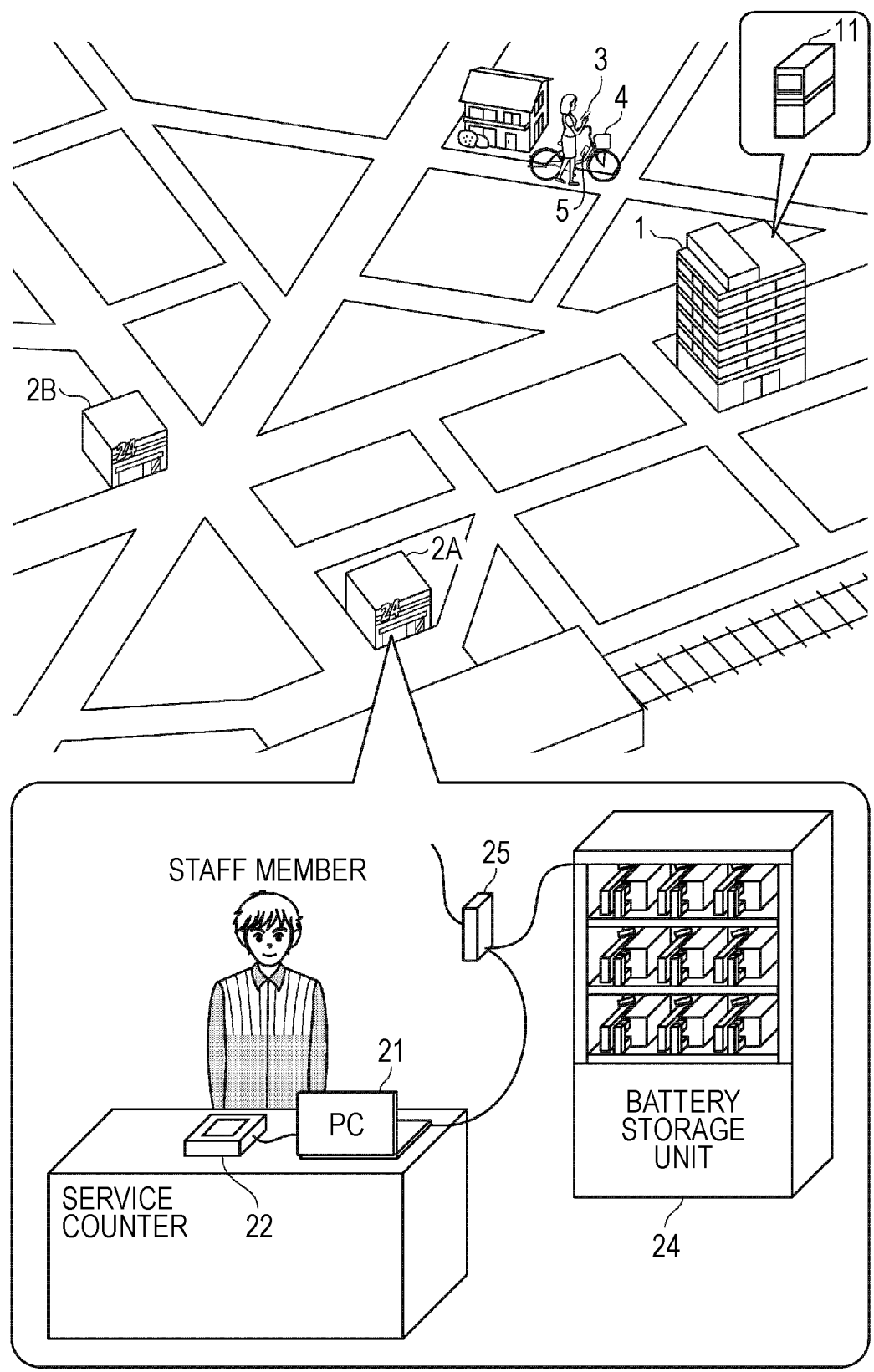
FIG. 1 is a diagram illustrating an overview of a battery pack rental reservation system according to an embodiment.
Figure 2:
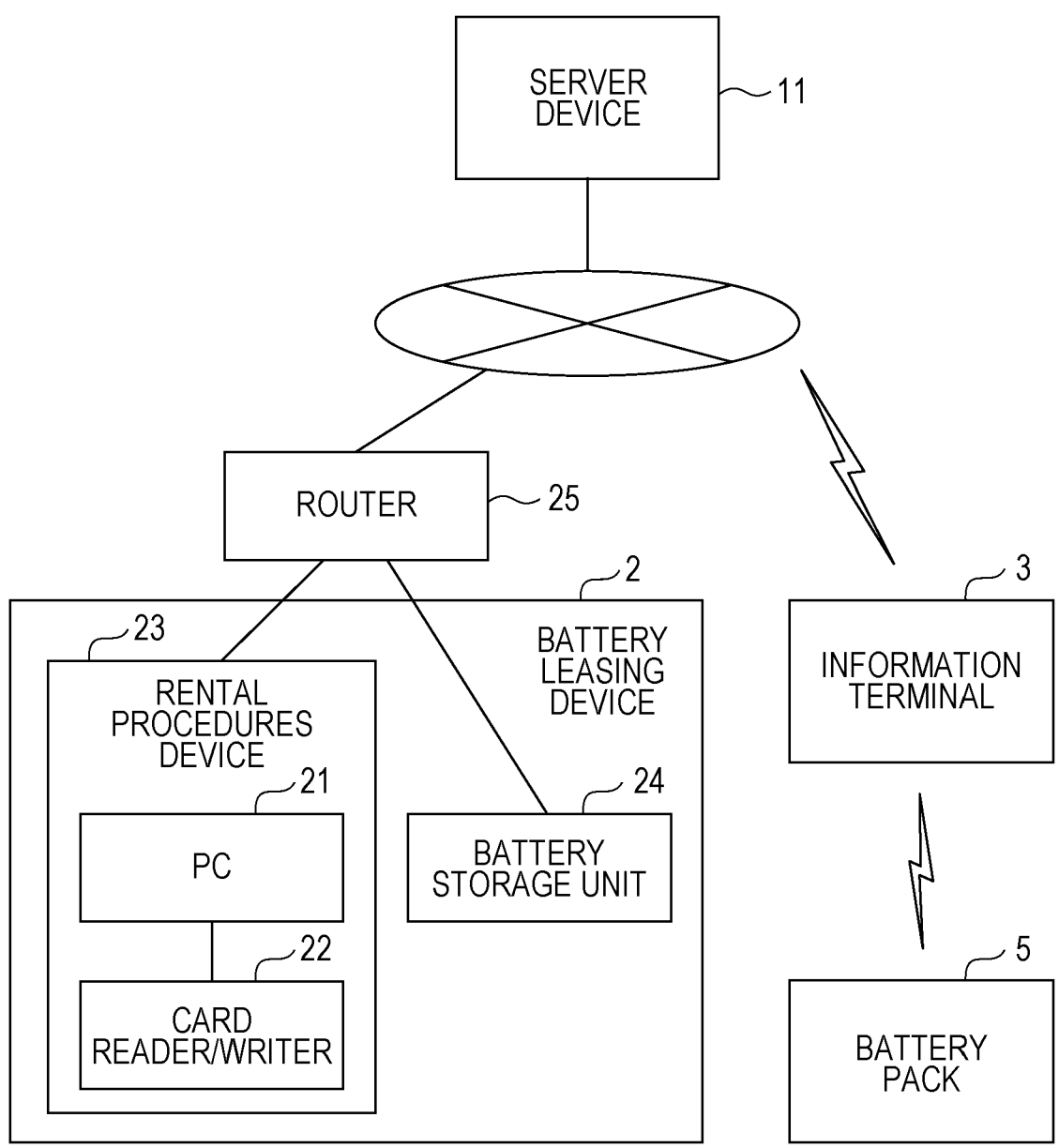
FIG. 2 is a system configuration diagram of a battery pack rental reservation system according to an embodiment.

FIG. 1 is a diagram illustrating an overview of a battery pack rental reservation system according to an embodiment, and FIG. 2 is a system configuration diagram of the battery pack rental reservation system in FIG. 1. A rental service corporation 1 that runs a battery pack rental reservation system operates multiple service centers, and has a server device 11 for managing the entire battery pack rental reservation system. The rental service corporation 1 issues membership cards at the service centers 2A, 2B, and so on, and accepts user requests for battery pack replacement (drop-off and lease) at the service centers 2A, 2B, and so on. Management of the replacement state of battery packs relating to members at the service centers 2A, 2B, and so on, is performed by the server device 11.

Each of the service centers 2A, 2B, and so on, has a rental procedures device 23, configured including a personal computer (hereinafter abbreviated to "PC") 21, a card reader/writer 22, and so forth, connected thereto. The service centers 2A, 2B, and so on, also have a battery storage unit 24 that has functions to charge battery packs, and stores multiple battery packs.

Note that the PC 21 and the battery storage unit 24 of the rental procedures device 23 are each connected to a router 25, and can exchange information with the server device 11 via a network. In order to use the battery pack rental service that the rental service corporation 1 provides, the user fills in required information, such as name, address, phone number, etc., for example, and is issued a membership card at a service center or the like. The user also downloads an application program for using the battery pack rental reservation system from the server device 11 for example, to an information terminal 3, and installs the application program in the information terminal 3.

The user can set an area in which to search for a service center, for example, using this application. The user receives a display of service centers situated within the searched area on the display unit of the information terminal 3 by the server device 11, and can select one of the service centers for reservation to replace a battery pack. This will be described in detail later.

The user first makes a reservation for battery pack replacement at the service center, and then goes to the service center. The user returns a battery pack removed from a pedelec 4 and rents a separate battery pack, that has been fully charged, and attachés it to the pedelec 4. The server device 11 and the information terminal 3 are capable of exchanging information with each other via a network. The information terminal 3 and the battery pack, such as a battery pack 5, are capable of exchanging information with each other by near-field communication, for example.

Note that the service centers 2A, 2B, and so on, may be a shop directly run by the rental service corporation 1, or may be a certain space rented by contract within a convenience store, a consumer electronics shop, a home improvement center, or the like. The rental procedures device 23 and battery storage unit 24 combined make up an example of a battery leasing device 2 that leases the battery packs. The battery leasing device 2 may be installed within the shop building, or all or part thereof may be installed outside the building. The rental procedures device 23 and battery storage unit 24 of the battery leasing device 2 may be configured separately, or integrally. The battery leasing device 2 may be arranged so that a staff member goes between the customer and the battery leasing device 2 when replacing a battery pack, or may be arranged like a vending machine, where no staff member is involved.

Note that in the following description, information relating to the battery leasing device according to the present disclosure is the location of a service center having the battery leasing device, and the name of the service center, but this is not restrictive.

Configuration of Server Device

Figure 3:
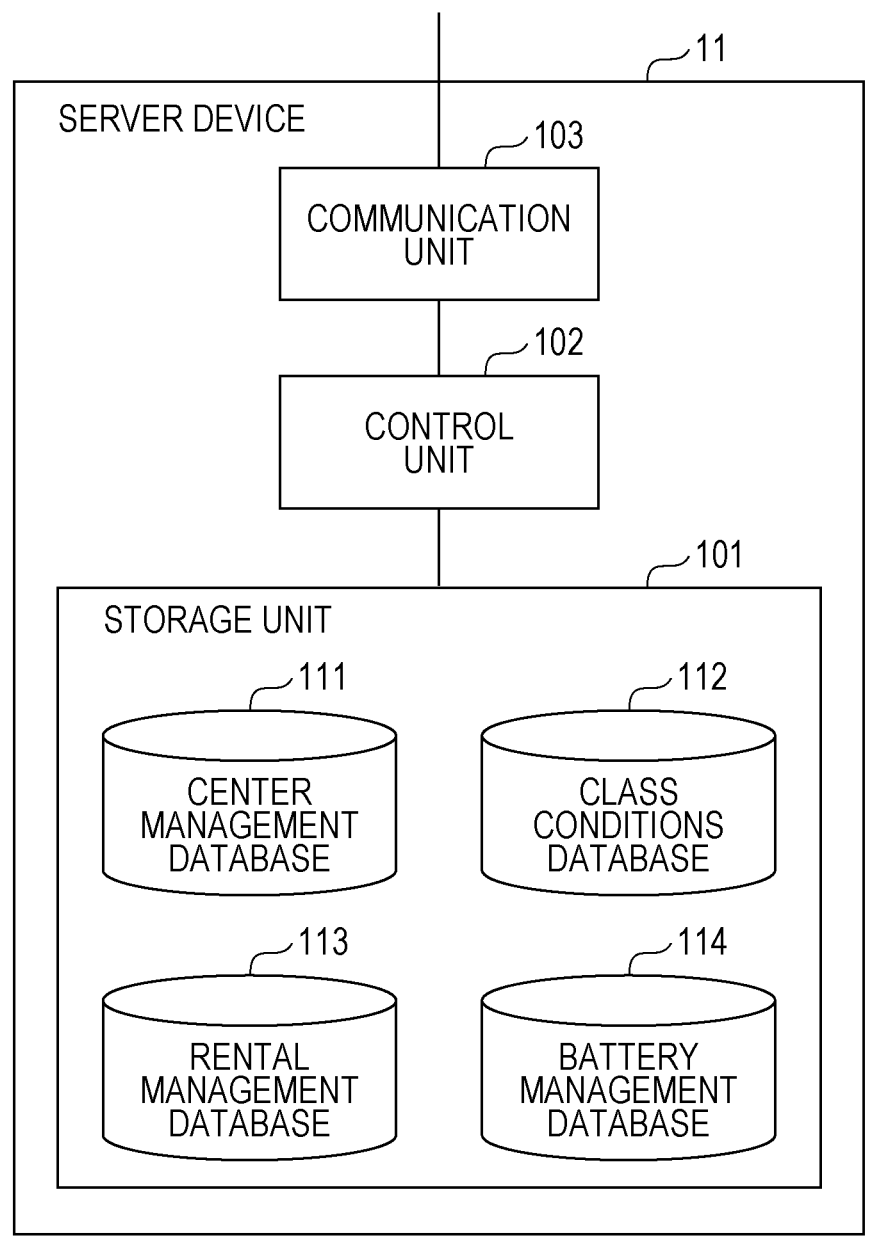
FIG. 3 is a block diagram illustrating the configuration of a server device in FIG. 2.

FIG. 3 is a block diagram illustrating the configuration of the server device 11 in FIG. 1. The server device 11 includes a storage unit 101, a control unit 102, and a communication unit 103, as illustrated in FIG. 3.

The storage unit 101 stores various types of control programs for controlling the server device 11, programs such as various types of application programs, and various types of data. The storage unit 101 is configured including, for example, semiconductor memory, a hard disk drive (HDD), or the like. The storage unit 101 stores, for example, a center management database 111, a class conditions database 112, a rental management database 113, and a battery management database 114.

Figure 4:
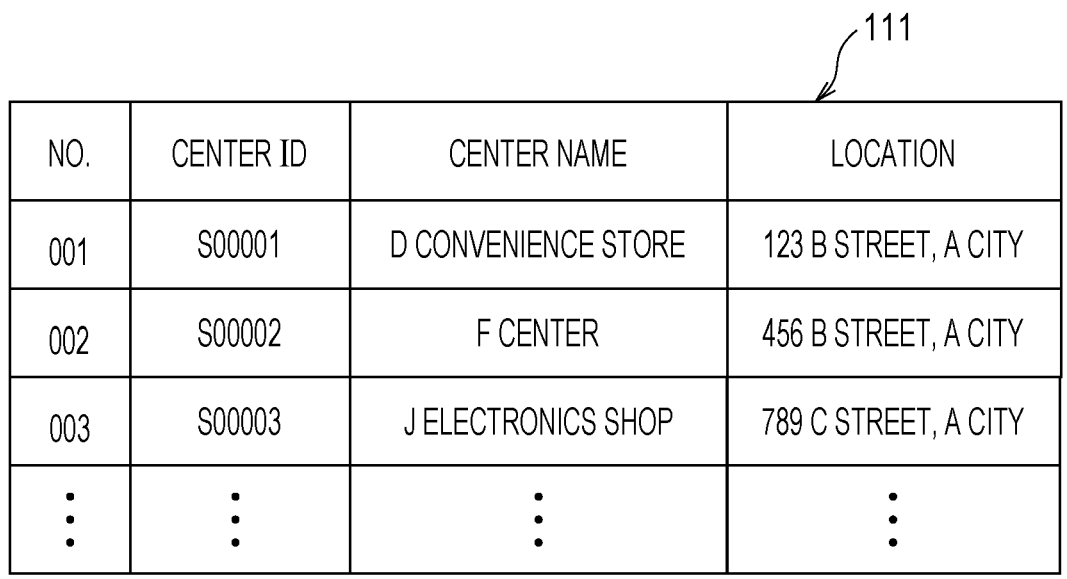
FIG. 4 is a diagram illustrating an example of a center management database in FIG. 3.

The center management database 111 is a database for storing data indicating names and locations of service centers. As exemplified in FIG. 4, "Center ID", "Center Name", and "Location" are correlated with "No." and stored in the center management database 111. Stored in the "Center ID", "Center Name", and "Location" are center IDs allocated to the service centers, names of the service centers, and addresses where the service centers are located, respectively.

The class conditions database 112 is a database for storing classification conditions of the battery packs. As exemplified in FIG. 5, "Conditions" is correlated with "Class (deterioration level)" in the class conditions database 112. A class indicating the degree of deterioration (level of deterioration) of the battery pack is stored in the "Class (deterioration level)", with A indicating the least degree of deterioration, and E indicating the most advanced deterioration. "Conditions" stores the conditions for battery packs belonging to the corresponding class. In a case where a certain battery pack satisfies multiple conditions, the battery pack is classified in the class with the greater degree of deterioration. Note however, that the way of deciding which class a battery pack belongs to in a case where multiple conditions are satisfied is not particularly restricted, and that the conditions of the classes indicating the degree of deterioration of the battery packs are not particularly restricted.

The rental management database 113 is a database for performing battery pack rental management. As exemplified in FIG. 6, "Center ID", "Member No.", "Date", "Late Returns", "Drop-Off Battery ID", "Drop-Off Battery Information", "Lease Battery ID", "Lease Battery Information", and "Rental Period", are correlated with "No." and stored in the rental management database 113.

"Center ID" stores the center ID of the service center where the battery pack has been replaced. "Member No." and "Date" store the membership No. of the member replacing the battery pack, and the date thereof, respectively. "Late Returns" stores information indicating whether that member has been late in returning battery packs in the past ("Late" indicates that there has been a late return, "None" indicates that there has been none).

"Drop-Off Battery ID" and "Drop-Off Battery Information" store the battery ID of the battery pack which the user has dropped off at the service center, and battery information thereof (remaining charge and class). "Lease Battery ID" and "Lease Battery Information" store the battery ID of the battery pack which the service center has leased the user, and battery information thereof (remaining charge and class), respectively.

The battery management database 114 is a database for managing the remaining charge in the battery of battery packs, class, charging history, and so forth. As exemplified in FIG. 7, "Date of Manufacture", "Storing Service Center", "Remaining Charge", "Learning Capacity", "Class (deterioration level)", and "Dates Charged" are stored for each battery ID of the battery packs in the battery management database 114.

"Date of Manufacture" stores the date on which that battery pack was manufactured, and "Storing Service Center" stores the center ID of the service center storing that battery pack. "Remaining Charge", "Learning Capacity", and "Class (deterioration level)" store a class indicating the remaining charge in the battery of the battery pack, the learning capacity of that battery pack, and the degree of deterioration (deterioration level) of that battery pack, respectively. The "Dates Charged" stores the history of dates on which the battery pack was charged.

Battery packs which are currently leased have "Currently Leased" in the "Storing Service Center", and the storage content of the "Remaining Charge" is left blank (indicated by a hyphen). The "Class (deterioration level)" in the battery management database 114 is periodically updated by the control unit 102 referencing the content of the class conditions database 112.

The control unit 102 controls the overall server device 11 and performs various types of computation. The control unit 102 is configured using a processor such as a central processing unit (CPU) or the like, for example.

The communication unit 103 communicates with various types of devices on the network, such as the battery leasing device 2 and the information terminal 3. Note that whether communication of the communication unit 103 is cabled or wireless, and what sort of communication format is used, is not restricted, as long as the communication unit 103 can communicate with the devices on the network.

Configuration of Battery Leasing Device 2

Figure 8:
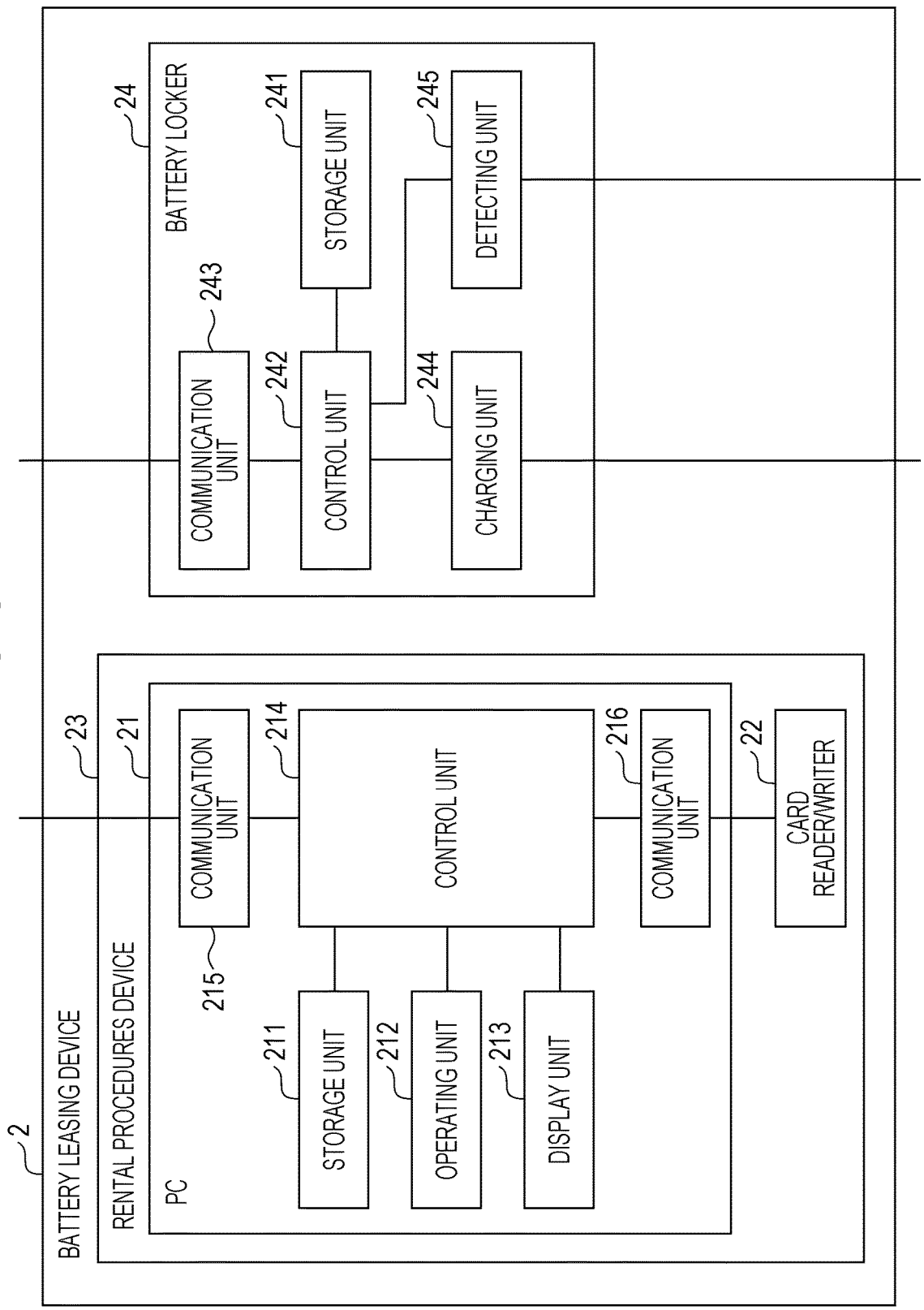
FIG. 8 is a block diagram illustrating the configuration of a battery leasing device in FIG. 2.

FIG. 8 is a block diagram illustrating the configuration of the battery leasing device 2 in FIG. 2. The card reader/writer 22 is connected to the PC 21, reads information from membership cards and so forth and outputs the information to the PC 21, and writes information from the PC 21 to cards. The PC 21 includes a storage unit 211, an operating unit 212, a display unit 213, a control unit 214, and communication units 215 and 216, as illustrated in FIG. 8.

The storage unit 211 stores various types of control programs for controlling the PC 21, programs such as various types of application programs, and various types of data. The storage unit 211 is configured including, for example, semiconductor memory, an HDD, or the like.

The operating unit 212 is configured including a keyboard, a touch sensor disposed on the display screen of the display unit 213, or the like, for example, and outputs signals indicated keys that have been pressed or signals indicating positions that have been touched, to the control unit 214. The display unit 213 is configured including a display or the like, and performs display based on display data input from the control unit 214. The control unit 214 controls the overall PC 21 and performs various types of computation. The control unit 214 is configured using a processor such as a CPU or the like, for example.

The communication unit 215 communicates with various types of devices on the network, such as the server device 11. Whether communication of the communication unit 215 is cabled or wireless, and what sort of communication format is used, is not restricted, as long as the communication unit 215 can communicate with the devices on the network.

The communication unit 216 is a Universal Serial Bus (USB) communication unit or the like, for example, that communicates with various types of devices, such as the card reader/writer 22 to which it is connected. Whether communication of the communication unit 216 is cabled or wireless, and what sort of communication format is used, is not restricted, as long as the communication unit 216 can communicate with the connected devices.

The battery storage unit 24 includes a storage unit 241, a control unit 242, a communication unit 243, a charging unit 244, and a detecting unit 245. The storage unit 241 stores various types of control programs for controlling the battery storage unit 24, programs such as various types of application programs, and various types of data. The storage unit 241 is configured including, for example, semiconductor memory, or the like. The control unit 242 controls the entire battery storage unit 24 and performs various types of computation. The control unit 242 is configured using a processor such as a CPU or the like, for example.

The communication unit 243 communicates with various types of devices on the network, such as the server device 11. Whether communication of the communication unit 243 is cabled or wireless, and what sort of communication format is used, is not restricted, as long as the communication unit 243 can communicate with the devices on the network.

The charging unit 244 charges battery packs under control of the control unit 242. The detecting unit 245 detects the remaining charge and learning capacity of battery packs under control of the control unit 242.

Configuration of Information Terminal 3

Figure 9:
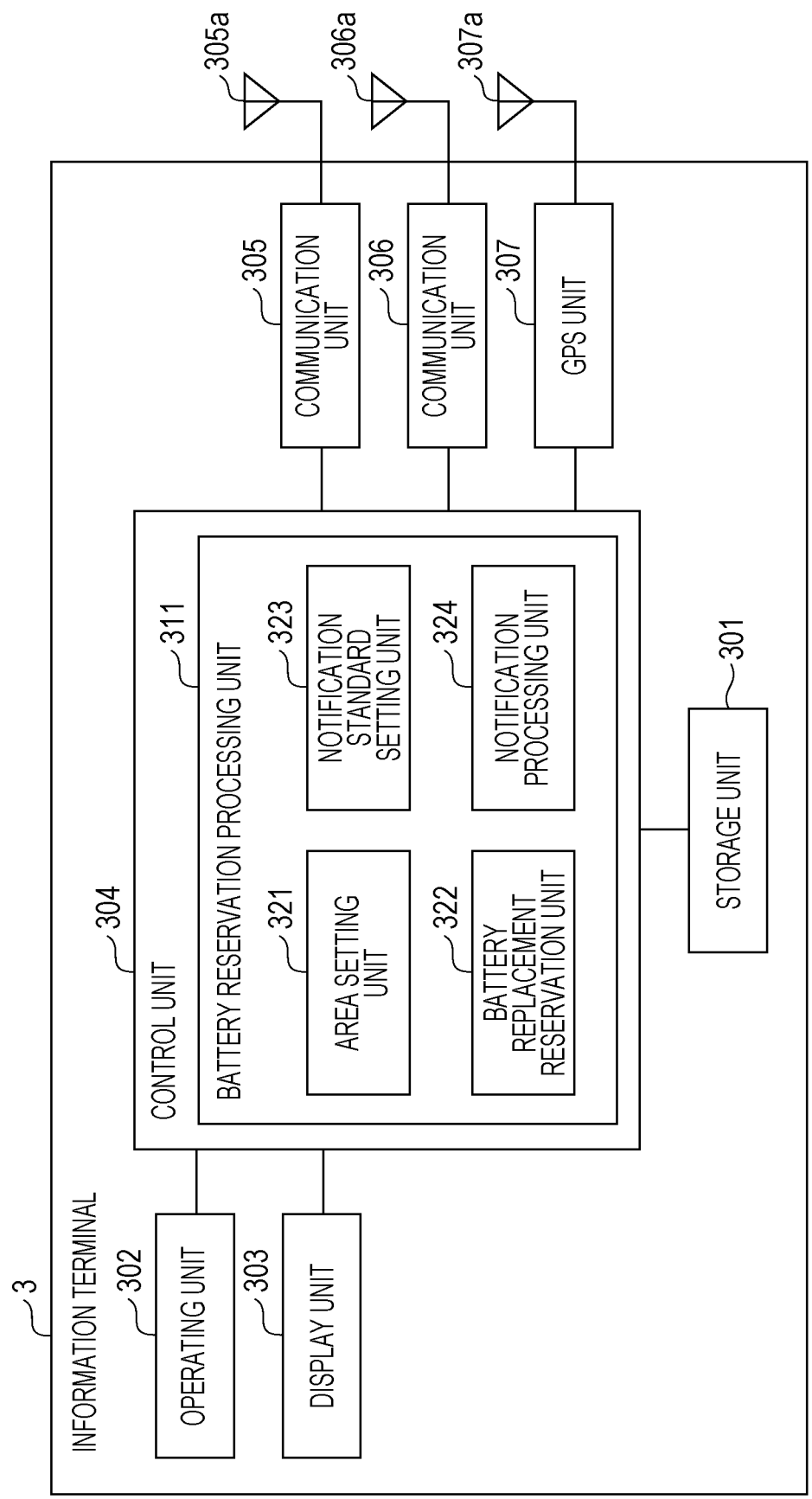
FIG. 9 is a block diagram illustrating the configuration of an information terminal in FIG. 2.

FIG. 9 is a block diagram illustrating the configuration of an information terminal 3 in FIG. 2. As illustrated in FIG. 9, the information terminal 3 includes a storage unit 301, an operating unit 302, a display unit 303, a control unit 304, communication units 305 and 306, antennas 305a and 306a, a Global Positioning System (GPS) unit 307, and an antenna 307a. The information terminal 3 is a smartphone, wristwatch-type mobile terminal, or the like, for example.

The storage unit 301 stores various types of control programs for controlling the information terminal 3, programs such as various types of application programs, and various types of data. The storage unit 301 is configured including, for example, semiconductor memory, or the like. An example of an application program is an application program for a user to use the battery pack rental reservation system (hereinafter referred to as "battery reservation application", or "battery reservation app"). The storage unit 301 also stores area information indicating the area in which service centers are to be searched for, set by the user, and notification standard information indicating a notification standard that the user has set, using the battery reservation app.

The operating unit 302 is configured including a touch sensor disposed on the display screen of the display unit 303 and so forth, for example, and outputs signals indicating touched positions to the control unit 304. The display unit 303 is configured including a display or the like, and performs display based on display data input from the control unit 304.

The control unit 304 controls the overall information terminal 3 and performs various types of computation, and is configured using a processor such as a CPU or the like, for example. The control unit 304 activates and executes the battery reservation app, based on a battery reservation application program stored in the storage unit 301, for example. With regard to this battery reservation app, the control unit 304 functions as a battery reservation processing unit 311 including an area setting unit 321, a battery replacement reservation unit 322, a notification standard setting unit 323, and a notification processing unit 324. The contents of the processing of these functional parts will be briefly described here, and details thereof will be described later with reference to flowcharts.

The area setting unit 321 performs processing relating to setting of an area in which service centers will be searched for, based on the content of user operations. The battery replacement reservation unit 322 performs processing relating to display of service centers situated within the set area that have been searched by the server device 11, and processing relating to reservation for battery pack replacement at the service center which the user has selected based on this display.

The notification standard setting unit 323 performs processing relating to setting processing of a notification standard regarding what sort of timing to notify the user of battery information of a battery pack (e.g., remaining charge in the battery pack or class indicating the degree of deterioration of the battery pack) or rental period information of the battery pack (e.g., the number of days till the day of return). The notification processing unit 324 performs processing relating to display of the battery information of the battery pack or the rental period information thereof, based on the notification standard that has been set. Note that this notification standard can also be considered to be a notification standard for the timing to prompt the user to replace the battery pack. The notification can be viewed as a notification to prompt the user to replace the battery pack, thereby supporting user judgment on battery pack replacement.

The communication unit 305 communicates with various types of devices on the network, such as the server device 11, battery leasing device 2, and so forth, via the antenna 305a. Whether communication of the communication unit 305 is cabled or wireless, and what sort of communication format is used, is not restricted, as long as the communication unit 305 can communicate with the devices on the network.

The communication unit 306 is a near-field communication unit compliant to Bluetooth (a registered trademark) or the like, for example, that communicates with various types of devices, such as the battery pack 5 and so forth, via the antenna 306a. Whether communication of the communication unit 306 is cabled or wireless, and what sort of communication format is used, is not restricted, as long as the communication unit 306 can communicate with the devices.

The GPS unit 307 makes positional measurements of the current location using radio waves received by the antenna 307a. Arrangements other than GPS may be used instead, as long as the current location can be determined.

Configuration of Battery Pack 5

Figure 10:
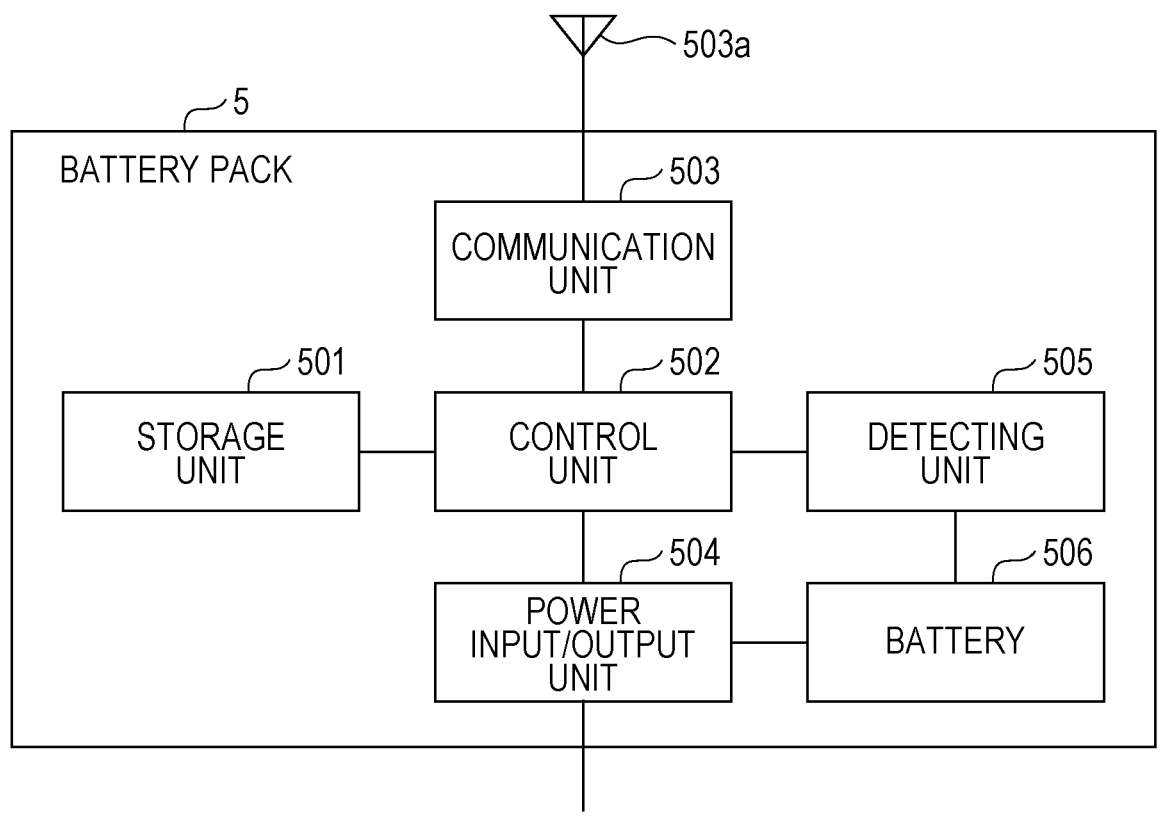
FIG. 10 is a block diagram illustrating the configuration of a battery pack in FIG. 2.

FIG. 10 is a block diagram illustrating the configuration of the battery pack 5 in FIG. 2. The battery pack 5 includes a storage unit 501, a control unit 502, a communication unit 503, an antenna 503a, a power input/output unit 504, a detecting unit 505, and a battery 506, as illustrated in FIG. 10.

The storage unit 501 stores various types of control programs for controlling the battery pack 5, programs such as various types of application programs, and various types of data. The storage unit 501 is configured including, for example, semiconductor memory, or the like. For example, the storage unit 501 stores charging history information indicating dates when charging was performed. The charging history stored in the storage unit 501 is the past few most recent dates of charging, for example.

The control unit 502 controls the overall battery pack 5 and performs various types of computation, and is configured using a processor such as a CPU or the like, for example. The communication unit 503 is a near-field communication unit compliant to Bluetooth (a registered trademark) or the like, for example, that communicates with various types of devices, such as the information terminal 3 and so forth, via the antenna 503a. Whether communication of the communication unit 503 is cabled or wireless, and what sort of communication format is used, is not restricted, as long as the communication unit 503 can communicate with the devices.

The power input/output unit 504 is connected to the charging unit 244 of the battery storage unit 24 and a power connector for the pedelec 4 or the like, for example. The power input/output unit 504 externally outputs electric power of the battery 506 under control of the control unit 502, and outputs external electric power to the battery 506. The detecting unit 505 detects the remaining charge in the battery pack under control of the control unit 502.

Display Contents on Terminal Device and Transition Thereof

Example of Top Page of Battery Reservation App

Figure 11:
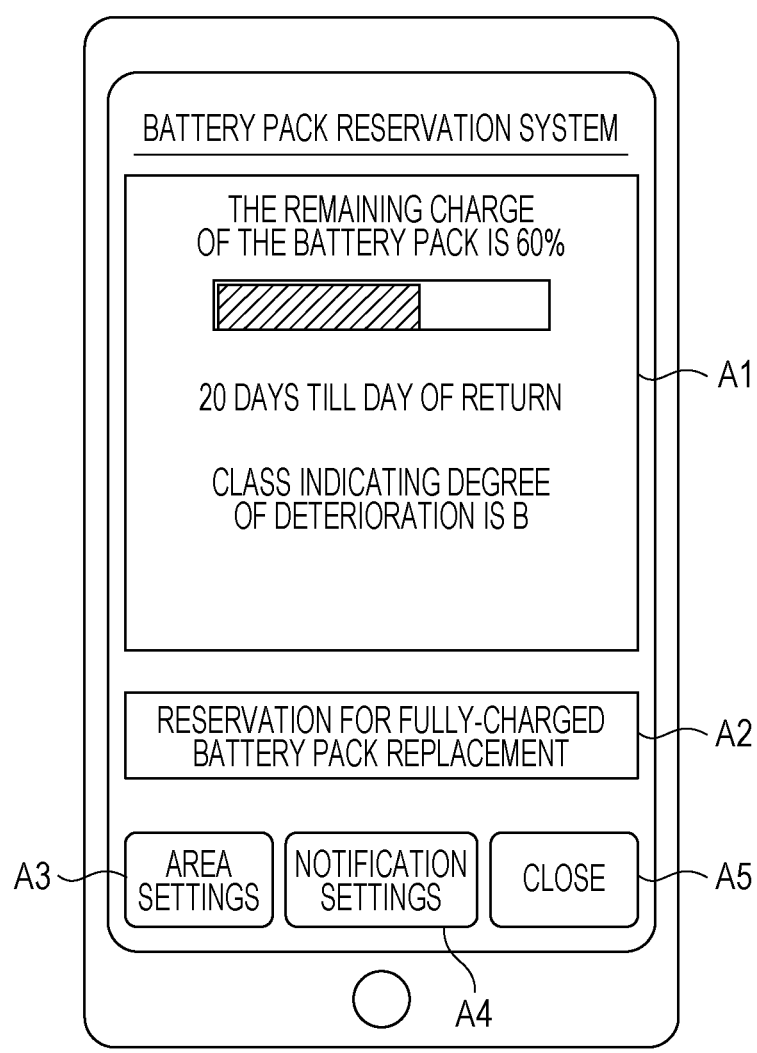
FIG. 11 is a display example of a top page of a battery reservation application that the information terminal illustrated in FIG. 9 displays.

FIG. 11 is a display example of a top page of the battery reservation app. The top page of the battery reservation app includes a display region A1 that displays battery information of the battery pack 5 wirelessly connected to the information terminal 3, and rental period information thereof. In the example in FIG. 11, the remaining charge of the battery pack and the class, indicating the degree of deterioration thereof, are displayed as battery information. The number of days till the return day also are displayed as rental period information. An arrangement may be made where the return date is displayed instead of the number of days till the return day, as the rental period information. The remaining charge of the battery pack here is an example of information relating to the remaining charge of the battery pack.

Functions of the battery reservation app include a function relating to making a reservation to replace a battery (hereinafter referred to as "battery replacement reservation function"), a function relating to setting an area in which to search for service centers (hereinafter referred to as "area setting function"), a function relating to setting a notification standard for battery information or rental period information of the battery pack (hereinafter referred to as "notification standard setting function"), and so forth.

The top page is also provided with a "reservation for fully-charged battery pack replacement" button A2, an "area settings" button A3, and a "notification settings" button A4, respectively corresponding to the battery replacement reservation function, area setting function, and notification standard setting function. The user can select the functions to use by touching the buttons A2 through A4. The top page further has a "close" button A5 to close the top page being displayed on the display unit 303.

Example of Transition of Displayed Pages when Using Area Setting Function

FIGS. 12A through 12D illustrate an example of transition of displayed contents regarding setting of an area in which to search for a service center, in the battery reservation application. When setting the area in which to search for service centers, the user does not have to take into consideration an area which can be reached on the remaining charge in the battery pack mounted on the pedelec 4. That is to say, the set area may include areas outside of the area which can be reached on the remaining charge.

Figure 12B:
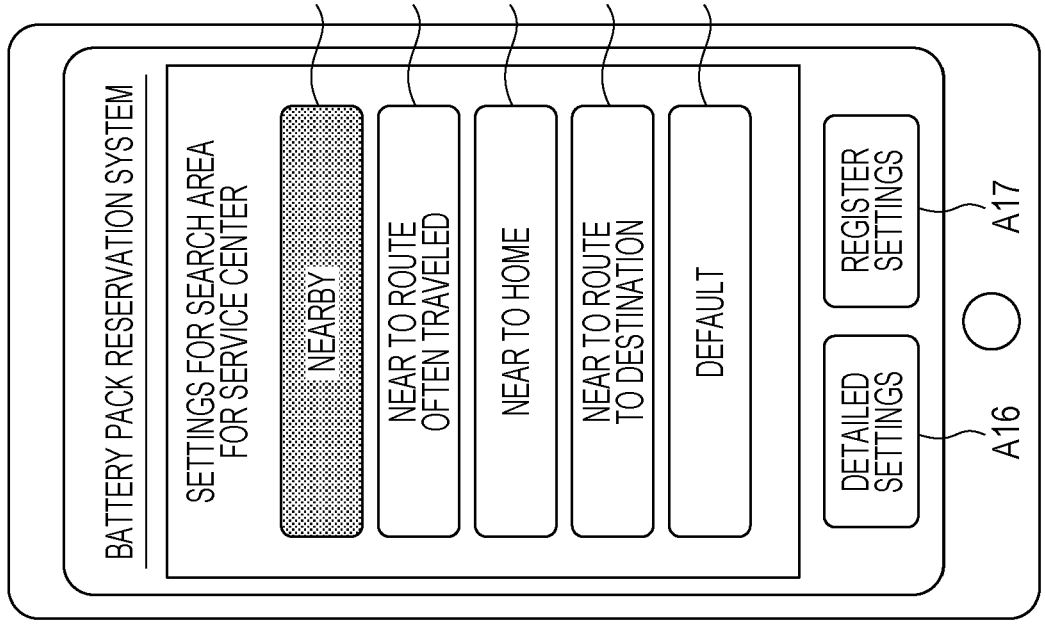
FIGS. 12A through 12D illustrate an example of transition of displayed contents regarding setting of an area in which to search for a service center, in the battery reservation application.
Figure 12A:
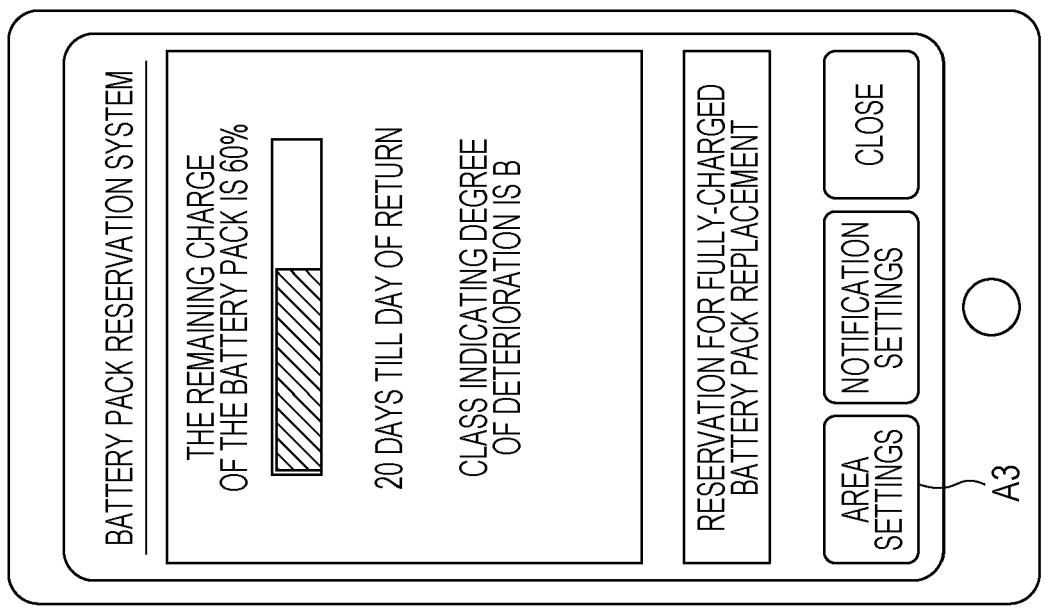

FIG. 12A is the top page of the battery reservation app described in FIG. 11. If the user touches the "area settings" button A3 in the top page, the displayed contents on the display unit 303 are switched from those of the top page in FIG. 12A to an area setting page, of which an example is illustrated in FIG. 12B.

The battery reservation app includes, as candidates for the area to be set, "nearby", "near to route often traveled", "near to home", and "near to route to destination". Note that the "nearby" means nearby where the information terminal 3 is at the time of using the battery replacement reservation function, not nearby the information terminal 3 at the time of using the area setting function. The area setting page has a "nearby" button A11, a "near to route often traveled" button A12, a "near to home" button A13, and a "near to route to destination" button A14, corresponding to these four area candidates. The user can select a desired area by touching one of the buttons A11 through A14.

In a case of setting an area within a set distance from the location where the information terminal 3 is when using the battery replacement reservation function (current location) as the search area for service centers the user touches the "nearby" button A11. In a case of setting an area within a set distance from a set route that is often traveled as the search area for service centers the user touches the "near to route often traveled" button A12. In a case of setting an area within a set distance from the location of home, as the search area for service centers, the user touches the "near to home" button A13. Further, in a case of setting an area within a set distance from a route from the location where the information terminal 3 is when using the battery replacement reservation function (current location) to a set destination, as the search area for service centers the user touches the "near to route to destination" button A14.

The area setting page further has a "default" button A15 to be touched when an area which the user as set as default, as the search area for service centers. The area setting page further has a "detailed settings" button A16 to be touched by the user when setting details of an area corresponding to a touched button A11 through A14. In the present embodiment, the contents of the detailed settings are to set how far the aforementioned set distance is.

The area setting page further has a "register settings" button A17 to be touched by the user when registering settings for an area corresponding to a touched button A11 through A15. In a case where one of the buttons A11 through A14 has been touched and subsequently the "register settings" button A17 is touched, the search area for service centers is set based on the area corresponding to the one of the buttons A11 through A14 that has been touched, and the distance that has been set (corresponding to the aforementioned set distance). Also, in a case where the button A15 has been touched and subsequently the "register settings" button A17 is touched, the search area for service centers is set based on the contents of the default settings.

Figure 12D:
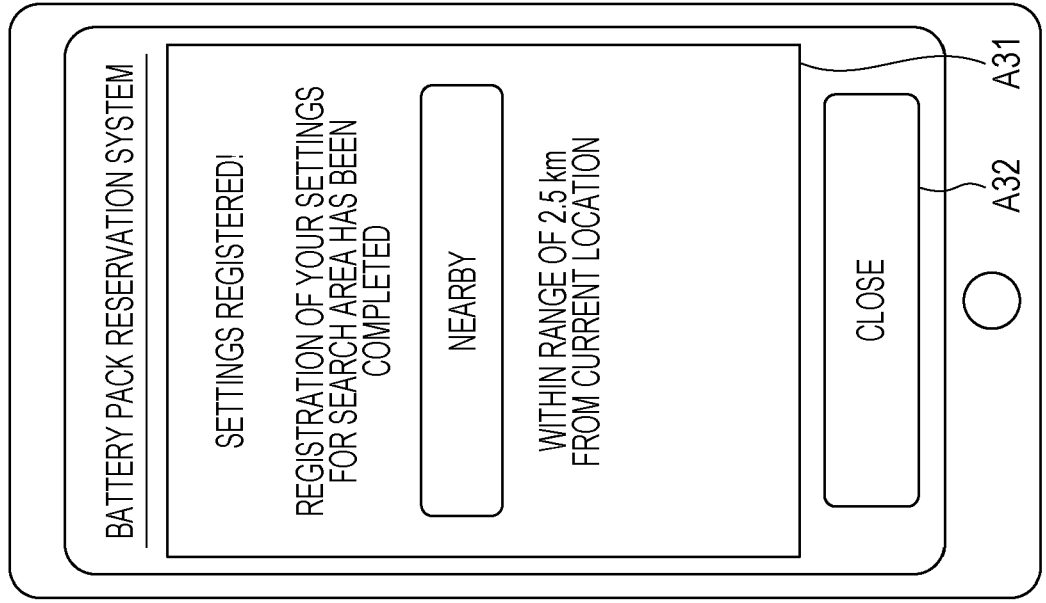
Figure 12C:
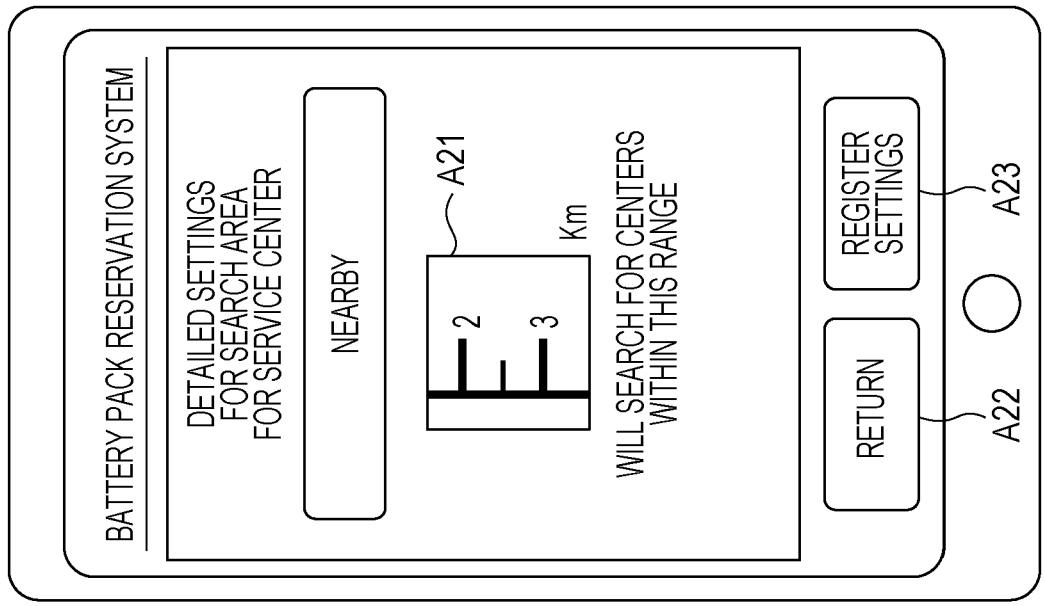

When the user touches the "nearby" button A11 in the area setting page and subsequently touches the "detailed settings" button A16, the displayed contents on the display unit 303 are switched from those of the area setting page in FIG. 12B to a detailed area setting page for "nearby", of which an example is illustrated in FIG. 12C. Note that in the present embodiment, detailed area setting pages are also provided for "near to route often traveled", "near to home", and "near to route to destination", as well. These detailed area setting pages are the detailed area setting page for "nearby" with the "nearby" display having been replaced by for "near to route often traveled", "near to home", or "near to route to destination".

Indication is made in the detailed area setting page for "nearby" to the effect that the area to be set is "nearby", and also a distance setting window A21 is provided. The user can use the distance setting window A21 to instruct the distance from the current location to the search area for service centers. The detailed area setting page also has a "return" button A22 that the user touches when returning to the area setting page in FIG. 12B.

The detailed area setting page further has a "register settings" button A23 that the user touches in a case of registering the area corresponding to the one of buttons A11 through A14 that has been touched and the settings at the distance instructed using the distance setting window A21. In a case where the "register settings" button A23 has been touched, the search area for service centers is set based on the area corresponding to the one of buttons A11 through A14 that has been touched and the settings at the distance instructed using the distance setting window A21.

When the user touches the "register settings" button A23 in the detailed area setting page, the displayed contents on the display unit 303 are switched from those of the detailed area setting page in FIG. 12C to a settings registration completed page, of which an example is illustrated in FIG.

12D. The settings registration completed page has a display region A31 displaying information to the effect that setting of the search area for service centers has been completed, and information relating to that search area. The settings registration completed page is also provided with a "close" button A32 to close the settings registration completed page being displayed on the display unit 303.

When the user touches the "register settings" button A17 in the area setting page in FIG. 12B, the displayed contents on the display unit 303 are switched from those of the area setting page in FIG. 12B to the settings registration completed page in FIG. 12D.

Figure 13B:
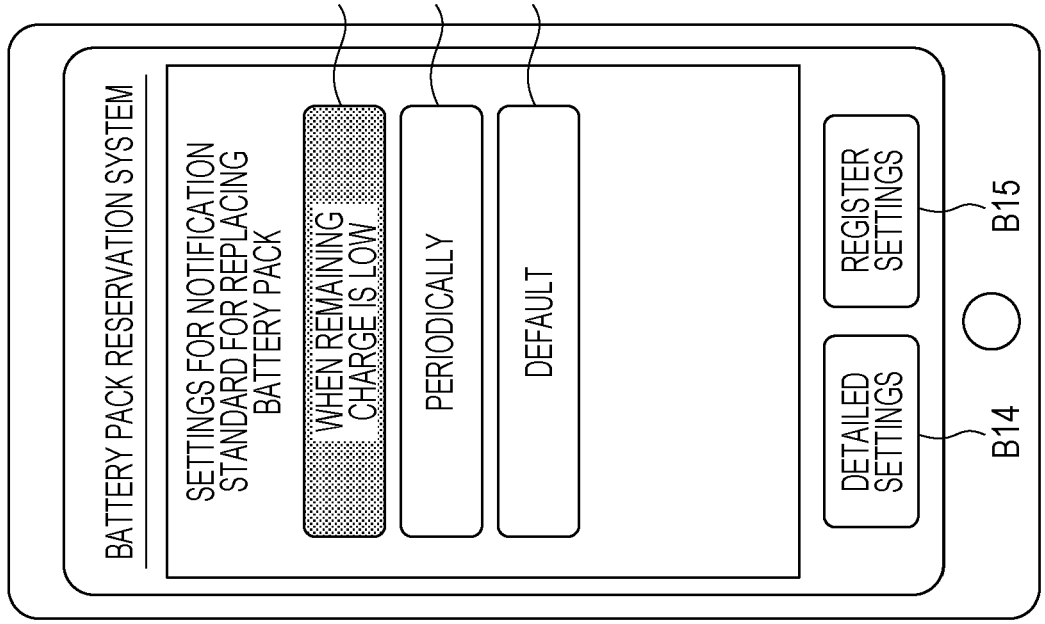
FIGS. 13A through 13D illustrate an example of transition of displayed contents regarding battery information of the battery pack, and setting of a notification standard for rental period information, in the battery reservation application.
Figure 13A:
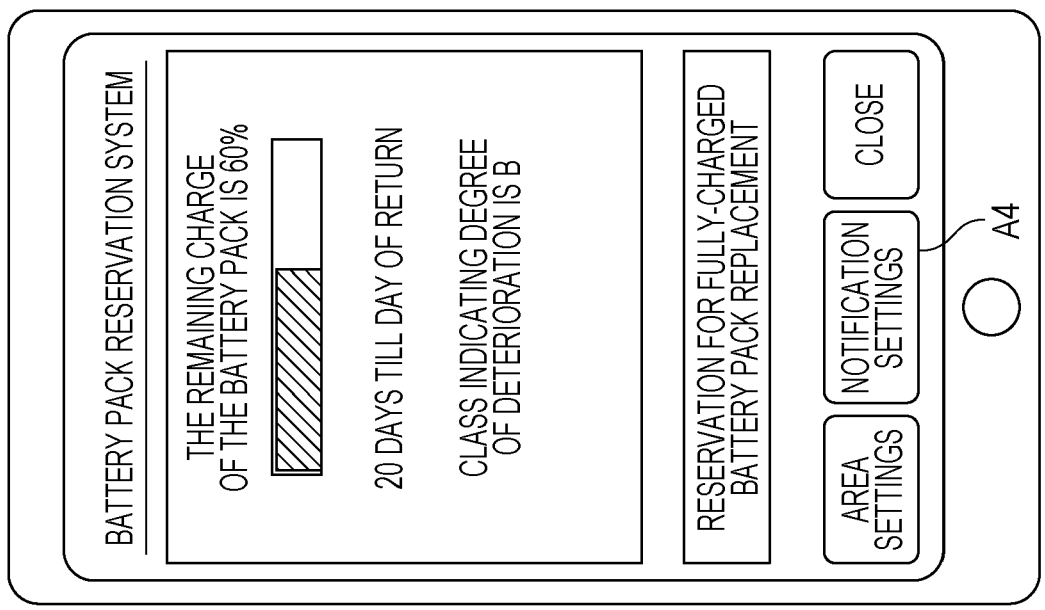

Example of Transition of Displayed Pages When Using Notification Standard Setting Function FIGS. 13A through 13D illustrate an example of transition of displayed contents regarding battery information of the battery pack, and setting of the notification standard for rental period information, in the battery reservation application. FIG. 13A is the top page of the battery reservation app described regarding FIG. 11. When the user touches the "notification settings" button A4 in this top page, the displayed contents on the display unit 303 are switched from those of the top page in FIG. 13A to a notification standard setting page, of which an example is illustrated in FIG. 13B. The battery reservation app has "when remaining charge is low" and "periodically" as notification standards, with a "when remaining charge is low" button B11 and a "periodically" button B12 provided respectively corresponding to these two notification standards. The user can select a desired notification standard by touching one of these buttons B11 and B12.

The user touches the "when remaining charge is low" button B11 when setting reduced remaining charge of the battery pack as the notification standard, and touches the "periodically" button B12 when setting a periodical notification of remaining charge as the notification standard. The notification standard setting page also has a "default" button B13 that the user touches when using the contents of default settings as the notification standard.

The notification standard setting page further has a "detailed settings" button B14 to be touched by the user in a case of making detailed settings of the notification standard regarding the one of the buttons B11 and B12 that has been touched. The contents of detailed settings relating to the "when remaining charge is low" in the present embodiment is for setting the remaining charge at which the notification is to be made. When the remaining charge of the battery pack reaches the set remaining charge or lower, information indicating that the remaining charge is low is displayed on the display screen of the information terminal 3. The contents of detailed settings relating to the "periodically" is a setting for the interval (days) for performing notification.

The notification standard setting page further has a "register settings" button B15 touched by the user when registering settings for the notification standard corresponding to the one of the buttons B11 through B13 that has been touched. In a case where one of the buttons B11 and B12 has been touched and subsequently the "register settings" button B15 is touched, the notification timing is set based on the notification standard of the one of the buttons B11 and B12 has been touched and the remaining charge or number of days that has been set. Also, in a case where the "when remaining charge is low" button B11 has been touched and subsequently the "register settings" button B15 is touched, the notification timing is set based on the contents of the default settings.

Figure 13D:
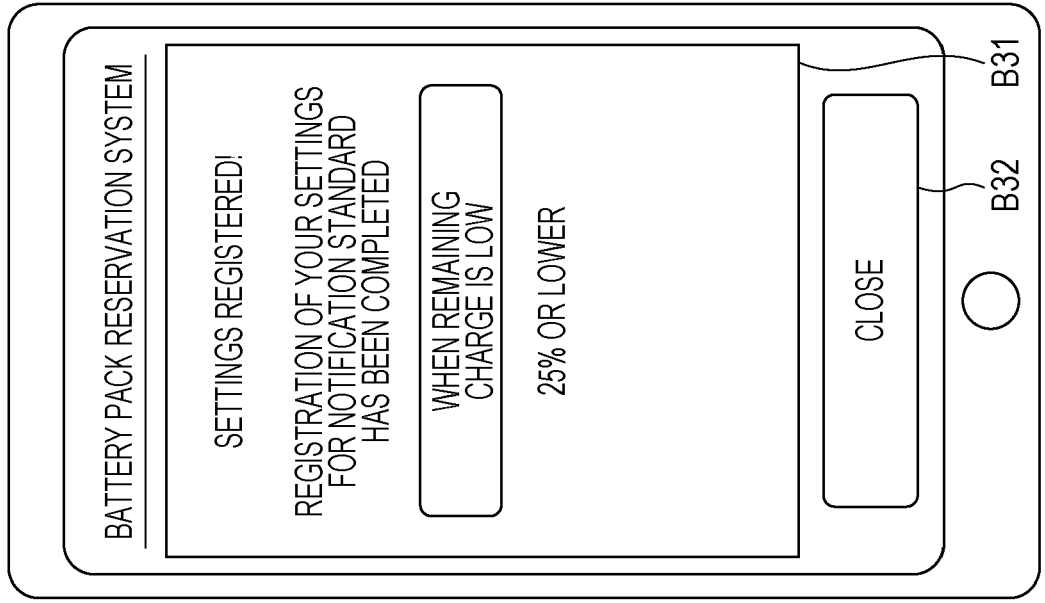
Figure 13C:
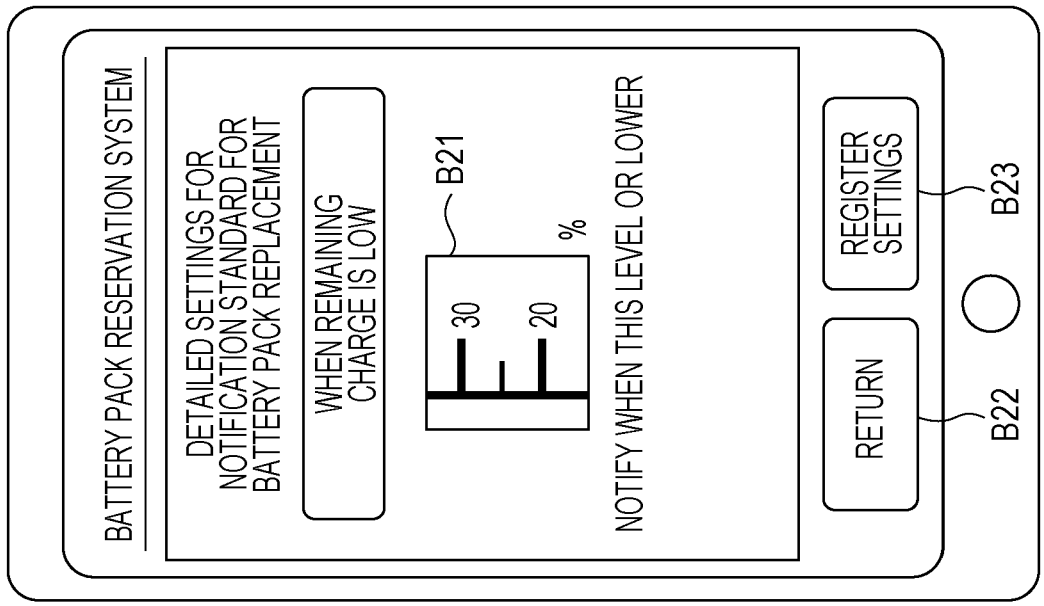

When the user touches the "when remaining charge is low" button B11 in the notification standard setting page, and subsequently touches the "detailed settings" button B14, the displayed contents on the display unit 303 are switched from those of the notification standard setting page in FIG. 13B to a detailed notification standard setting page for "when remaining charge is low", of which an example is illustrated in FIG. 13C. Indication is made in the detailed notification standard setting page for "when remaining charge is low" to the effect that the notification standard is "when remaining charge is low", and also a remaining charge setting window B21 is provided. The user can use the remaining charge setting window B21 to set the threshold value of the remaining charge at which the information terminal 3 receives notification of information indicating that the remaining charge of the battery pack is low. When the remaining charge of the battery pack reaches this threshold value or lower, the information terminal 3 receives notification of information indicating that the remaining charge of the battery pack is low.

The detailed notification standard setting page also has a "return" button B22 that the user touches when returning to the notification standard setting page in FIG. 13B. The detailed notification standard setting page further has a "register settings" button B23 that the user touches in a case of registering the notification standard "when remaining charge is low" according to the touched button B11 and the notification timing at the remaining charge instructed by the remaining charge setting window B21.

When the user touches the "register settings" button B23 in the detailed notification standard setting page, the displayed contents on the display unit 303 are switched from those of the detailed notification standard setting page in FIG. 13C to a settings registration completed page for "when remaining charge is low", of which an example is illustrated in FIG. 13D. The settings registration completed page has a display region B31 displaying information to the effect that setting of the notification timing has been completed, and information relating to that notification timing. The settings registration completed page is also provided with a "close" button B32 to close the settings registration completed page being displayed on the display unit 303.

When the user touches the "register settings" button B15 in the notification standard setting page in FIG. 13B after having touched the "when remaining charge is low" button B11, the displayed contents on the display unit 303 are switched from those of the notification standard setting page in FIG. 13B to the settings registration completed page in FIG. 13D.

Figure 14B:
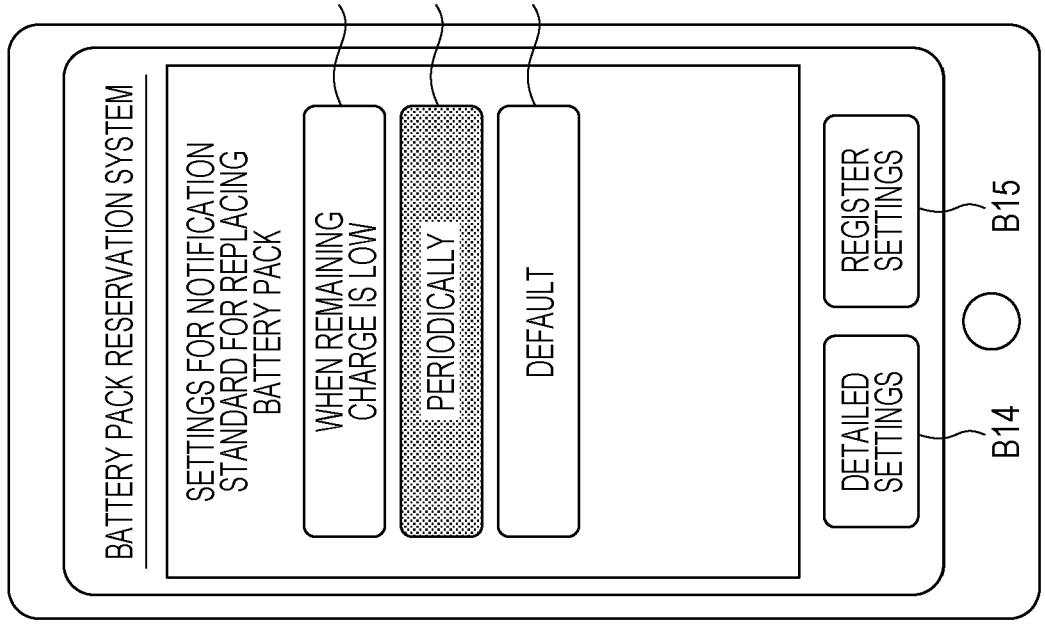
FIGS. 14A through 14D illustrate an example of transition of displayed contents regarding battery information of the battery pack, and setting of a notification standard for rental period information, in the battery reservation application.
Figure 14A:
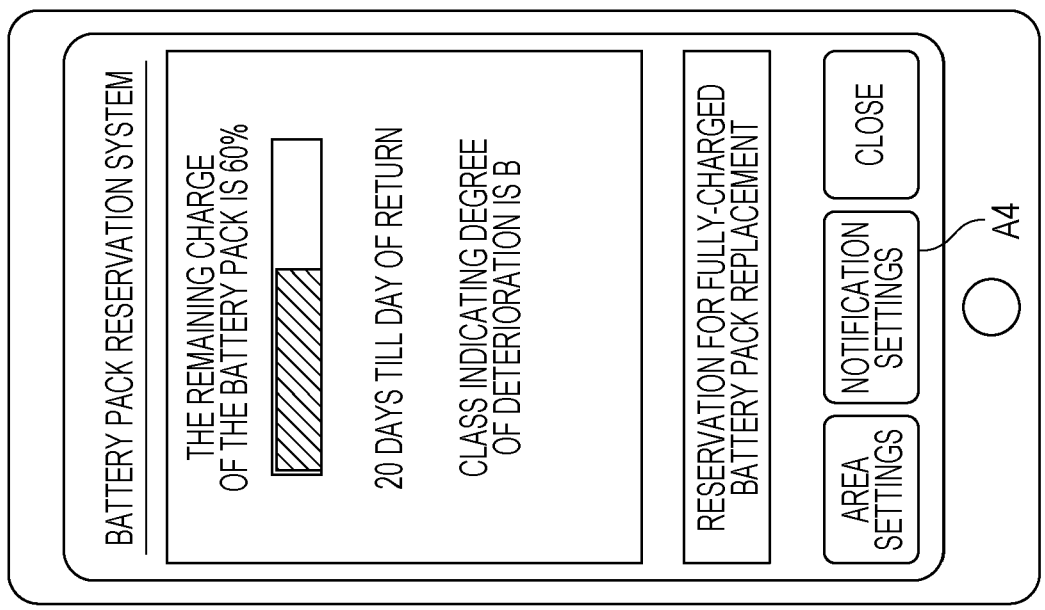
Figure 14D:
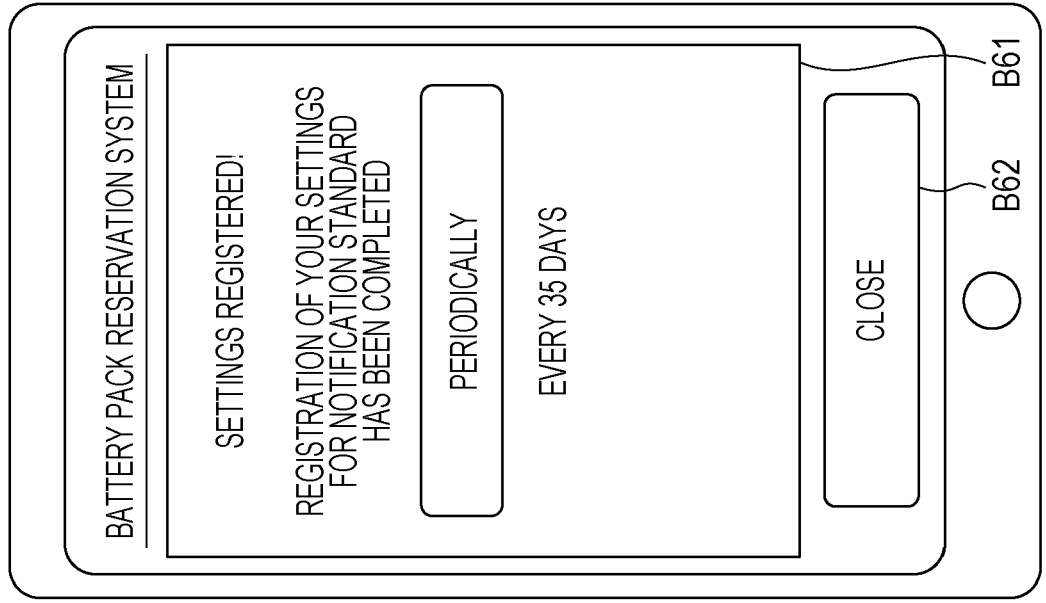
Figure 14C:
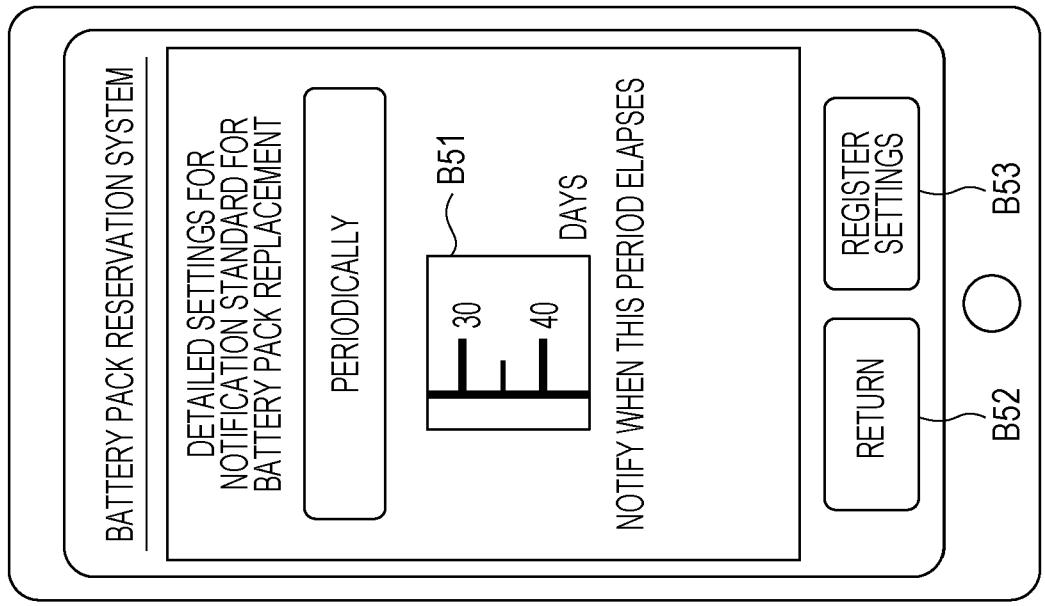

Other Example of Transition of Displayed Pages when Using Notification Standard Setting Function FIGS. 14A through 14D illustrate another example of transition of displayed contents regarding battery information of the battery pack, and setting of the notification standard for rental period information, in the battery reservation application. FIGS. 14A and 14B are the top page of the battery reservation app and the notification standard setting page corresponding to FIGS. 13A and 13B, respectively. When the user touches the "periodically" button B12 in the notification standard setting page, and subsequently touches the "detailed settings" button B14, the displayed contents on the display unit 303 are accordingly switched from those of the notification standard setting page in FIG. 14B to a detailed notification standard setting page for "periodically", of which an example is illustrated in FIG. 14C.

Indication is made in the detailed notification standard setting page to the effect that the notification standard is "periodically", and also a number-of-days setting window B51 is provided. The user can use the number-of-days setting window B51 to instruct the interval at which notification is to be received. The detailed notification standard setting page also has a "return" button B52 that the user touches when returning to the notification standard setting page in FIG. 14B.

The detailed notification standard setting page further has a "register settings" button B53 that the user touches in a case of registering the notification standard "periodically" according to the touched button B12 and the notification timing at the number of days instructed by the number-of-days setting window B51. When the user touches the "register settings" button B53 in the detailed notification standard setting page, the displayed contents on the display unit 303 are accordingly switched from those of the detailed notification standard setting page in FIG. 14C to a settings registration completed page for "periodically", of which an example is illustrated in FIG. 14D.

The settings registration completed page has a display region B61 displaying information to the effect that setting of the notification timing has been completed, and information relating to that notification timing. The settings registration completed page is also provided with a "close" button B62 to close the settings registration completed page being displayed on the display unit 303. When the user touches the "register settings" button B15 in the notification standard setting page in FIG. 14B after having touching the "periodically" button B12, the displayed contents on the display unit 303 are switched from those of the notification standard setting page in FIG. 14B to the settings registration completed page in FIG. 14D.

Figure 15A:
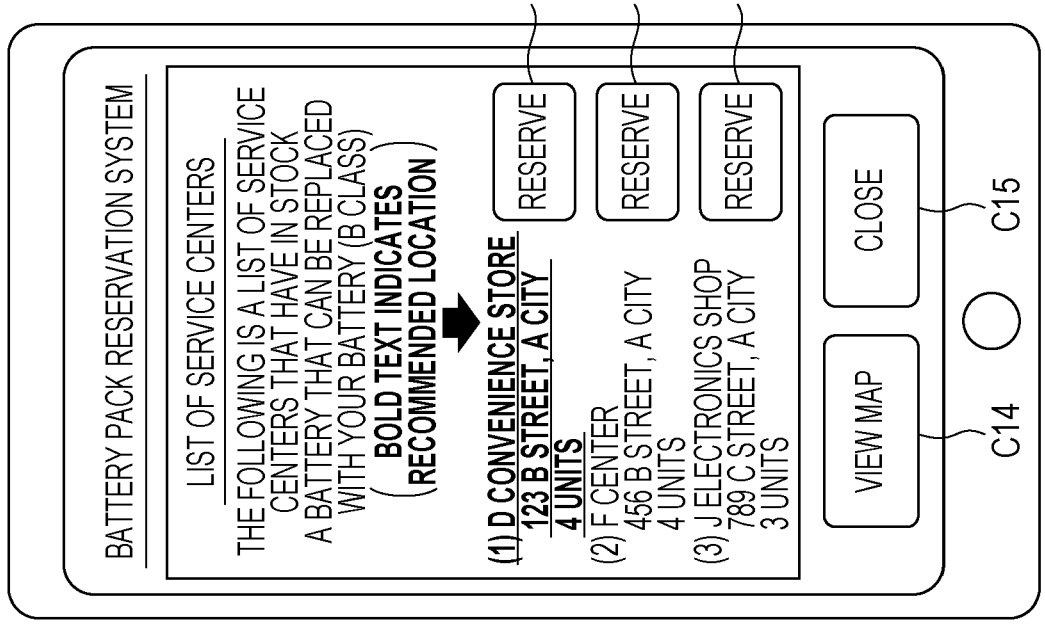
FIGS. 15A through 15D illustrate an example of transition of displayed contents regarding making a reservation for replacement of a battery pack, in the battery reservation application.
Figure 15B:
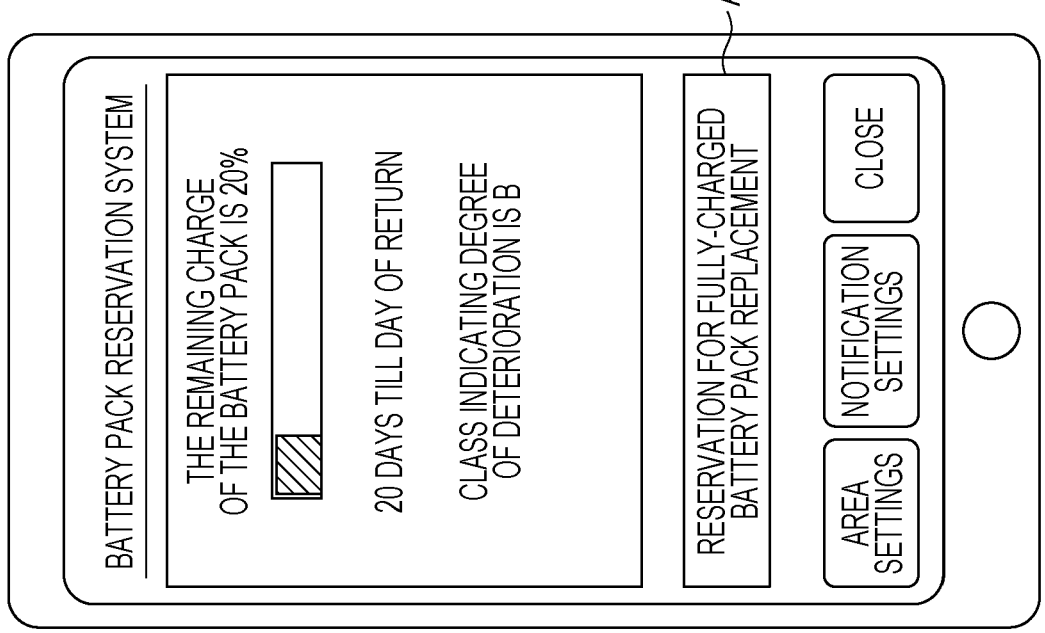

Example of Transition of Displayed Pages When Using Battery Replacement Reservation Function FIGS. 15A through 15D illustrate an example of transition of displayed contents regarding making a reservation for replacement of a battery pack, in the battery reservation application. FIGS. 15A through 15D illustrate an example where "nearby" has been set as the area. FIG. 15A is the top page of the battery reservation app described regarding FIG. 11. When the user touches the "reservation for fully-charged replacement battery pack" button A2 in this top page, the displayed contents on the display unit 303 are switched from those of the top page in FIG. 15A to a center reservation page, of which an example is illustrated in FIG. 15B.

A maximum of three service centers are displayed on the display unit 303 in the battery reservation app, as (1) through (3). The displayed service centers satisfy the following.

(A) Service centers that exist within the search area for service centers set by the area setting function.

(B) Service centers that have a battery pack that is of an equivalent deterioration level as the battery pack which the user has, and further, the battery pack is a leasable battery pack. To say that a battery pack is a leasable battery pack means that the battery pack has been charged enough to where it can be leased to the user, for example.

(C) The three service centers closest to the current location that satisfy (A) and (B).

The service centers (1) through (3) are in order from the closest from the current location. Accordingly, the user can tell which is the closest from the current location, and make reservations for replacing the battery pack accordingly.

The center reservation page displays the locations and names of the service centers (1) through (3), and also the number of battery packs stored at the services centers that satisfy predetermined conditions. The number displayed in the present embodiment is the number of battery packs that are of equivalent deterioration level as the battery pack which the user has, and further are leasable battery packs. Accordingly, the user can make reservations for replacing the battery pack, knowing how many battery packs of equivalent deterioration level that are leasable battery packs are stored at each service center. The above predetermined conditions are conditions that should be satisfied for leasing, and are set as appropriate. Note that the number of the battery packs may be display without taking the predetermined conditions into consideration, with the number of battery packs stored in the service centers simply being displayed.

Note that the center reservation page for service centers has a recommended service center displayed in bold. Any display format may be used, as long as the user can distinguish between a recommended service center and others. An example of a recommended service center is the closest service center. The maximum number of service centers displayed is not restricted in particular.

The center reservation page has "reserve" buttons C11 through C13, corresponding to the service centers (1) through (3), respectively. The user can touch one of the buttons C11 through C13 to make a reservation to replace a battery pack at the service center corresponding to the one of the buttons C11 through C13 that was touched. A "view map" button C14 is provided on the center reservation page for the user to touch in a case where the user wants to see where the service centers (1) through (3) are on the map. For example, if the user cannot comprehend where a service center is from the address alone, viewing a map with the location of the service center indicated makes it easier to grasp the location.

Figure 15D:
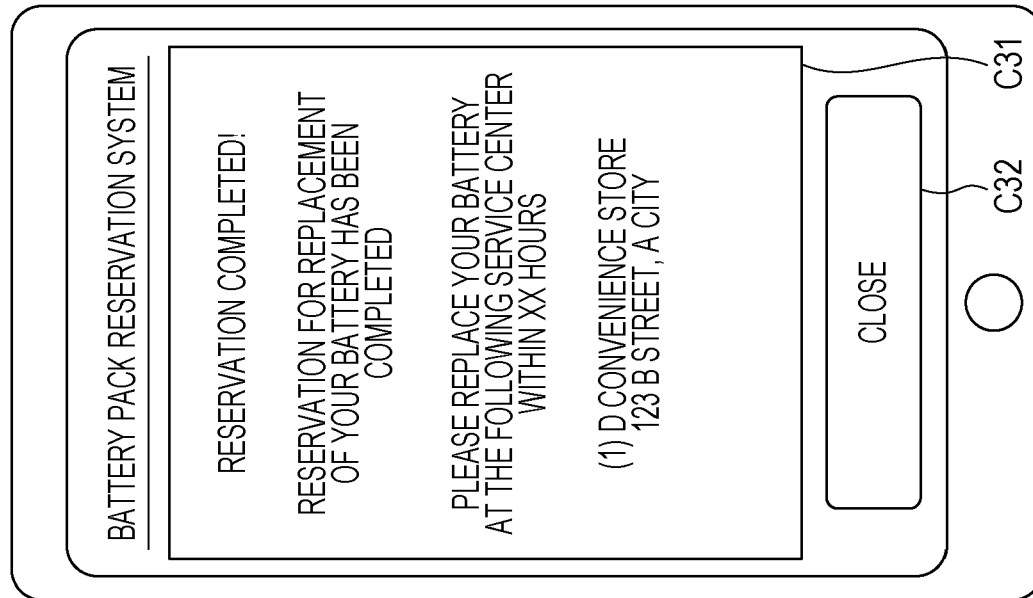
Figure 15C:
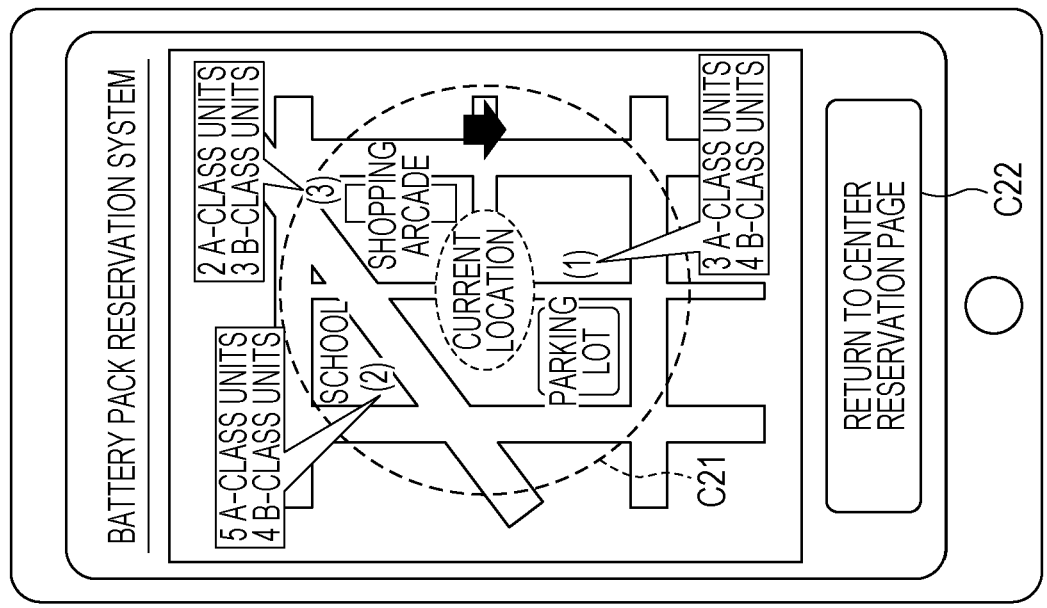

The center reservation page is also provided with a "close" button C15 to close the center reservation page being displayed by the user on the display unit 303. When the user touches the "view map" button C14 in the center reservation page, the displayed contents on the display unit 303 are switched from those of the center reservation page in FIG. 15B to a center reservation map page, of which an example is illustrated in FIG. 15C.

The center reservation map page includes a display region C21 displaying the locations of the service centers (1) through (3), displayed in the center reservation page corresponding to the service center search area. The number of battery packs that are of equivalent or lower deterioration level as the battery pack which the user has, and further are leasable battery packs, stored at each service center, are displayed classified by class in accordance with the service centers (1) through (3). Accordingly, the user can make reservations for replacing the battery pack, knowing how many battery packs of equivalent or lower deterioration level that are leasable battery packs are stored by class at each service center.

The center reservation map page also has a "return to center reservation page" button C22 that the user touches to return to the center reservation page in FIG. 15B. Further, the user can make reservations by touching the service centers (1) through (3) on the map in the center reservation map page. For example, in a case where the user touches the service center (1) on the map, the displayed contents on the display unit 303 are switched from those of the center reservation map page in FIG. 15C to a reservation completed page of which an example is illustrated in FIG. 15D.

The reservation completed page has a display region C31 displaying information to the effect that reservation of the battery pack has been completed, and so forth. The reservation completed page is also provided with a "close" button C32 to close the reservation completed page being displayed on the display unit 303. When the user touches the "reserve" button C11 in the center reservation page in FIG. 15B, the displayed contents on the display unit 303 are switched from those of the center reservation page in FIG. 15B to the reservation completed page in FIG. 15D.

Figure 16B:
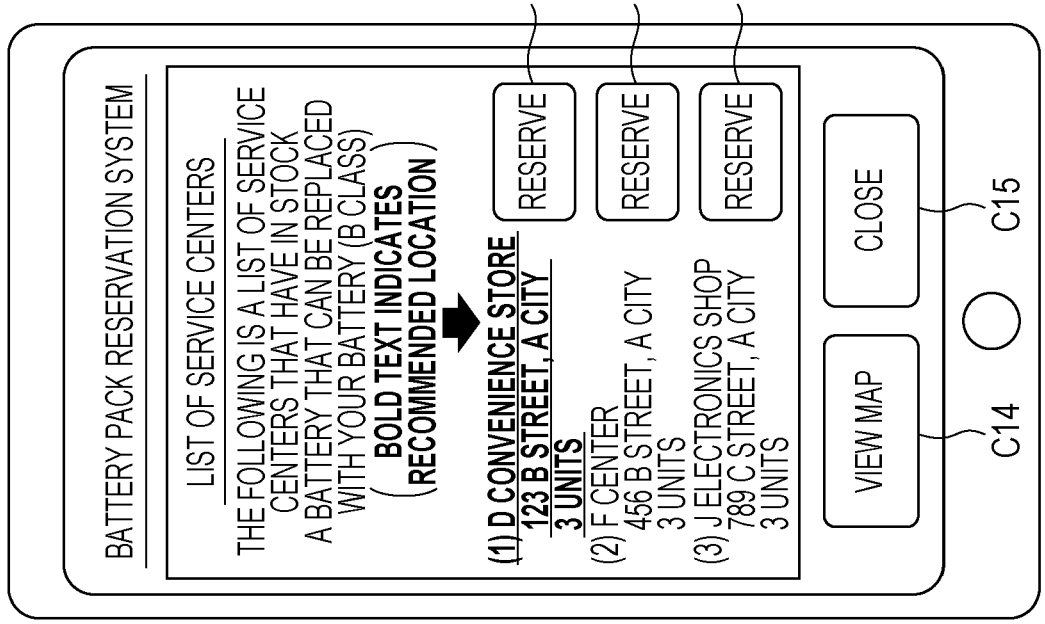
FIGS. 16A through 16D illustrate another example of transition of displayed contents regarding making a reservation for replacement of a battery pack, in the battery reservation application.
Figure 16A:
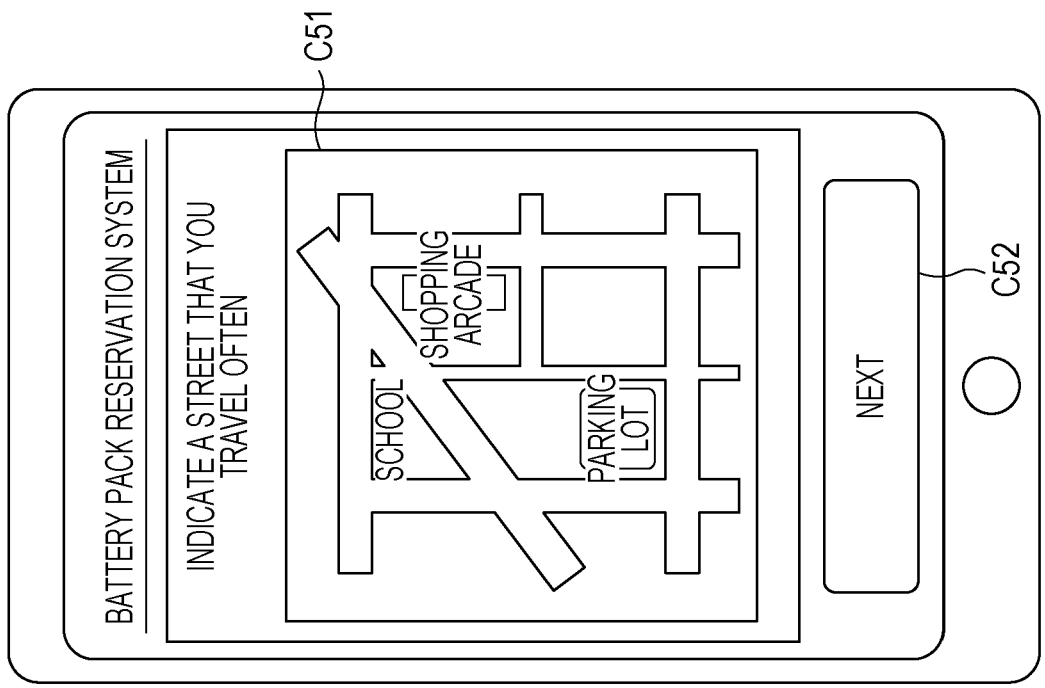

Other Example of Transition of Displayed Pages when Using Battery Replacement Reservation Function FIGS. 16A through 16D illustrate another example of transition of displayed contents regarding making a reservation for replacement of a battery pack, in the battery reservation application. FIGS. 16A through 16D illustrate an example where "near to route often traveled" has been set as the area. FIG. 11 is the top page of the battery reservation app, and when the user touches the "reservation for fully-charged battery pack replacement" button A2 in this top page, the displayed contents on the display unit 303 are switched from those of the top page in FIG. 11 to a route instruction page, of which an example is illustrated in FIG. 16A.

The route instruction page has a route instruction region C51 where a map is displayed. The user can instruct a route often traveled by pressing a finger or the like against the route instruction region C51 and tracing streets. The route instruction page also has a "next" button C52. When the user touches the "next" button C52 on the route instruction page, the displayed contents on the display unit 303 are switched from those of the route instruction page in FIG. 16A to a center reservation page, of which an example is illustrated in FIG. 16B.

Figure 16D:
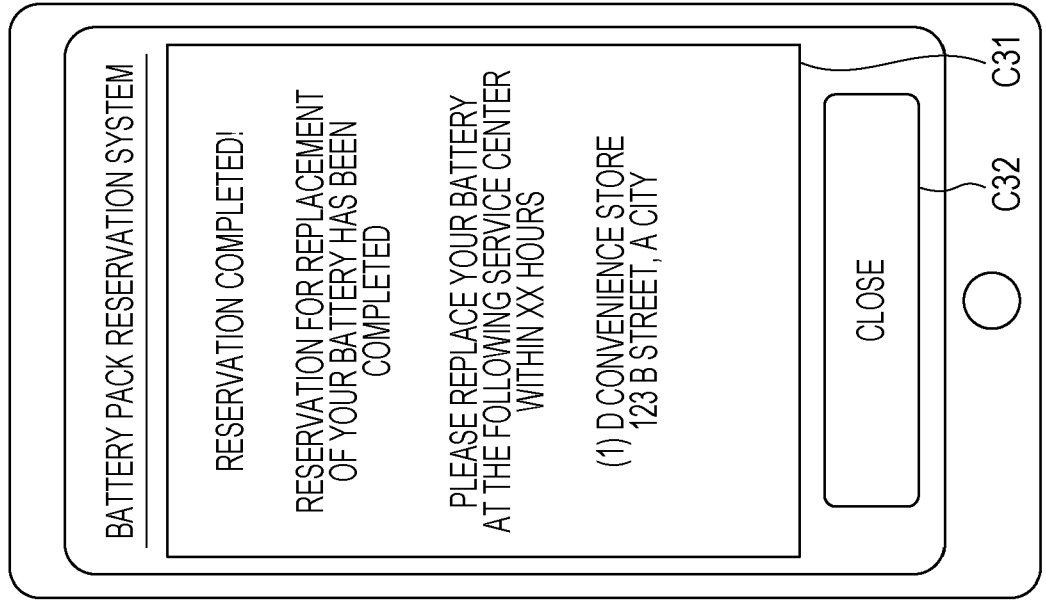
Figure 16C:
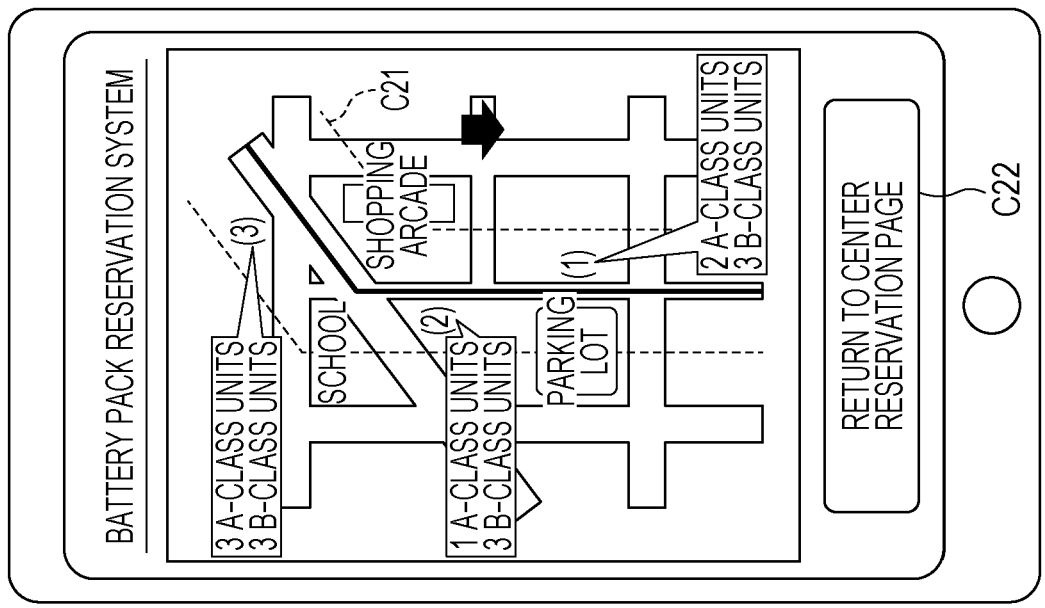

FIGS. 16B, 16C, and 16D correspond to FIGS. 15B, 15C, and 15D. A maximum of three service centers (1) through (3) are displayed in FIG. 16A. The displayed service centers satisfy the following.

(A) Service centers that exist within the search area for service centers set by the area setting function.

(B) Service centers that have a battery pack that is of an equivalent deterioration level as the battery pack which the user has, and further, the battery pack is a leasable battery pack.

(C) The three service centers closest to the route that the user often travels that satisfy (A) and (B). The service centers (1) through (3) are in closest order from the route often traveled.

Figure 17A:
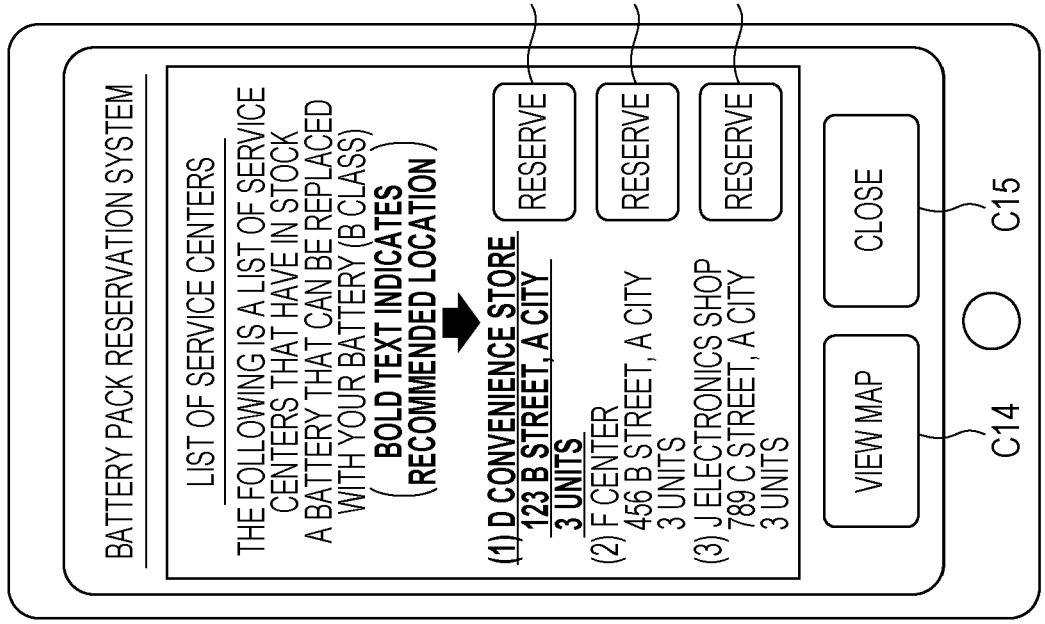
FIGS. 17A through 17D illustrate a further example of transition of displayed contents regarding making a reservation for replacement of a battery pack, in the battery reservation application.

Further Example of Transition of Displayed Pages when Using Battery Replacement Reservation Function FIGS. 17A through 17D illustrate a further example of transition of displayed contents regarding making a reservation for replacement of a battery pack, in the battery reservation application. FIGS. 17A through 17D illustrate an example where "near to home" has been set as the area. FIG. 11 is the top page of the battery reservation app, and when the user touches the "reservation for fully-charged battery pack replacement" button A2 in this top page, the displayed contents on the display unit 303 are switched from those of the top page in FIG. 11 to a home input page, of which an example is illustrated in FIG. 17A.

The home input page has an address input region C61 for the user to input the address of his/her own home, and also has a "next" button C62. Alternatively, an arrangement may be made where the home address can be input by touching a map. When the user touches the "next" button C62 on the home input page, the displayed contents on the display unit 303 are switched from those of the home input page in FIG. 17A to a center reservation page, of which an example is illustrated in FIG. 17B.

Figure 17B:
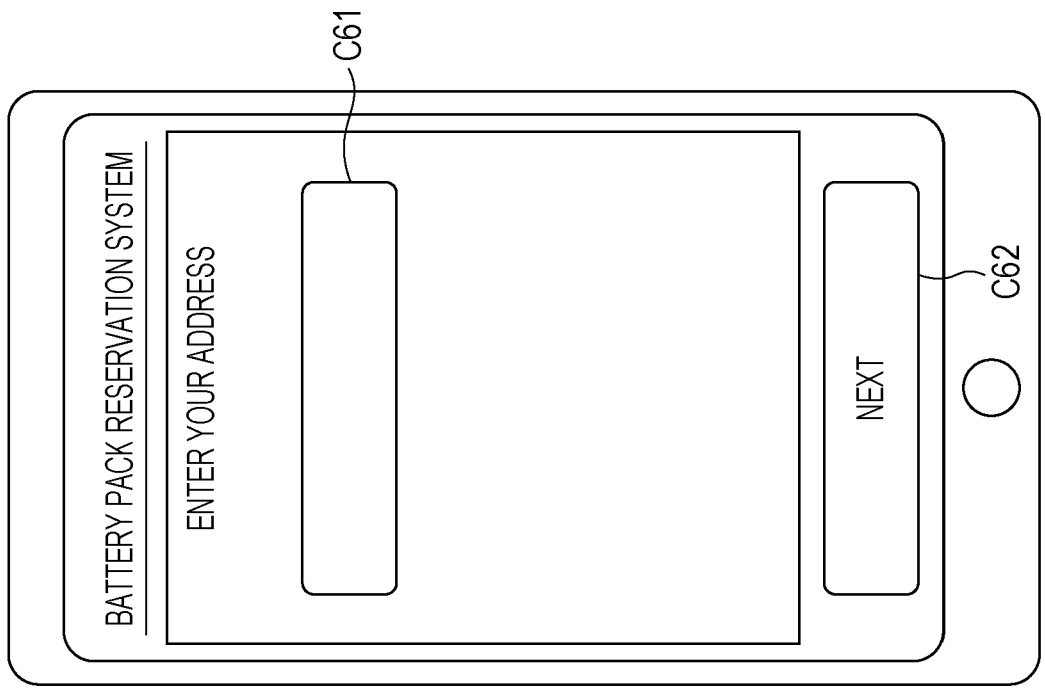
Figure 17D:
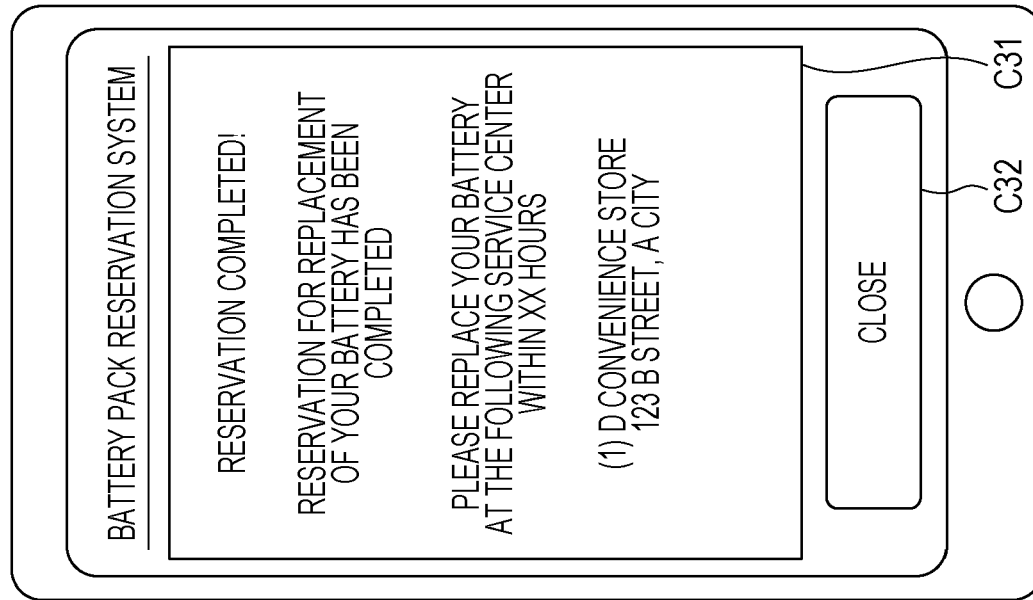
Figure 17C:
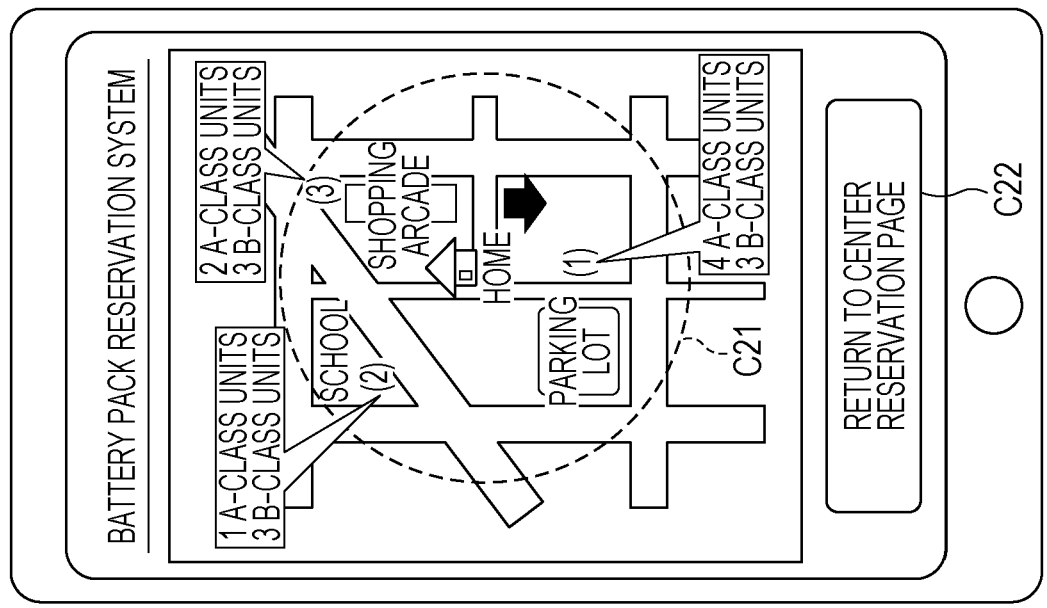

FIGS. 17B, 17C, and 17D correspond to FIGS. 15B, 15C, and 15D. A maximum of three service centers (1) through (3) are displayed in FIG. 17B. The displayed service centers satisfy the following.

(A) Service centers that exist within the search area for service centers set by the area setting function.

(B) Service centers that have a battery pack that is of an equivalent deterioration level as the battery pack which the user has, and further, the battery pack is a leasable battery pack.

(C) The three service centers closest to the home of the user that satisfy (A) and (B). The service centers (1) through (3) are in closest order from the home.

Figure 18B:
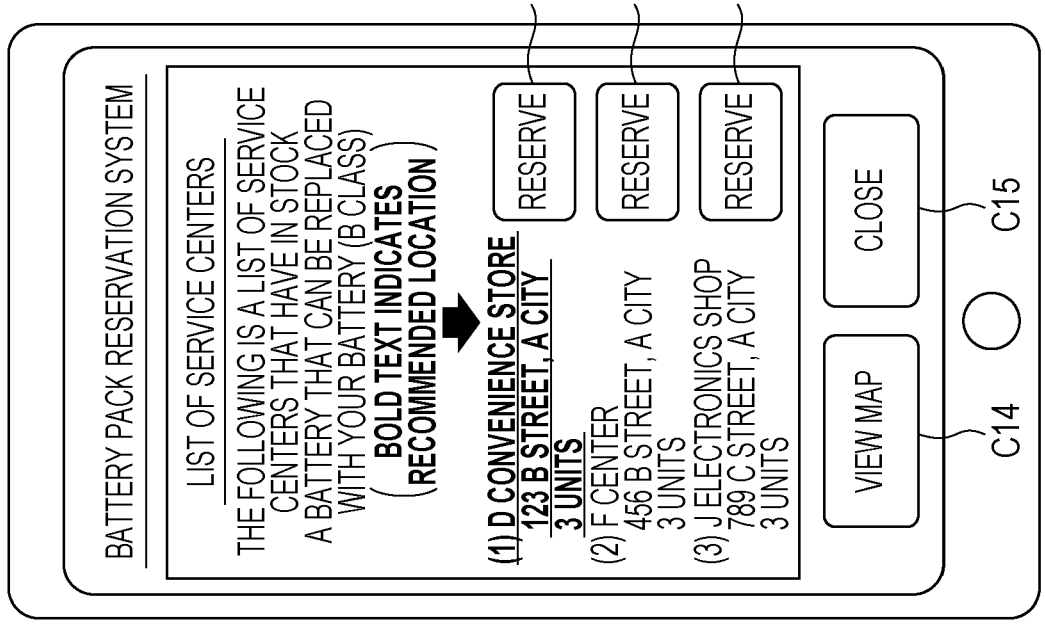
FIGS. 18A through 18D illustrate yet another example of transition of displayed contents regarding making a reservation for replacement of a battery pack, in the battery reservation application.
Figure 18A:
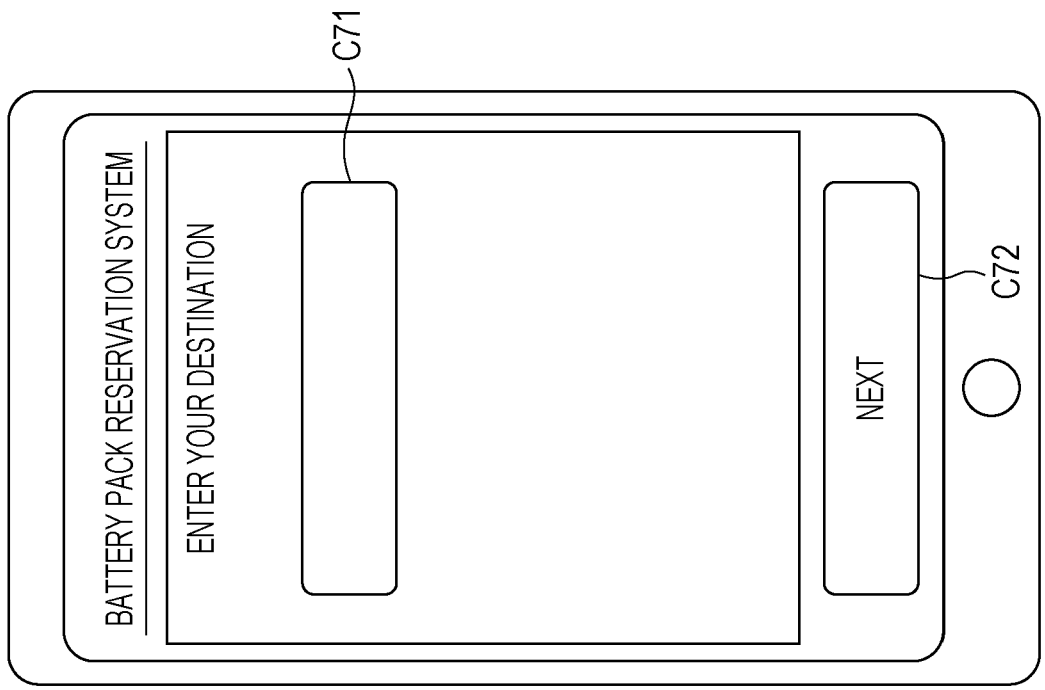

Yet Another Example of Transition of Displayed Pages when Using Battery Replacement Reservation Function FIGS. 18A through 18D illustrate yet another example of transition of displayed contents regarding making a reservation for replacement of a battery pack, in the battery reservation application. FIGS. 18A through 18D illustrate an example where "near to route to destination" has been set as the area. FIG. 11 is the top page of the battery reservation app, and when the user touches the "reservation for fully-charged battery pack replacement" button A2 in this top page, the displayed contents on the display unit 303 are switched from those of the top page in FIG. 11 to a destination input page, of which an example is illustrated in FIG. 18A.

The destination input page has a destination input region C71 for the user to input the destination, and also has a "next" button C72. Alternatively, an arrangement may be made where the destination can be input by touching a map. When the user touches the "next" button C72 on the destination input page, the displayed contents on the display unit 303 are switched from those of the destination input page in FIG. 18A to a center reservation page, of which an example is illustrated in FIG. 18B.

Figure 18D:
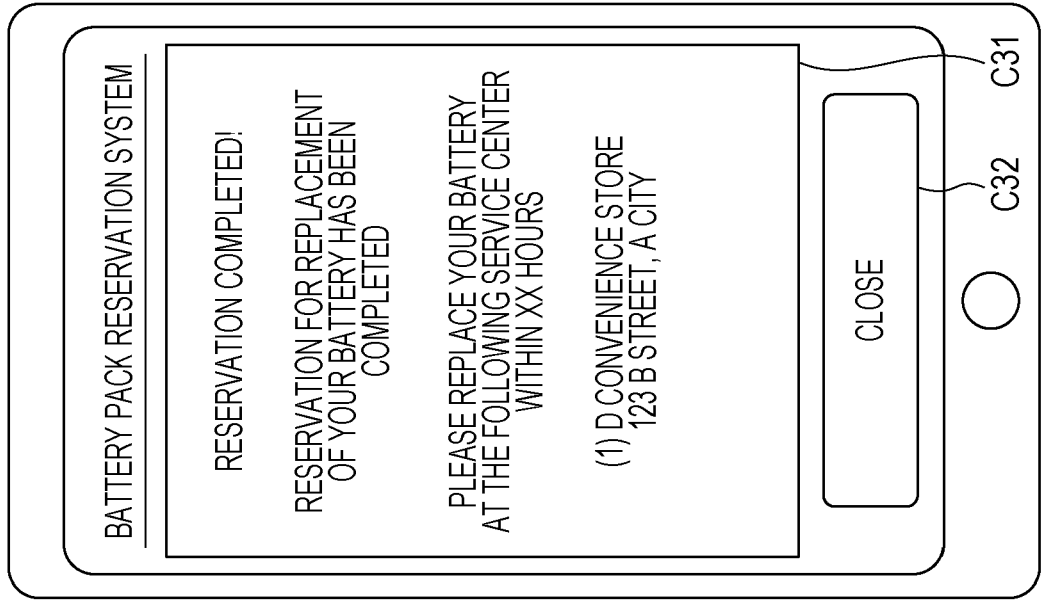
Figure 18C:
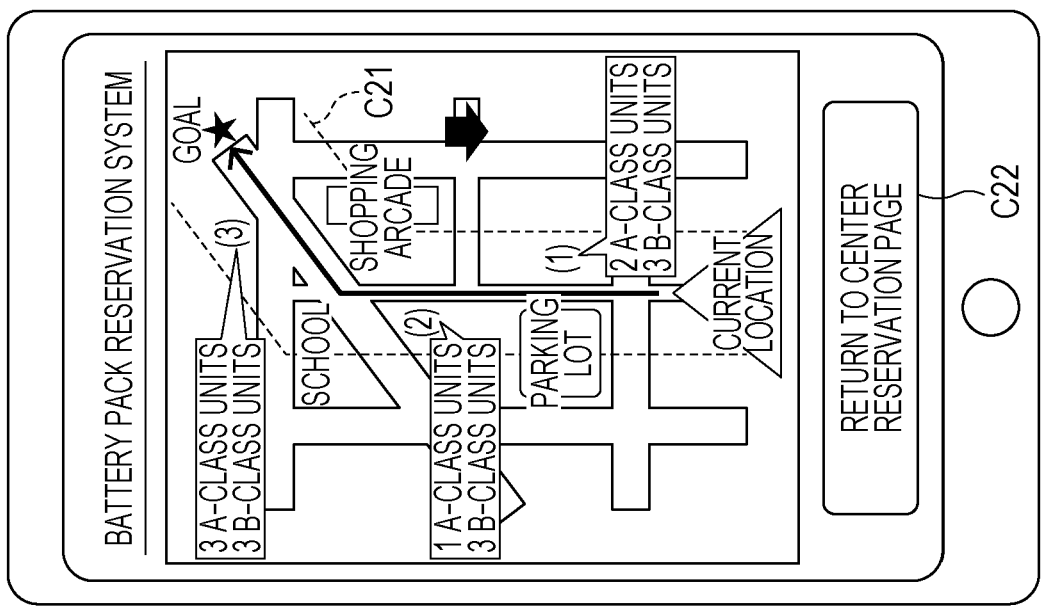

FIGS. 18B, 18C, and 18D correspond to FIGS. 15B, 15C, and 15D. A maximum of three service centers (1) through (3) are displayed in FIG. 18B. The displayed service centers satisfy the following.

(A) Service centers that exist within the search area for service centers set by the area setting function.

(B) Service centers that have a battery pack that is of an equivalent deterioration level as the battery pack which the user has, and further, the battery pack is a leasable battery pack.

(C) The three service centers closest to the route from the current location to the destination that satisfy (A) and (B).

The service centers (1) through (3) are in closest order from the route from the current location to the destination.

Example of Notification Page of Battery Reservation App

Figure 19A:
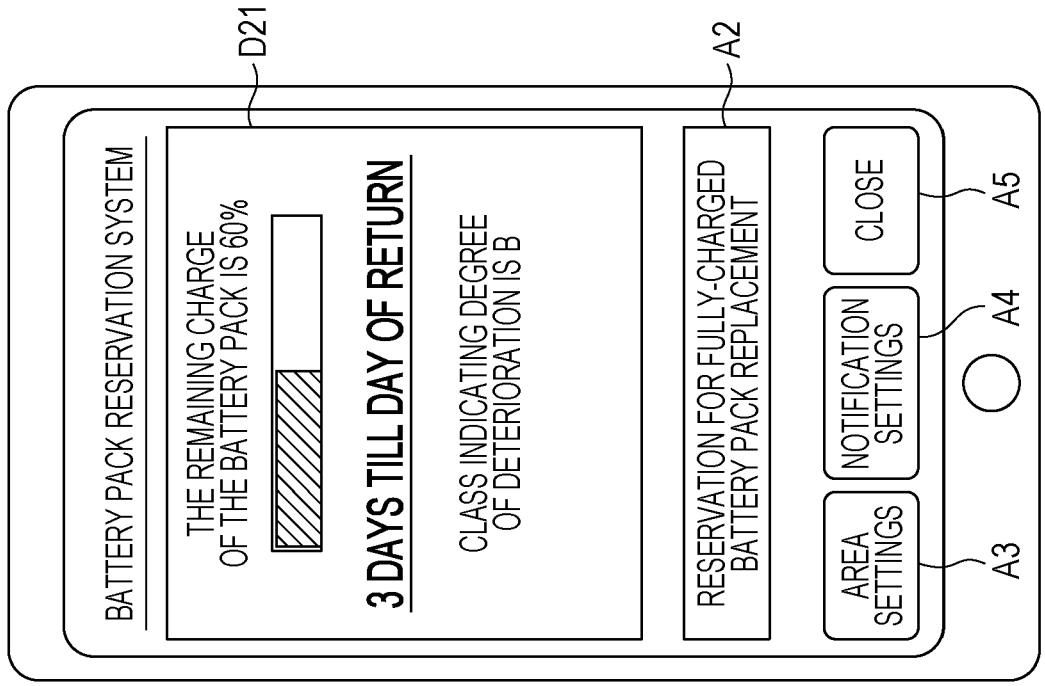
FIGS. 19A and 19B illustrate examples of notification regarding a battery pack, in the battery reservation application.
Figure 19B:
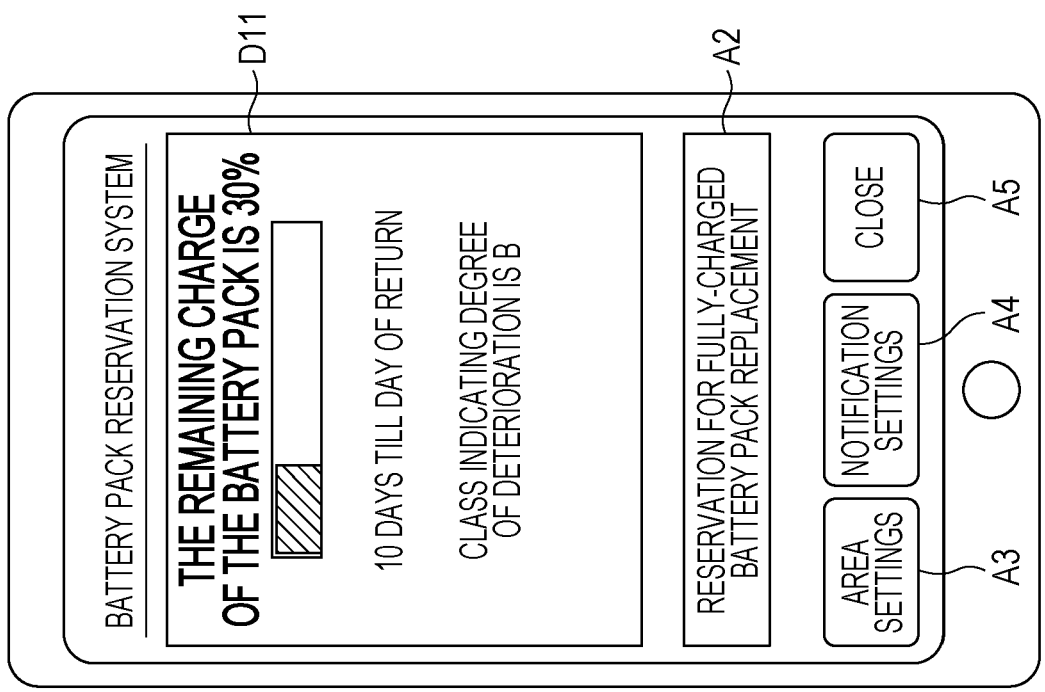

FIGS. 19A and 19B illustrate examples of notification pages for "when remaining charge is low" and "periodically" in the battery reservation application. The notification pages for "when remaining charge is low" and "periodically" respectively have a display region D11 and display region D21, for displaying battery information of the battery pack 5 or rental period information thereof, communicated wirelessly with the information terminal 3. In the examples in FIGS. 19A and 19B, the remaining charge of the battery pack and the class indicating the degree of deterioration thereof is displayed as battery information. The number of days till the return day is displayed as rental period information. Alternatively, an arrangement may be made where the date of the return day is displayed instead of the number of days till the return day.

Note that the remaining charge of the battery pack is displayed in heavier and larger font then the other information in the display region D11 of the notification page for "when remaining charge is low". This display of remaining charge of the battery pack notifies the user that the remaining charge is low. A display may be included to this notification page, to the effect that the remaining charge of the battery pack is low, in addition to or instead of the remaining charge of the battery pack.

In the same way, information of the rental period of the battery pack is displayed in heavier and larger font then the other information in the display region D21 of the notification page for "periodically". The other buttons A2 through A5 are the same as the buttons A2 through A5 described in FIG. 11.

Processing at Information Terminal

Main Processing at Information Terminal

Figure 20:
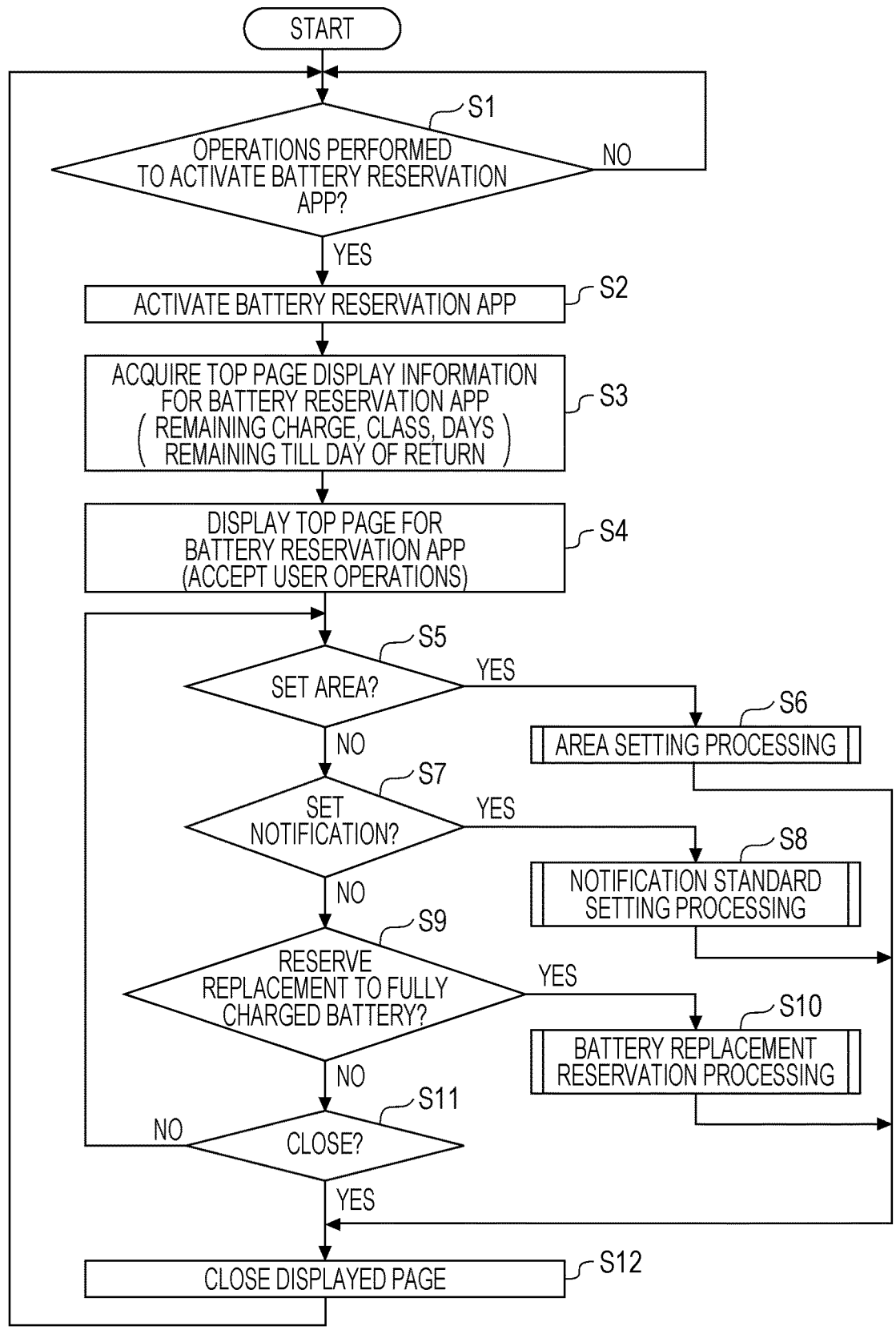
FIG. 20 is a flowchart illustrating a main processing flow of the information terminal in FIG. 9.

FIG. 20 is a flowchart illustrating a main processing flow of the information terminal in FIG. 9. The control unit 304 of the information terminal 3 determines whether or not the user has performed an operation to activate the battery reservation app, based on signals input from the operating unit 302 (step S1). In a case where determination is made that the user has not performed an operation to activate the battery reservation app (No in S1), the control unit 304 returns to the processing in step S1. On the other hand, in a case where determination is made that the user has performed an operation to activate the battery reservation app (Yes in S1), the control unit 304 activates and executes the battery reservation app based on the battery reservation application program stored in the storage unit 301 (step S2).

The battery reservation processing unit 311 acquires display information for the top page of the battery reservation app (step S3). This display information includes remaining charge information indicating the remaining charge, class information indicating the class of the battery pack, and rental period information indicating the number of days till the return day of the battery pack.

An example of the processing in step S3 is as follows. The battery reservation processing unit 311 controls the communication unit 306 to transmit a search signal via the antenna 306a, to search for battery packs in the periphery, by broadcasting or multicasting. A battery pack which has received this search signal transmits a response signal including its own battery ID and remaining charge information indicating the remaining charge detected by the detecting unit 505. The battery reservation processing unit 311 receives this response signal.

The battery reservation processing unit 311 then controls the communication unit 305 to transmit a request signal for top page display information to the server device 11, via the antenna 305a. This request signal includes the received battery ID and remaining charge information. The control unit 102 of the server device 11 receives this request signal, references the battery management database 114, and identifies the class of the battery pack of which the battery ID is included in the request signal. The server device 11 also references the rental management database 113, identifies the date of rental of the battery pack of the battery ID and the rental period thereof, and based on these calculates the number of days till return. The server device 11 then generates display information for the top page of the battery reservation app and transmits it to the information terminal 3. The information terminal 3 receives this display information. The display information includes the remaining charge information included in the request signal, class information indicating the identified class, and rental period information indicating the number of days till return that has been calculated. This so far has been description of an example of the processing in step S3.

The battery reservation processing unit 311 displays the top page of the battery reservation app (see FIG. 11) on the display unit 303, based on the top page display information received from the server device 11. The battery reservation processing unit 311 then accepts user operations at the top page, based on input signals from the operating unit 302 (step S4). The user touches one of buttons A2 through A5 on the top page.

The battery reservation processing unit 311 determines whether or not the user has touched the "area settings" button A3 (step S5). In a case where determination is made that the "area settings" button A3 has been touched (Yes in S5), the battery reservation processing unit 311 executes area setting processing (step S6).

On the other hand, in a case where determination is made that the "area settings" button A3 has not been touched (No in S5), the battery reservation processing unit 311 determines whether or not the user has touched the "notification settings" button A4 (step S7). In a case where determination is made that the "notification settings" button A4 has been touched (Yes in S7), the battery reservation processing unit 311 executes notification standard setting processing (step S8).

On the other hand, in a case where determination is made that the "notification settings" button A4 has not been touched (No in S7), the battery reservation processing unit 311 determines whether or not the user has touched the "reservation for fully-charged battery pack replacement" button A2 (step S9). In a case where determination is made that the "reservation for fully-charged battery pack replacement" button A2 has been touched (Yes in S9), the battery reservation processing unit 311 executes battery replacement reservation processing (step S10).

On the other hand, in a case where determination is made that the "reservation for fully-charged battery pack replacement" button A2 has not been touched (No in S9), the battery reservation processing unit 311 determines whether or not the user has touched the "close" button A5 (step S11). In a case where determination is made that the "close" button A5 has not been touched (No in S11), the battery reservation processing unit 311 returns to the processing of step S5. On the other hand, in a case where determination is made that the "close" button A5 has been touched (Yes in S11), The battery reservation processing unit 311 closes the page displayed on the display unit 303 (step S12).

Area Setting Processing for Information Terminal

Figure 21:
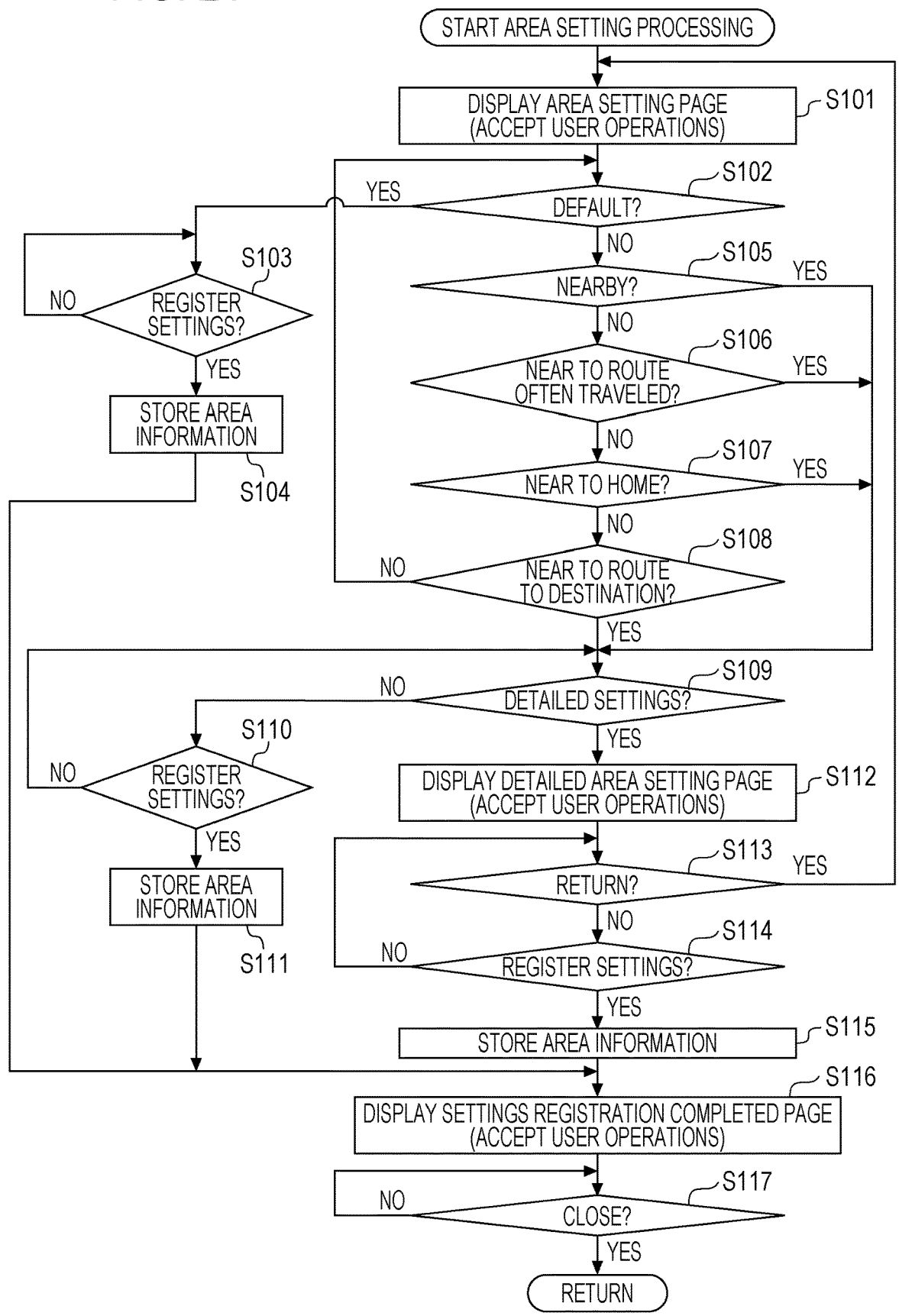
FIG. 21 is a flowchart illustrating an area setting processing flow in FIG. 20.

FIG. 21 is a flowchart illustrating the area setting processing flow in FIG. 20. In a case where the user touches the "area settings" button A3 in the top page of the battery reservation app, the area setting unit 321 displays the area setting page (FIG. 12B) on the display unit 303. The area setting unit 321 then accepts user operations on the area setting page, based on input signals from the operating unit 302 (step S101). The user touches one of the buttons A11 through A15 in the area setting page, and then touches the "register settings" button A17. Alternatively the user touches one of the buttons A11 through A14 in the area setting page, and then touches the "detailed settings" button A16.

The area setting unit 321 determines whether or not the user has touched the "default" button A15 (step S102). In a case where determination is made that the user has touched the "default" button A15 (Yes in S102), the area setting unit 321 determines whether or not the user has touched the "register settings" button A17 (step S103). In a case where determination is made that the "register settings" button A17 has not been touched (No in S103), the area setting unit 321 returns to the processing in step S103. On the other hand, in a case where determination is made that the "register settings" button A17 has been touched (Yes in S103), the area setting unit 321 stores information, in the storage unit 301, of an area to search for service centers as the set area information, based on the default setting contents (step S104). The processing in step S116 is then carried out.

In a case where determination is made in step S102 that the user has not touched the "default" button A15 (No in S102), the area setting unit 321 determines whether or not the user has touched the "nearby" button A11 (step S105). In a case where determination is made that the "nearby" button A11 has been touched (Yes in S105), the area setting unit 321 advances to the processing in step S109.

On the other hand, in a case where determination is made that the "nearby" button A11 has not been touched (No in S105), the area setting unit 321 determines whether or not the user has touched the "near to route often traveled" button A12 (step S106). In a case where determination is made that the user has touched the "near to route often traveled" button A12 (Yes in S106), the area setting unit 321 advances to the processing in step S109.

On the other hand, in a case where determination is made that the "near to route often traveled" button A12 has not been touched (No in S106), the area setting unit 321 determines whether or not the user has touched the "near to home" button A13 (step S107). In a case where determination is made that the user has touched the "near to home" button A13 (Yes in S107), the area setting unit 321 advances to the processing in step S109.

On the other hand, in a case where determination is made that the "near to home" button A13 has not been touched (No in S107), the area setting unit 321 determines whether or not the user has touched the "near to route to destination" button A14 (step S108). In a case where determination is made that the user has touched the "near to route to destination" button A14 (Yes in S108), the area setting unit 321 advances to the processing in step S109. On the other hand, in a case where determination is made that the user has not touched the "near to route to destination" button A14 (No in S108), the area setting unit 321 returns to the processing of step S102.

In step S109, the area setting unit 321 makes determination regarding whether or not the user has touched the "detailed settings" button A16 (step S109). In a case where determination is made that the user has not touched the "detailed settings" button A16 (No in S109), the area setting unit 321 determines whether or not the user has touched the "register settings" button A17 (step S110). In a case where determination is made that the "register settings" button A17 has not been touched (No in S110), the area setting unit 321 returns to the processing in step S109.

On the other hand, in a case where determination is made that the "register settings" button A17 has been touched (Yes in S110), the area setting unit 321 stores in formation indicating the search area of service centers based on the area of the one of the buttons A11 through A14 that has been touched, and the distance that has been set, as set area information in the storage unit 301 (step S111). The processing of step S116 is then carried out.

The search area for service centers that the area information stored in the storage unit 301 in step S111 indicates is as follows. In a case where the set area is "nearby", the search area for service centers is an area within the set distance from the current location. In a case where the set area is "near to route often traveled", the search area for service centers is an area within the set distance from the route often traveled. In a case where the set area is "near to home", the search area for service centers is an area within the set distance from home. In a case where the set area is "near to route to destination", the search area for service centers is an area within the set distance from the route to the destination from the current location.

In a case where determination is made in step S109 that the "detailed settings" button A16 has been touched (Yes in S109), the area setting unit 321 displays on the display unit 303 a detailed area setting page corresponding to the area according to the one of the buttons A11 through A14 that has been touched. The area setting unit 321 then accepts user operations on the detailed area setting page based on input signals from the operating unit 302 (step S112). For example, in a case where the user has touched the "nearby" button A11 and subsequently touched the "detailed settings" button A16, the detailed area setting page for "nearby", of which an example is illustrated in FIG. 12C, is displayed on the display unit 303. In the detailed area setting page, the user uses the distance setting window A21 to instruct the distance, and then touches the "register settings" button A23. Alternatively, the user touches the "return" button A22.

The area setting unit 321 determines whether or not the user has touched the "return" button A22 (step S113). In a case where determination is made that the user has touched the "return" button A22 (Yes in S113), the area setting unit 321 returns to the processing of step S101. On the other hand, in a case where determination is made that the "return" button A22 has not been touched (No in S113), the area setting unit 321 determines whether or not the user has touched the "register settings" button A23 (step S114). In a case where determination is made that the "register settings" button A23 has not been touched (No in S114), the area setting unit 321 returns to the processing of step S113.

On the other hand, in a case where determination is made that the "register settings" button A23 has been touched (Yes in S114), the area setting unit 321 stores in the storage unit 301 information indicating the search area for service centers, based on the area according to the one of the buttons A11 through A14 that has been touched and the distance instructed by the distance setting window A21, as set area information (step S115). The processing of step S116 is then carried out.

The search area for service centers that the area information stored in the storage unit 301 in step S115 indicates is as follows. In a case where the set area is "nearby", the search area for service centers is an area within the distance instructed by the user from the current location. In a case where the set area is "near to route often traveled", the search area for service centers is an area within the distance instructed by the user from the route often traveled. In a case where the set area is "near to home", the search area for service centers is an area within the distance instructed by the user from home. In a case where the set area is "near to route to destination", the search area for service centers is an area within the distance instructed by the user from the route to the destination from the current location.

In step S116, the area setting unit 321 displays the settings registration completed page (see FIG. 12D) on the display unit 303. The area setting unit 321 then accepts user operations on the settings registration completed page based on input signals from the operating unit 302 (step S116). After having confirmed the contents of the settings registered in the display region A31, the user touches the "close" button A32.

The area setting unit 321 determines whether or not the user has touched the "close" button A32 (step S117). In a case where determination is made that the user has not touched the "close" button A32 (No in S117), the area setting unit 321 returns to the processing of step S117. On the other hand, in a case where determination is made that the user has touched the "close" button A32 (Yes in S117), the battery reservation processing unit 311 returns to the main flow in FIG. 11.

Notification Standard Setting Processing for Information Terminal

Figure 22:
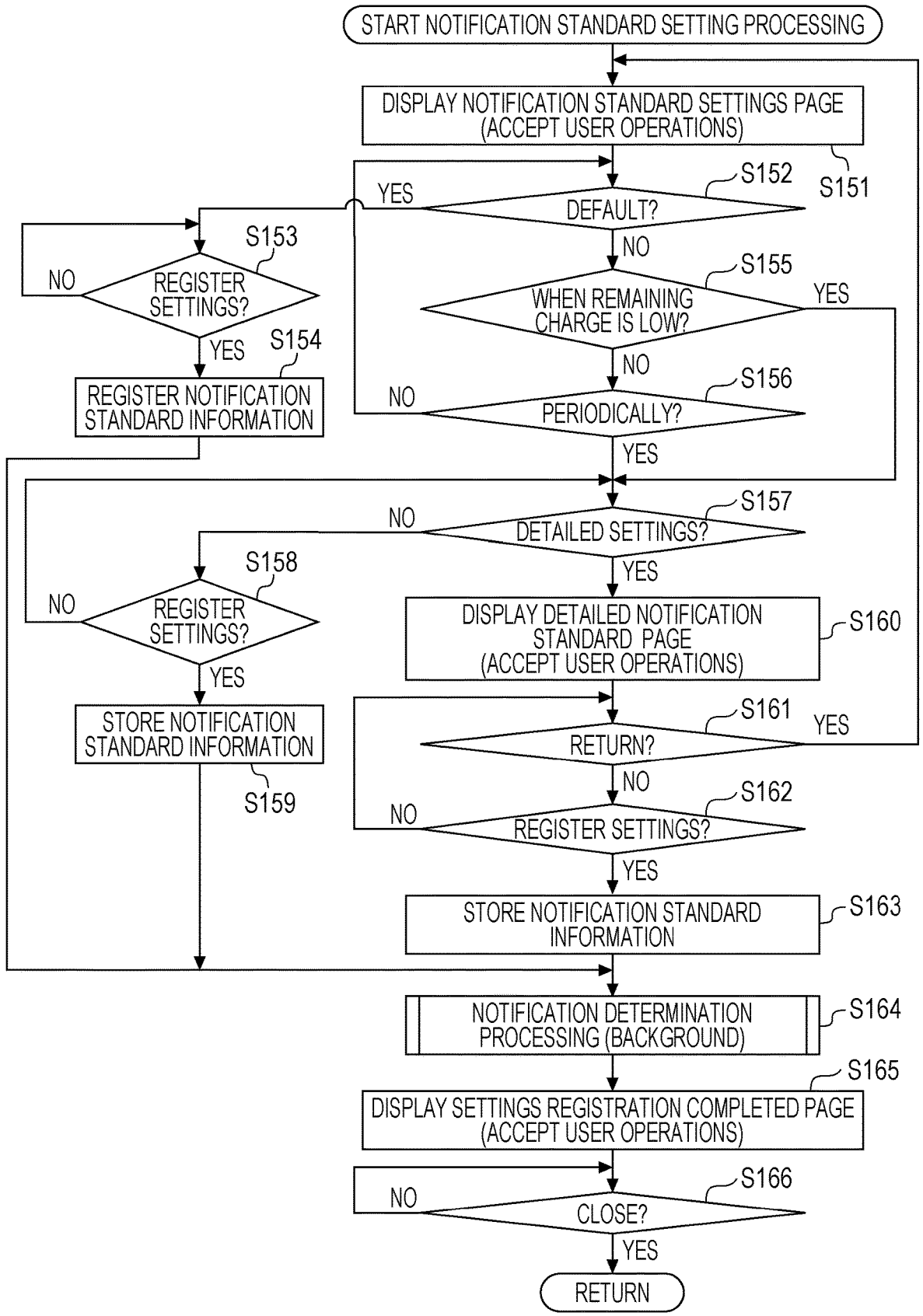
FIG. 22 is a flowchart illustrating a notification standard setting processing flow in FIG. 20.

FIG. 22 is a flowchart illustrating the notification standard setting processing flow in FIG. 20. Upon the user touching the "notification settings" button A4 in the top page of the battery reservation app, the notification standard setting unit 323 displays the notification standard setting page (see FIGS. 13B and 14B) on the display unit 303. The notification standard setting unit 323 then accepts user operations on the notification standard setting page based on input signals from the operating unit 302 (step S151). The user touches one of the buttons B11 through B13 on the notification standard setting page, and subsequently touches the "register settings" button B15. Alternatively, the user touches one of the buttons B11 and B12, and subsequently touches the "detailed settings" button B14.

The notification standard setting unit 323 determines whether or not the user has touched the "default" button B13 (step S152). In a case where determination is made that the user has touched the "default" button B13 (Yes in step S152), the notification standard setting unit 323 determines whether or not the user has touched the "register settings" button B15 (step S153). In a case where determination is made that the user has not touched the "register settings" button B15 (No in S153), the notification standard setting unit 323 returns to the processing in step S153. On the other hand, in a case where determination is made that the user has touched the "register settings" button B15 (Yes in S153), the notification standard setting unit 323 stores notification standard information indicating the notification timing based on the default setting contents in the storage unit 301 (step S154). The processing of step S164 is then performed.

The In a case where the notification standard setting unit 323 has determined that the "default" button B13 has not been touched (No in S152), determination is made regarding whether or not the user has touched the "when remaining charge is low" button B11 (step S155). In a case where determination is made that the user has touched the "when remaining charge is low" button B11 (Yes in S155), the notification standard setting unit 323 advances to the processing of step S157.

On the other hand, in a case where determination is made that the user has not touched the "when remaining charge is low" button B11 (No in S155), the notification standard setting unit 323 determines whether or not the user has touched the "periodically" button B12 (step S156). In a case where determination is made that the "periodically" button B12 has been touched (Yes in S156), the notification standard setting unit 323 advances to the processing of step S157. On the other hand, in a case where determination is made that the "periodically" button B12 has not been touched (No in S156), the notification standard setting unit 323 returns to the processing of step S152.

In step S157, the notification standard setting unit 323 determines whether or not the user has touched the "detailed settings" button B14 (step S157). In a case where determination is made that the user has not touched the "detailed settings" button B14 (No in S157), the notification standard setting unit 323 determines whether or not the user has touched the "detailed settings" button B15 (step S158). In a case where determination is made that the user has not touched the "detailed settings" button B15 (No in S158), the notification standard setting unit 323 returns to the processing of step S157.

On the other hand, in a case where determination is made that the user has touched the "detailed settings" button B15 (Yes in S158), the notification standard setting unit 323 stores in the storage unit 301 notification standard information, indicating a notification timing based on the notification standard "when remaining charge is low" of the touched button B11 and the set remaining charge, or a notification timing based on the notification standard "periodically" of the touched button B12 and the set interval of days (step S159). The processing of step S164 is then carried out.

In a case where determination is made in step S157 that the "detailed settings" button B14 has been touched (Yes in S157), the notification standard setting unit 323 displays a notification standard setting page corresponding to the notification standard of the one of the buttons B11 and B12 that has been touched, on the display unit 303. The notification standard setting unit 323 then accepts user operations on the notification standard setting page, based on input signals from the operating unit 302 (step S160).

For example, in a case where the user has touched the button B11 corresponding to "when remaining charge is low" and subsequently touched the "detailed settings" button B14, the detailed notification standard setting page for "when remaining charge is low", of which an example is illustrated in FIG. 13C, is displayed on the display unit 303. In the detailed notification standard setting page, the user uses the remaining charge setting window B21 to instruct the remaining charge, and subsequently touches the "register settings" button B23. Alternatively, the user touches the "return" button B22.

In a case where the user has touched the button B12 corresponding to "periodically" and subsequently touched the "detailed settings" button B14, the detailed notification standard setting page for "periodically", of which an example is illustrated in FIG. 14C, is displayed on the display unit 303. In the detailed notification standard setting page, the user uses the number-of-days setting window B51 instruct the number of days, and subsequently touches the "register settings" button B53. Alternatively, the user touches the "return" button B52.

The notification standard setting unit 323 determines whether or not the user has touched the "return" button B22 or B52 (step S161). In a case where determination is made that the user has touched the "return" button B22 or B52 (Yes in S161), the notification standard setting unit 323 returns to the processing of step S151. On the other hand, in a case where determination is made that the user has not touched the "return" button B22 or B52 (No in S161), the notification standard setting unit 323 determines whether or not the user has touched the "register settings" button B23 or B53 (step S162). In a case where determination is made that the "register settings" button B23 or B53 has not been touched (No in S162), the notification standard setting unit 323 returns to the processing in S161.

On the other hand, in a case where determination is made that the "register settings" button B23 or B53 has been touched (Yes in S162), the notification standard setting unit 323 stores in the storage unit 301 notification standard information, indicating a notification timing based on the notification standard "when remaining charge is low" of the touched button B11 and the remaining charge instructed using the remaining charge setting window B21, or a notification timing based on the notification standard "periodically" of the touched button B12 and the number of days instructed using the number-of-days setting window B51 (step S163). The processing of step S164 is then carried out.

In step S164, the notification processing unit 324 executes notification determination processing in the background (step S164). The notification standard setting unit 323 displays a settings registration completed page (see FIGS. 13D and 14D) on the display unit 303. The notification standard setting unit 323 then accepts user operations on the settings registration completed page, based on input signals from the operating unit 302 (step S165). The user confirms the contents of the registered settings in the display region B31 or B61 in the settings registration completed page, and then touches the "close" button B32 or B62.

The notification standard setting unit 323 determines whether or not the user has touched the "close" button B32 or B62 (step S166). In a case where determination is made that the "close" button B32 or B62 has not been touched (No in S166), the notification standard setting unit 323 returns to the processing of S166. On the other hand, in a case where determination is made that the "close" button B32 or B62 has been touched (Yes in S166), the battery reservation processing unit 311 returns to the main flow in FIG. 11.

Notification Determination Processing for Information Terminal

Figure 23:
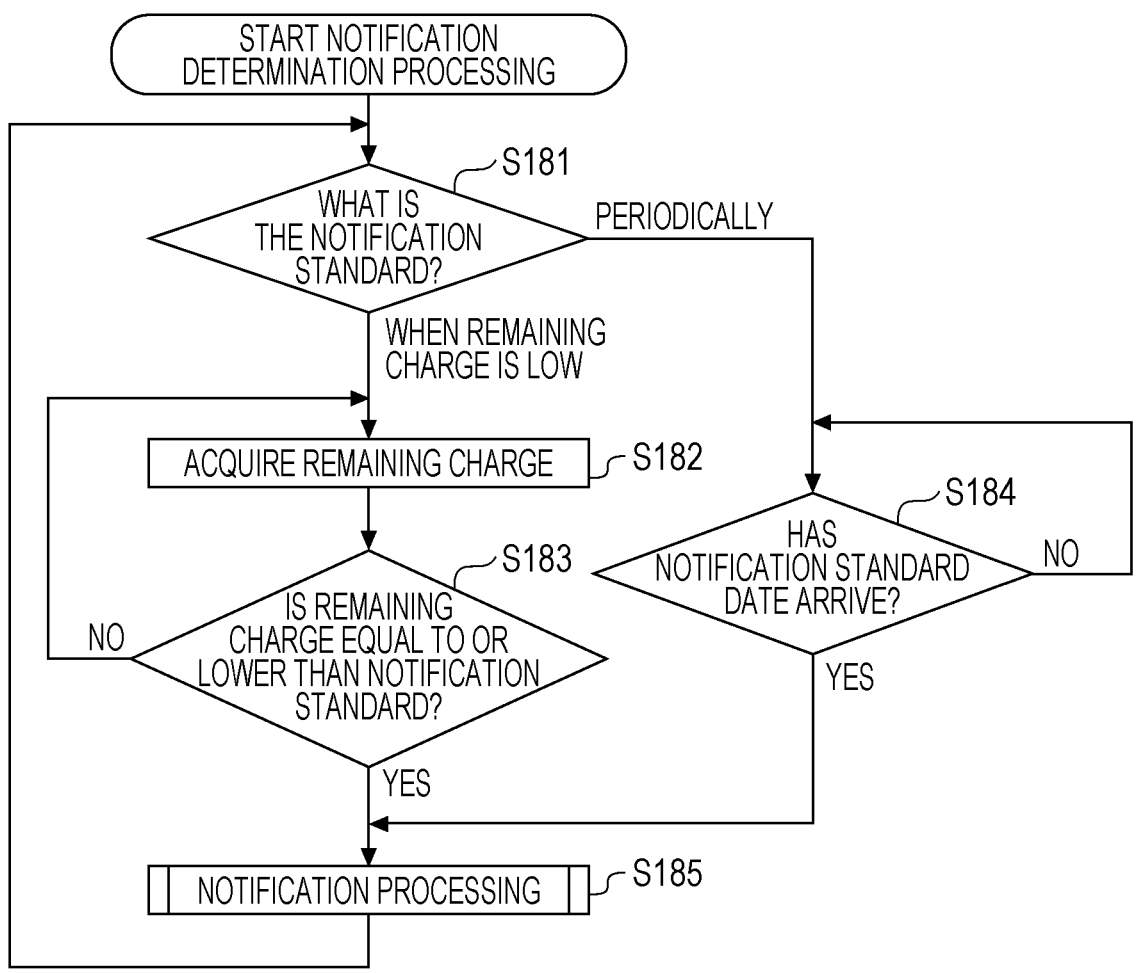
FIG. 23 is a flowchart illustrating a notification determination processing flow in FIG. 22.

FIG. 23 is a flowchart illustrating the notification determination processing flow in FIG. 22. The notification processing unit 324 determines whether the notification standard is "when remaining charge is low" or "periodically" (step S181). In a case where determination has been made in step S181 that the notification standard is "when remaining charge is low" (when remaining charge is low in S181), the notification processing unit 324 acquires remaining charge information indicating the remaining charge of the battery pack (step S182).

An example of the processing in step S182 is as follows. The notification processing unit 324 controls the communication unit 306 to transmit a search signal via the antenna 306a, to search for battery packs in the periphery, by broadcasting or multicasting. A battery pack which has received this search signal transmits a response signal including its own battery ID and remaining charge information indicating the remaining charge detected by the detecting unit 505. The notification processing unit 324 receives this response signal. This so far has been description of an example of the processing in step S182.

The notification processing unit 324 determines whether or not the remaining charge of the battery pack that the acquired remaining charge information indicates has fallen to the remaining charge according to the notification standard that the notification standard information, stored in the storage unit 301, indicates or lower (step S183). In a case where determination is made that the acquired remaining charge is not the remaining charge of the notification standard or lower (No in S183), the notification processing unit 324 returns to the processing of S182. On the other hand, in a case where determination is made that the acquired remaining charge has fallen to the remaining charge of the notification standard or lower (Yes in S183), the notification processing unit 324 executes notification processing (step S185).

In a case where determination is made in step S181 that the notification standard is "periodically" (periodically in S181), the notification processing unit 324 determines whether or not the day of the notification standard has arrived (step S184). In a case where determination is made that the day of the notification standard has not arrived (No in S184), the notification processing unit 324 returns to the processing of step S184. On the other hand, in a case where determination is made that the day of the notification standard has arrived (Yes in S184), the notification processing unit 324 executes the notification processing (step S185). Note that the day of the notification standard is a date obtained by adding the number of days in the notification interval indicated by the notification standard information stored in the storage unit 301, to the date of staring the notification determining processing, or by adding the number of days in the notification interval to the previous notification standard day.

Notification Processing at Information Terminal

Figure 24:
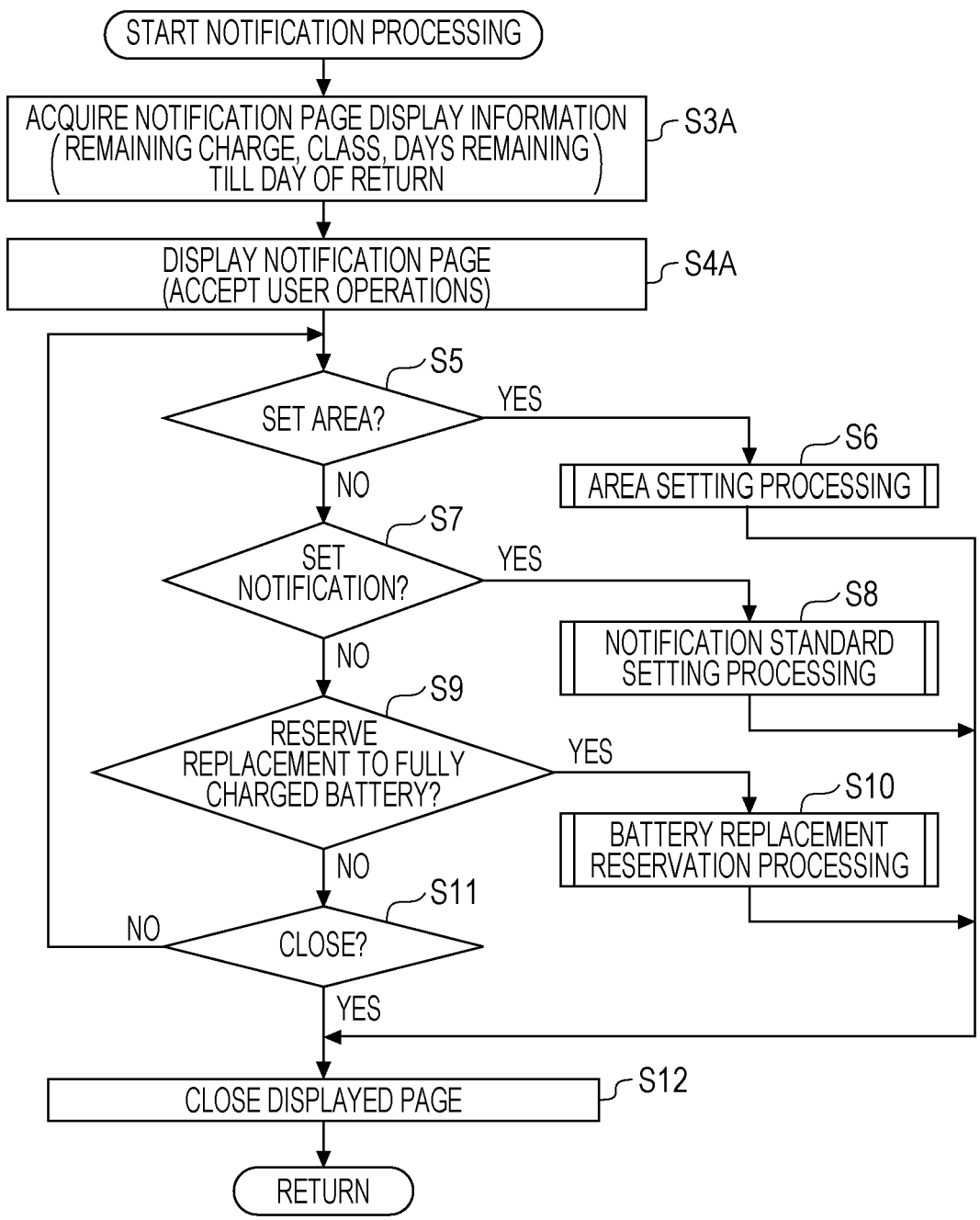
FIG. 24 is a flowchart illustrating a notification processing flow in FIG. 23.

FIG. 24 is a flowchart illustrating the notification processing flow in FIG. 23. The notification processing unit 324 acquires display information for the notification page (step S3A). This display information includes remaining charge information indicating the remaining charge, class information indicating the class of the battery pack, and rental period information indicating the number of days till the return day of the battery pack. The processing of step S3A can be performed in the same way as the processing in step S3, for example.

Based on the display information of the notification page received from the server device 11, in a case where the notification standard is "when remaining charge is low" the notification processing unit 324 displays the notification page of which an example is illustrated in FIG. 19A on the display unit 303, and in a case where the notification standard is "periodically" displays the notification page of which an example is illustrated in FIG. 19B on the display unit 303. The notification processing unit 324 then accepts user operations on the notification page based on input signals from the operating unit 302 (step S4A). Processing thereafter is essentially the same as the processing described by way of FIG. 20.

Battery Reservation Processing at Information Terminal

Figure 25:
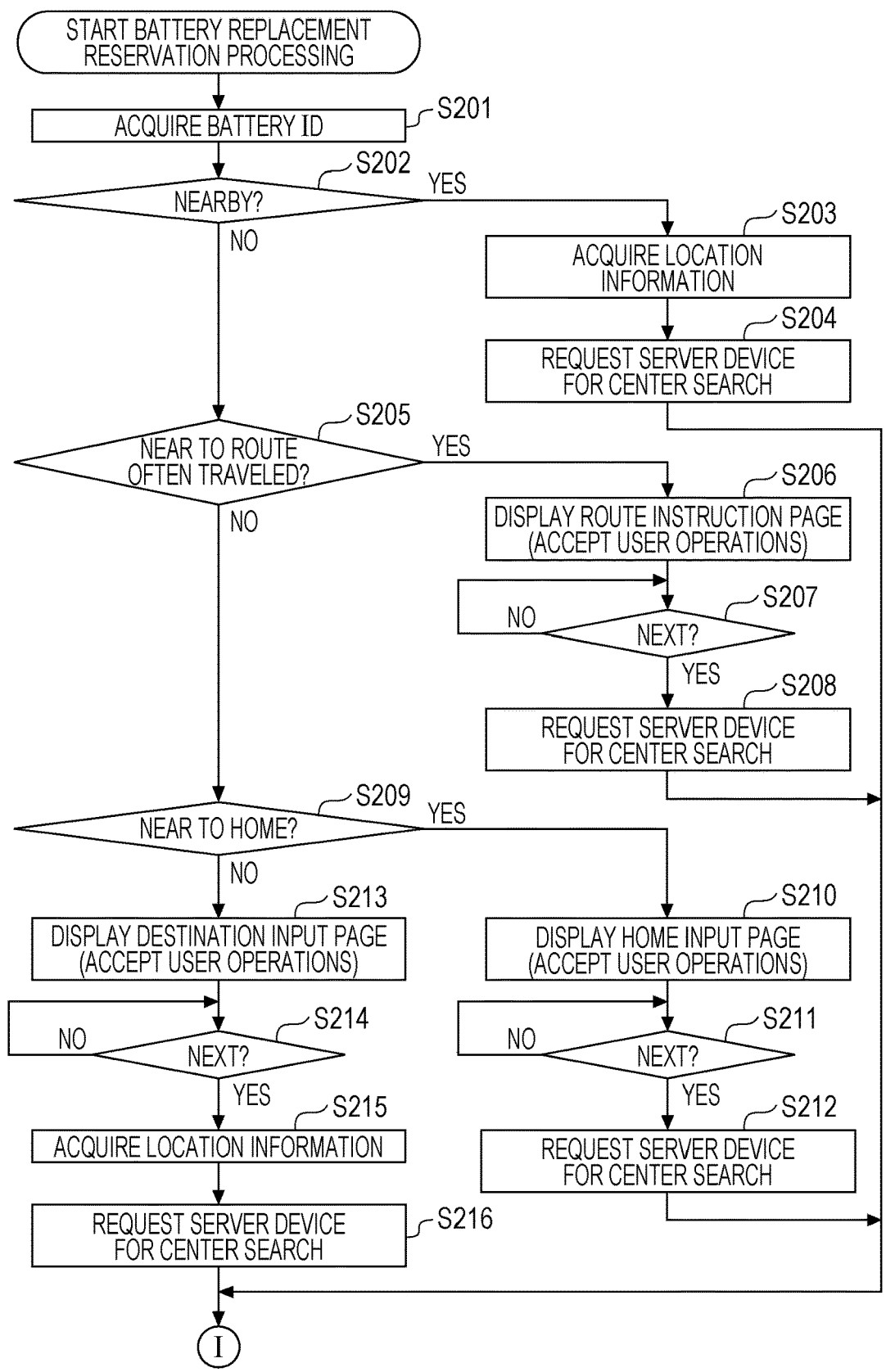
FIG. 25 is a flowchart illustrating a battery reservation processing flow in FIG. 20.
Figure 26:
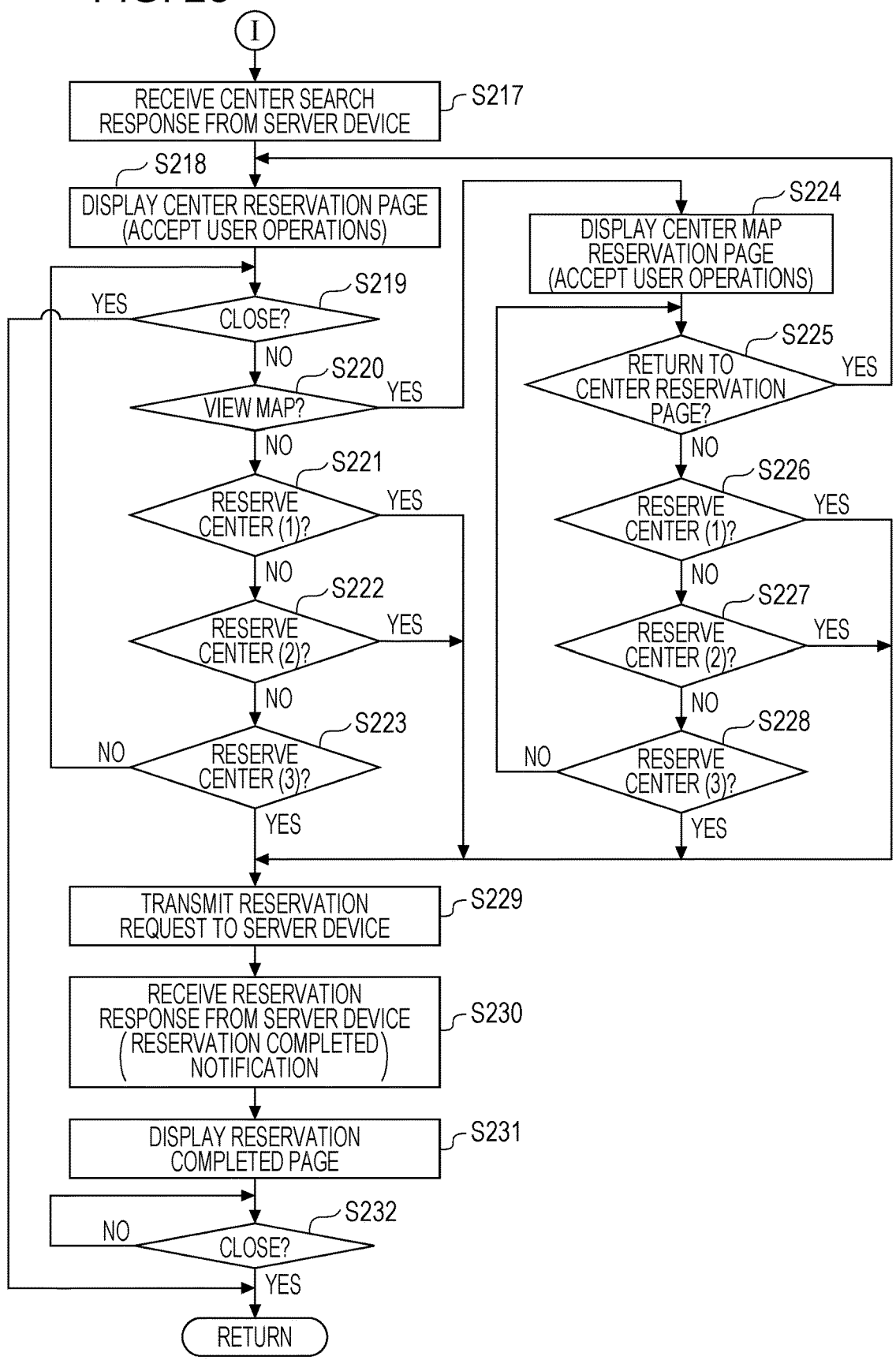
FIG. 26 is a flowchart illustrating the battery reservation processing flow in FIG. 20.

FIGS. 25 and 26 are flowcharts illustrating the battery reservation processing in FIG. 20. The battery replacement reservation unit 322 acquires the battery ID of the battery pack (step S201). An example of the processing in step S201 is as follows. The battery replacement reservation unit 322 controls the communication unit 306 to transmit a search signal via the antenna 306a, to search for battery packs in the periphery, by broadcasting or multicasting. A battery pack which has received this search signal transmits a response signal including its own battery ID. The battery replacement reservation unit 322 receives this response signal. This so far has been description of an example of the processing in step S201.

The battery replacement reservation unit 322 determines whether the set area is "nearby" or not (step S202). In a case where determination is made that the set area is "nearby" (Yes in S202), the GPS unit 307 acquires location information indicating the current location, based on radio waves received by the antenna 307a (step S203). The battery replacement reservation unit 322 then makes a center search request to the server device 11 (step S203).

This center search request includes the battery ID of the battery pack, location information indicating the current location acquired by the GPS unit 307, and area information stored in the storage unit 301. This area information indicates that an area within a set distance (X kilometers) from the current location is to be the search area for service centers. Note that X is the distance set in the area setting processing (the default distance or the distance which the user has instructed using the distance setting window A21).

The server device 11 which has received the center search request performs the following processing. Based on the battery ID, the server device 11 references the battery management database 114 to identify the class of the battery pack of this battery ID. The server device 11 then references the center management database 111 and searches for service centers within the service center search area, in the order of closest to the current location. The server device 11 references the battery management database 114, and determines whether or not a service center that has been found stores battery packs that are of equivalent or lower deterioration level as the battery pack of the battery ID, and further are leasable battery packs, based on the class of the battery pack of which the battery ID has been identified. In a case where determination is made that the service center is storing such a battery pack, the server device 11 references the battery management database 114 and identifies the number of battery packs that are of equivalent or lower deterioration level as the battery pack and are leasable battery packs, for each class. This is repeatedly performed until three service centers storing such battery packs are found, or this processing is performed on all service centers within the service center search area.

The server device 11 transmits a center search response including the display information for the center reservation page (see FIG. 15B) and the display information for the center reservation map page (see FIG. 15C) to the information terminal 3. The display information for the center reservation page includes the name and location of the up to three service centers found as a result of the search, and the number of battery packs stored in the service centers. The number of battery packs here is the number of battery packs that are of equivalent or lower deterioration level as the battery pack of the battery pack ID and are leasable battery packs. The service centers are displayed in closest order from the current location in the display information of the center reservation page, and information is included such that the service center closest to the current location is displayed as a recommended location.

The display information of the center reservation map page includes the name and location of the up to three service centers found as a result of the search, and the number of battery packs stored in the service centers, classified by class. The number of battery packs here is the number of number of battery packs that are of equivalent or lower deterioration level as the battery pack of the battery ID and are leasable battery packs. The service centers are displayed in closest order from the current location in the display information of the center reservation map page, and information is included such that the service center closest to the current location is displayed as a recommended location.

The battery replacement reservation unit 322 receives a center search response transmitted from the server device 11 (step S217), and advances to the processing in step S218. In a case where determination is made in step S202 that the set area is not "nearby" (No in S202), the battery replacement reservation unit 322 determines whether or not the set area is "near to route often traveled" (step S205).

In a case where determination is made that the set area is "near to route often traveled" (Yes in S205), the battery replacement reservation unit 322 displays the route instruction page (see FIG. 16A) on the display unit 303. The battery replacement reservation unit 322 then accepts user operations on the route instruction page based on input signals from the operating unit 302 (step S206). The user instructs a route often traveled using the route instruction region C51 in the route instruction page, and subsequently touches the "next" button C52.

The battery replacement reservation unit 322 determines whether or not the user has touched the "next" button C52 (step S207). In a case where determination is made that the user has not touched the "next" button C52 (No in S207), the battery replacement reservation unit 322 returns to the processing of S207. On the other hand, in a case where determination is made that the user has touched the "next" button C52 (Yes in S207), the battery replacement reservation unit 322 makes a search request to the server device 11 (step S208).

This center search request includes the battery ID of the battery pack, route information of the route often traveled that has been instructed, and area information stored in the storage unit 301. This area information indicates that an area within a set distance (X kilometers) from the route often traveled is to be the search area for service centers. Note that X is the distance set in the area setting processing (the default distance or the distance which the user has instructed using the distance setting window A21).

The server device 11 which has received the center search request performs the following processing. Based on the battery ID, the server device 11 references the battery management database 114 to identify the class of the battery pack of this battery ID. The server device 11 then references the center management database 111 and searches for service centers within the service center search area, in the order of closest to the route often traveled. The server device 11 references the battery management database 114, and determines whether or not a service center that has been found stores battery packs that are of equivalent deterioration level as the battery pack of the battery ID, and further are leasable battery packs, based on the class of the battery pack of which the battery ID has been identified. In a case where determination is made that the service center is storing such a battery pack, the server device 11 references the battery management database 114 and identifies the number of battery packs that are of equivalent or lower deterioration level as the battery pack and are leasable battery packs, for each class. This is repeatedly performed until three service centers storing such battery packs are found, or this processing is performed on all service centers within the service center search area.

The server device 11 transmits a center search response including the display information for the center reservation page (see FIG. 16B) and the display information for the center reservation map page (see FIG. 16C) to the information terminal 3. The display information for the center reservation page includes the name and location of the up to three service centers found as a result of the search, and the number of battery packs stored in the service centers. The number of battery packs here is the number of battery packs that are of equivalent deterioration level as the battery pack of the battery ID and are leasable battery packs. The service centers are displayed in closest order from the route often traveled in the display information of the center reservation page, and information is included such that the service center closest to the route often traveled is displayed as a recommended location.

The display information of the center reservation map page includes the name and location of the up to three service centers found as a result of the search, and the number of battery packs stored in the service centers, classified by class. The number of battery packs here is the number of number of battery packs that are of equivalent or lower deterioration level as the battery pack of the battery ID and are leasable battery packs, for each deterioration level. The service centers are displayed in closest order from the route often traveled in the display information of the center reservation page, and information is included such that the service center closest to the route often traveled is displayed as a recommended location.

The battery replacement reservation unit 322 receives a center search response transmitted from the server device 11 (step S217), and advances to the processing in step S218. In a case where determination is made in step S205 that the set area is not "near to route often traveled" (No in S205), the battery replacement reservation unit 322 determines whether or not the set area is "near to home" (step S209).

In a case where determination is made that the set area is "near to home" (Yes in S209), the battery replacement reservation unit 322 displays the home input page (see FIG. 17A) on the display unit 303. The battery replacement reservation unit 322 then accepts user operations on the home input page based on input signals from the operating unit 302 (step S210). The user inputs the home address using the address input region C61 in the home input page, and subsequently touches the "next" button C62.

The battery replacement reservation unit 322 determines whether or not the user has touched the "next" button C62 (step S211). In a case where determination is made that the user has not touched the "next" button C62 (No in S211), the battery replacement reservation unit 322 returns to the processing of S211. On the other hand, in a case where determination is made that the user has touched the "next" button C62 (Yes in S211), the battery replacement reservation unit 322 makes a center search request to the server device 11 (step S212).

This center search request includes the battery ID of the battery pack, home address information of the home address input by the user, and area information stored in the storage unit 301. This area information indicates that an area within a set distance (X kilometers) from home is to be the search area for service centers. Note that X is the distance set in the area setting processing (the default distance or the distance which the user has instructed using the distance setting window A21).

The server device 11 which has received the center search request performs the following processing. Based on the battery ID, the server device 11 references the battery management database 114 to identify the class of the battery pack of this battery ID. The server device 11 then references the center management database 111 and searches for service centers within the service center search area, in the order of closest to home. The server device 11 references the battery management database 114, and determines whether or not a service center that has been found stores battery packs that are of equivalent deterioration level as the battery pack of the battery ID, and further are leasable battery packs, based on the class of the battery pack of which the battery ID has been identified. In a case where determination is made that the service center is storing such a battery pack, the server device 11 references the battery management database 114 and identifies the number of battery packs that are of equivalent or lower deterioration level as the battery pack and are leasable battery packs, for each class. This is repeatedly performed until three service centers storing such battery packs are found, or this processing is performed on all service centers within the service center search area.

The server device 11 transmits the display information for the center reservation page (see FIG. 15B) and the display information for the center reservation map page (see FIG. 15C) to the information terminal 3. The display information for the center reservation page includes the name and location of the up to three service centers found as a result of the search, and the number of battery packs stored in the service centers. The number of battery packs here is the number of battery packs that are of equivalent deterioration level as the battery pack of the battery pack ID and are leasable battery packs. The service centers are displayed in closest order from home in the display information of the center reservation page, and information is included such that the service center closest to home is displayed as a recommended location.

The display information of the center reservation map page includes the location on the map of the up to three service centers found as a result of the search, and the number of battery packs stored in the service centers, classified by class. The number of battery packs here is the number of number of battery packs that are of equivalent or lower deterioration level as the battery pack of the battery ID and are leasable battery packs. The service centers are displayed in closest order from home in the display information of the center reservation map page, and information is included such that the service center closest to home is displayed as a recommended location.

The battery replacement reservation unit 322 receives a center search response transmitted from the server device 11 (step S217), and advances to the processing in step S218. In a case where determination is made in step S209 that the set area is not "near to home" (No in S209), i.e., the set area is "near to route to destination", the battery replacement reservation unit 322 displays the destination input page (see FIG. 18A) on the display unit 303. The battery replacement reservation unit 322 then accepts user operations on the destination input page based on input signals from the operating unit 302 (step S213). The user inputs the destination using the destination input region C71 in the destination input page, and subsequently touches the "next" button C72.

The battery replacement reservation unit 322 determines whether or not the user has touched the "next" button C72 (step S214). In a case where determination is made that the user has not touched the "next" button C72 (No in S214), the battery replacement reservation unit 322 returns to the processing of S214. On the other hand, in a case where determination is made that the user has touched the "next" button C72 (Yes in S214), the GPS unit 307 acquires location information indicating the current location, based on the radio waves received by the antenna 307a (step S215). The battery replacement reservation unit 322 then makes a search request to the server device 11 (step S216).

This center search request includes the battery ID of the battery pack, location information indicating the current location that has been acquired by the GPS unit 307, destination information of the destination input by the user, and area information stored in the storage unit 301. This area information indicates that an area within a set distance (X kilometers) from the route to the destination is to be the search area for service centers. Note that X is the distance set in the area setting processing (the default distance or the distance which the user has instructed using the distance setting window A21).

The server device 11 which has received the center search request performs the following processing. Based on the battery ID, the server device 11 references the battery management database 114 to identify the class of the battery pack of this battery ID. The server device 11 then references the center management database 111 and searches for service centers within the service center search area, in the order of closest to the route to the destination. The server device 11 references the battery management database 114, and determines whether or not a service center that has been found stores battery packs that are of equivalent or lower deterioration level as the battery pack of the battery ID, and further are leasable battery packs, based on the class of the battery pack of which the battery ID has been identified. In a case where determination is made that the service center is storing such a battery pack, the server device 11 references the battery management database 114 and identifies the number of battery packs that are of equivalent or lower deterioration level as the battery pack and are leasable battery packs, for each class. This is repeatedly performed until three service centers storing such battery packs are found, or this processing is performed on all service centers within the service center search area.

The server device 11 transmits a center search response including the display information for the center reservation page (see FIG. 18B) and the display information for the center reservation map page (see FIG. 18C) to the information terminal 3. The display information for the center reservation page includes the name and location of the up to three service centers found as a result of the search, and the number of battery packs stored in the service centers. The number of battery packs here is the number of battery packs that are of equivalent deterioration level as the battery pack of the battery pack ID and are leasable battery packs. The service centers are displayed in closest order from the route to the destination in the display information of the center reservation page, and information is included such that the service center closest to the route to the destination is displayed as a recommended location.

The display information of the center reservation map page includes the name and location of the up to three service centers found as a result of the search, and the number of battery packs stored in the service centers, classified by class. The number of battery packs here is the number of number of battery packs that are of equivalent or lower deterioration level as the battery pack of the battery pack ID and are leasable battery packs. The display information of the center reservation map page includes information such that the service center closest to the route to the destination is displayed as a recommended location.

The battery replacement reservation unit 322 receives the center search response transmitted from the server device 11 (step S217), and advances to the processing in step S218. The battery replacement reservation unit 322 displays the center reservation page on the display unit 303 and then accepts user operations on the center reservation page based on input signals from the operating unit 302 (step S218). The user touches one of the "reserve" buttons C11 through C13, the "view map" button C14, or the "close" button C15 in the center reservation page.

The battery replacement reservation unit 322 determines whether or not the user has touched the "close" button C15 (step S219). In a case where determination is made that the user has touched the "close" button C15 (Yes in S219), the battery replacement reservation unit 322 returns to the flow in FIG. 20 or in FIG. 24. On the other hand, in a case where determination is made that the user has not touched the "close" button C15 (No in S219), the battery replacement reservation unit 322 determines whether or not the user has touched the "view map" button C14 (step S220).

In a case where determination is made that the user has not touched the "view map" button C14 (No in S220), the battery replacement reservation unit 322 determines whether or not the user has touched the "reserve" button C11 for service center (1) (step S221). In a case where determination is made that the user has touched the "reserve" button C11 (Yes in S221), the battery replacement reservation unit 322 advances to the processing of step S229.

In a case where determination is made that the user has not touched the "reserve" button C11 (No in S221), the battery replacement reservation unit 322 determines whether or not the user has touched the "reserve" button C12 for service center (2) (step S222). In a case where determination is made that the user has touched the "reserve" button C12 (Yes in S222), the battery replacement reservation unit 322 advances to the processing of step S229.

In a case where determination is made that the user has not touched the "reserve" button C12 (No in S222), the battery replacement reservation unit 322 determines whether or not the user has touched the "reserve" button C13 for service center (3) (step S223). In a case where determination is made that the user has touched the "reserve" button C13 (Yes in S223), the battery replacement reservation unit 322 advances to the processing of step S229. On the other hand, in a case where determination is made that the user has not touched the "reserve" button C13 (No in S223), the battery replacement reservation unit 322 returns to the processing of S219.

In a case where determination is made in step S220 that the "view map" button C14 has been touched (Yes in S220), the battery replacement reservation unit 322 displays the center reservation map page on the display unit 303. The battery replacement reservation unit 322 then accepts user operations on the center reservation map page based on input signals from the operating unit 302 (step S224). The user touches one of the service centers (1) through (3) on the region C21 in the center reservation map page, or touches the "return to center reservation page" button C22.

The battery replacement reservation unit 322 determines whether or not the "return to center reservation page" button C22 has been touched (step S225). In a case where determination is made that the "return to center reservation page" button C22 has been touched (Yes in S225), the battery replacement reservation unit 322 returns to the processing of step S218. In the other hand, in a case where determination is made that the "return to center reservation page" button C22 has not been touched (No in S225), the battery replacement reservation unit 322 determines whether or not the user has touched the service center (1) on the region C21 (step S226). In a case where determination is made that the user has touched the service center (1) on the region C21 (Yes in S226), the battery replacement reservation unit 322 advances to the processing of step S229.

In a case where determination is made that the user has not touched the service center (1) on the region C21 (No in S226), the battery replacement reservation unit 322 determines whether or not the user has touched the service center (2) on the region C21 (step S227). In a case where determination is made that the user has touched the service center (2) on the region C21 (Yes in S227), the battery replacement reservation unit 322 advances to the processing of step S229.

In a case where determination is made that the user has not touched the service center (2) on the region C21 (No in S227), the battery replacement reservation unit 322 determines whether or not the user has touched the service center (3) on the region C21 (step S228). In a case where determination is made that the user has touched the service center (3) on the region C21 (Yes in S228), the battery replacement reservation unit 322 advances to the processing of step S229. On the other hand, in a case where determination is made that the user has not touched the service center (3) on the region C21 (No in S228), the battery replacement reservation unit 322 returns to the processing of step S225.

The battery replacement reservation unit 322 transmits a reservation request for reserving a battery pack replacement to the server device 11. The reservation request includes the service center selected by the user and class information indicating the class of the battery pack that the user has (step S229). This reservation request reaches the PC 21 of the service center selected by the user, via the server device 11. The PC 21 accepts the reservation for replacement of the battery pack based on the class information indicating the class of the battery pack that the user has, and transmits a reservation response making notification to the effect that the reservation has been completed, to the information terminal 3 via the server device 11.

The battery replacement reservation unit 322 receives the reservation response from the server device 11 (step S230). The battery replacement reservation unit 322 then displays a reservation completed page (see FIGS. 15D, 16D, 17D, and 18D). The battery replacement reservation unit 322 accepts user operations on the reservation completed page based on input signals from the operating unit 302 (step S231). After having confirmed in region C31 in the reservation completed page that the reservation has been completed, the user touches the "close" button C32.

The battery replacement reservation unit 322 determines whether or not the user has touched the "close" button C32 (step S232) In a case where determination is made that the user has not touched the "close" button C32 (No in S232), the battery replacement reservation unit 322 returns to the processing of S232. On the other hand, in a case where determination is made that the user has touched the "close" button C32 (Yes in S232), the battery replacement reservation unit 322 returns to the flow in FIG. 20 or in FIG. 24.

Example of Operation Sequence of Battery Pack Rental Reservation System

Figure 27:
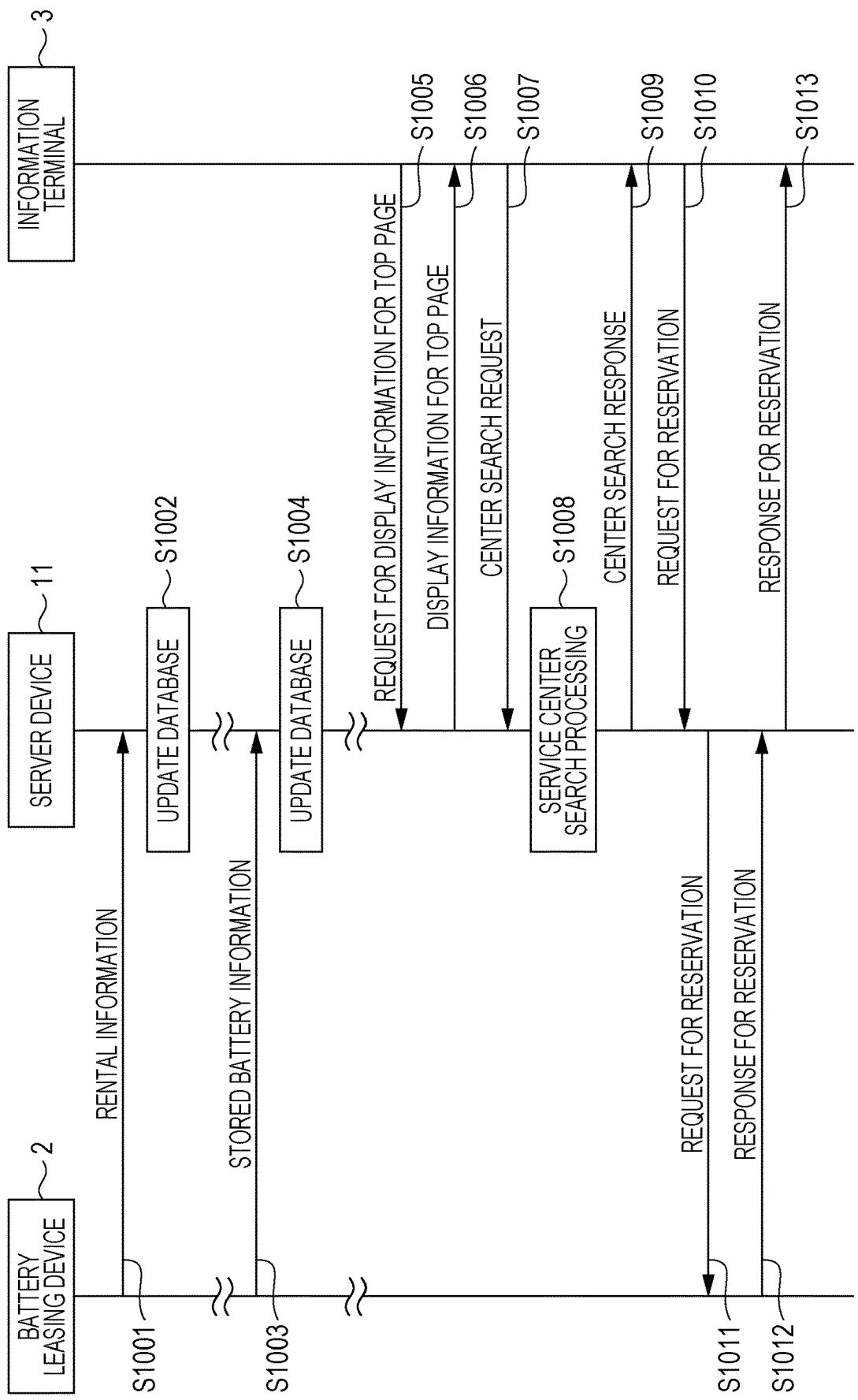
FIG. 27 is a sequence diagram illustrating an example of an operation sequence of the battery pack rental reservation system in FIG. 2.

FIG. 27 is a sequence diagram illustrating an example of an operation sequence of the battery pack rental reservation system in FIG. 2. In a case where the user returns a battery pack at a service center and newly rents another battery pack, the PC 21 within the battery leasing device 2 in the service center transmits rental information to the server device 11. The server device 11 receives this rental information (step S1001). This rental information includes the center ID of the service center, the member No., the date on which the battery pack was newly leased, whether or not there have been any late returns, the battery ID and remaining charge of the battery pack that was returned, the battery ID and remaining charge of the battery pack that was leased, and rental period.

The server device 11 updates the rental management database 113 and the battery management database 114 based on the rental information (step S1003). When updating the rental management database 113, information other than the class of the battery being dropped off and the battery being leased is updated based on the rental information. Information of the class of the battery being dropped off and the battery being leased is updated upon having determined the class by referencing the battery management database 114 based on the battery IDs of each of the battery pack being dropped off and the battery pack being leased.

In the updating of the battery management database 114, the storage service center and the remaining charge corresponding to the battery ID of the returned battery pack is overwritten with the center ID and the remaining charge of the returned battery pack included in the rental information. The storage service center and the remaining charge corresponding to the battery ID of the battery pack leased out are respectively replaced with "currently leased" and left blank (indicated by a hyphen).

The battery storage unit 24 within the battery leasing device 2 of the service center periodically (e.g., every midnight) transmits battery information of battery packs stored therein to the server device 11. The server device 11 receives this battery information (step S1004). The battery information includes the center ID, and also includes the battery ID, remaining charge and learning capacity detected by the detecting unit 245, and the charged dates stored in the battery pack, for every battery pack stored therein. The server device 11 updates the battery management database 114 based on the received battery information (step S1004).

The information terminal 3 requests the server device 11 for the display information of the top page of the battery reservation app, and the server device 11 receives this request (step S1005). The server device 11 transmits the display information of the top page of the battery reservation app to the information terminal 3 as a response to the request. The information terminal 3 receives this display information of the top page of the battery reservation app (step S1006).

The information terminal 3 displays the top page of the battery reservation app based on the received display information (see FIG. 11). Upon the user touching the "reservation for fully-charged battery pack replacement" button A2 in the top page of the battery reservation app, the information terminal 3 transmits a center search request to the server device 11. The server device 11 receives the center search request (Step S1007).

The server device 11 performs a search for service centers based on the center search request (step S1008). The server device 11 then transmits a center search response including the search results to the information terminal 3. The information terminal 3 receives the center search response (step S1009).

The information terminal 3 displays the center reservation page (see FIGS. 15B, 16B, 17B, and 18B) or center reservation map page (see FIGS. 15C, 16C, 17C, and 18C), based on the center search response. Upon the user instructing the service center to replace the battery pack in the center reservation page or center reservation map page, the information terminal 3 transmits a reservation request to the server device 11, and the server device 11 transmits this reservation request to the battery leasing device 2 (step S1010). The server device 11 transmits the reservation request to the PC 21 within the battery leasing device 2 of the service center. The PC 21 within the battery leasing device 2 receives this reservation request (step S1011).

The PC 21 of the battery leasing device 2 accepts replacing of the battery pack based on this reservation request, transmits a reservation response including information to the effect that the reservation has been completed, and the server device 11 receives this reservation response (step S1012). The server device 11 transmits the reservation response to the information terminal 3, and the information terminal 3 receives the reservation response (step S1013). The reservation completed page is then displayed at the information terminal 3 that has received this reservation response.

Supplemental Description (Part 1)

The present disclosure is not restricted to the description of the above embodiment, and no form or embodiment is to be excluded from realization of the benefits and advantages thereof. For example, the following arrangements may be made.

(1) The following arrangements may be made regarding the number of battery packs to be displayed on the display unit 303 of the information terminal 3 in correlation with information regarding to service centers (battery leasing devices 2) found as a result of the server device 11 searching a search area for service centers (battery leasing devices 2), including the arrangement described in the embodiment.

The number of leasable battery packs that the service centers (battery leasing devices 2) store may be a number that does not take into consideration the deterioration level of the battery packs stored by the service centers. The number of leasable battery packs that the service centers (battery leasing devices 2) store may also be a number classified by each deterioration level, without taking into consideration the deterioration level of the battery packs stored by the service centers. The number of leasable battery packs that the service centers (battery leasing devices 2) store may further be a number of leasable battery packs of which the deterioration level is equivalent to that of the battery pack which the user has. The number of leasable battery packs that the service centers (battery leasing devices 2) store may further yet be a number of leasable battery packs of which the deterioration level is equivalent to or lower than that of the battery pack which the user has. The number of leasable battery packs that the service centers (battery leasing devices 2) store may further be a number of leasable battery packs of which the deterioration level is equivalent to or lower than that of the battery pack which the user has, classified by each deterioration level.

While an arrangement is exemplified in the above embodiment and the above description (1) where the number of leasable battery packs and the number of leasable battery packs classified by deterioration level serve as information relating to battery packs existing in the battery leasing device 2 according to the present disclosure, this is not restrictive. For example, information relating to the remaining charge of the battery packs may be used as information relating to the battery packs existing in the battery leasing device 2 according to the present disclosure.

While an arrangement has been described in the above embodiment regarding presenting the user with information relating to service centers (battery leasing devices 2) storing battery packs of which the deterioration level is equivalent to or lower than that of the battery pack which the user has and which are leasable battery packs, where information is provided to the user regarding service centers (battery leasing devices 2) storing battery packs of which the deterioration level is equivalent to that of the battery pack which the user has and which are leasable, this is not restrictive. For example, in a case of presenting the user with information relating to service centers (battery leasing devices 2) storing battery packs of which the deterioration level is equivalent to or lower than that of the battery pack which the user has and which are leasable battery packs, the user may be presented with information including service centers (battery leasing devices 2) not storing battery packs of which the deterioration level is equivalent to that of the battery pack which the user has and which are leasable.

(2) While an arrangement is described in the above embodiment regarding a search area for service centers (battery leasing devices 2) near a route often traveled that the user has instructed, this is not restrictive. For example, an area including a route which the user has instructed, regardless of whether often traveled or not, may serve as the search area for service centers (battery leasing devices 2).

(3) While an arrangement has been described in the above embodiment where the current location when the set area is "nearby", the location of the home when the set area is "near to home", and the current location when the set area is "near to route to destination", correspond to a certain location in the present disclosure, this is not restrictive. The certain location in the present disclosure may be a location which the user has optionally instructed. In this case, the area set by the user may be an area within a range which the user has set, including current location or a certain location other than the home (e.g., a destination) which the user has instructed. Another exemplification is an area including a route from a certain location other than the home (e.g., a planed departure point) that the user has instructed, to a destination.

(4) While an arrangement has been described in the above embodiment and (3) above where detailed settings of the search area for service centers (battery leasing devices 2) is performed based on a distance instructed by the user, this is not restrictive. For example, this may be performed based on time instructed by the user. In this case, an area reachable within an instructed time from a certain location serves as the search area for service centers (battery leasing devices 2).

(5) While an arrangement has been described in the above embodiment where information (address, name, etc.) of the service centers (battery leasing devices 2) and information relating to battery packs (number of leasable battery packs) are both displayed, this is not restrictive. For example, the following arrangement may be made. Information relating to the service centers (battery leasing devices 2) may be displayed on the display unit 303 of the information terminal 3, and in a case where a user selects a service center (battery leasing device 2) from these, information relating to the battery packs which that service center (battery leasing device 2) stores may be displayed.

(6) While an arrangement has been described in the above embodiment where information relating to service centers (battery leasing devices 2) that have leasable battery packs is displayed on the display unit 303 of the information terminal 3, and information relating to service centers (battery leasing devices 2) that do not have leasable battery packs is not displayed on the display unit 303 of the information terminal 3, this is not restrictive. For example, the following arrangement may be made. The battery leasing devices 2 within the search area for battery leasing devices 2 may be displayed on the display unit 303 of the information terminal 3 such that the battery leasing devices 2 where there are leasable battery packs and the battery leasing devices 2 where there are not leasable battery packs are displayed in a distinguishable manner. Further, when displaying information relating to service centers (battery leasing devices 2) on the display unit 303 of the information terminal 3, service centers (battery leasing devices 2) of a certain order or less in closest order from the certain location, and other service centers (battery leasing devices 2), may be displayed in a distinguishable manner.

An example of a method of displaying in a distinguishable manner includes different display forms of the information indicating the battery leasing devices 2. Examples of information indicating the battery leasing devices 2 include symbols, text, icons, etc. Examples of methods where the display forms are distinguished include different color of the information indicating the battery leasing devices 2, different display sizes, different types of lines used for display (solid lines and dotted lines), and so forth.

(7) While an arrangement has been described in the above embodiment where a pedelec to which a battery pack is replaceably attached exemplifies an electric device, the electric device is not restricted to this arrangement. The electric device may be a mode of transportation to which a battery pack is replaceably attached other than a pedelec, such as an electric vehicle or the like, or may be an electric device other than a mode of transportation to which a battery pack is replaceably attached.

(8) While an arrangement has been described in the above embodiment where the reservation request and reservation response pass through the server device 11, this is not restrictive. The information terminal 3 may make a reservation request directly to the information terminal (PC 21) within the battery leasing device 2 of the service center via network, and the information terminal (PC 21) may directly transmit a reservation response to the information terminal 3.

(9) While an arrangement has been described in the above embodiment where the class (deterioration level) of the battery pack that the user has is identified by the server device 11 to search for a service center (battery leasing device 2), this is not restrictive. For example, the class (deterioration level) of the battery pack that the user has may be specified, or a class (deterioration level) of a battery pack that the user desires may be specified, and this be used for the server device 11 to search for a service center (battery leasing device 2).

(10) While an arrangement has been described in the above embodiment where there are four candidates for an area to be set, namely, "nearby", "near to route often traveled", "near to home", and "near to route to destination", this is not restrictive. An arrangement may be made where only part of these candidates are used, or other candidates may be added as well. An arrangement has been exemplified in the above embodiment where and area is set that includes a route which the user has set in "near to route often traveled", but this is not restrictive. For example, an area including a part of a rout set by the user may be an area set by the user. Thus, an area including a midway points on the route which the user has set, and an area including the destination of the route which the user has set, are exemplified as areas. That is to say, the area set by the user may be an area including at least part of a route which the user has set.

While an arrangement has been exemplified in the above embodiment where and are a is set that includes a route which the user has set in "near to route to destination", this is not restrictive. For example, an area including a part of a route from a certain location to a destination set by the user may be an area set by the user. Thus, an area including a midway points on the route from a certain location to a destination set by the user, and an area including the destination of the route from a certain location to a destination set by the user, are exemplified as areas. That is to say, the area set by the user may be an area including at least part of a route from a certain location to a destination set by the user.

While an arrangement has been described in the above embodiment where there are two candidates for notification standards, namely, "when remaining charge is low" and "periodically" button, this is not restrictive. An arrangement may be made where only part of these candidates are used, or other candidates may be added as well.

(11) At least part of the components in the devices according to the above-described embodiment may be realized as a large-scale integration (LSI) which is an integrated circuit. These may be individually formed into single chips, or part or all may be formed into a single chip. Although an LSI has been mentioned, there are different names according to the degree of integration, such as IC, LSI, super LSI, and ultra LSI. The way in which the integrated circuit is formed is not restricted to LSIs, and may be realized by dedicated circuits or general-purpose processors. A field programmable gate array (FPGA) capable of being programmed after manufacturing the LSI, or a reconfigurable processor of which the connections and settings of circuit cells within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course.

(12) At least part of the procedures of the operations of the devices illustrated in the embodiment may be described in a program, and the program stored in memory be read out and executed by a CPU, for example. the program also may be saved in a recording medium and distributed or the like.

(13) The content of the embodiment and the modifications described in the Supplemental Description (Part 1) may be combined as appropriate.

Supplemental Description (Part 2)

A transmission method, a transmitter, a receiving method, and a receiving, relating to the embodiment and the Supplemental Description (Part 1), and the advantages thereof, are compiled below.

(1) A control program according to Embodiment 1 is a control program of an information terminal, the program causing the information terminal to perform: (a) processing of acquiring, from a server device via a network, information relating to a device which leases battery packs and exists in an area set by a user; and (b) processing of displaying the acquired information relating to the device on a display screen provided with the information terminal.

A control method according to Embodiment 1 is a control method of an information terminal, the method including: (a) acquiring, from a server device via a network, information relating to a device which leases battery packs and exists in an area set by a user; and (b) displaying the acquired information relating to the device on a display screen provided with the information terminal.

According to these, a battery leasing device within an area set by the user is displayed, so display of battery leasing devices can be performed in a manner that is consistent with what users desire.

(2) With regard to a control program according to Embodiment 2, in the control program according to Embodiment 1, in the step (b), a map including the area is displayed on the display screen, and information relating to the device is displayed on the map.

With regard to a control method according to Embodiment 2, in the control method according to Embodiment 1, in the step (b), a map including the area is displayed on the display screen, and information relating to the device is displayed on the map.

According to these, the user can easily comprehend the location of the battery leasing device.

(3) With regard to a control program according to Embodiment 3, in the control program according to either of Embodiments 1 and 2, the area is an area including at least part of a route from a certain location to a destination that the user has set.

With regard to a control method according to Embodiment 3, in the control method according to either of Embodiments 1 and 2, the area is an area including at least part of a route from a certain location to a destination that the user has set.

(4) With regard to a control program according to Embodiment 4, in the control program according to either of Embodiments 1 and 2, the area is an area within a range that the user has set from a certain location.

With regard to a control method according to Embodiment 4, in the control method according to either of Embodiments 1 and 2, the area is an area within a range that the user has set from a certain location.

(5) With regard to a control program according to Embodiment 5, in the control program according to either of Embodiments 1 and 2, the area is an area reachable within from a certain location within a time that the user has set.

With regard to a control method according to Embodiment 5, in the control method according to either of Embodiments 1 and 2, the area is an area reachable within from a certain location within a time that the user has set.

(6) With regard to a control program according to Embodiment 6, in the control program according to either of Embodiments 1 and 2, the area is an area including at least part of a route that the user has set.

With regard to a control method according to Embodiment 6, in the control method according to either of Embodiments 1 and 2, the area is an area including at least part of a route that the user has set.

According to the above (3) through (6), specific examples of an area set by the user can be presented.

(7) With regard to a control program according to Embodiment 7, in the control program according to any one of Embodiments 1 through 6, in the step (b), the information relating to the device where a leasable battery pack exists, of the acquired information relating to the device, is displayed on the display screen, and information relating to the device where a leasable battery pack does not exist is not displayed on the display screen.

With regard to a control method according to Embodiment 7, in the control method according to any one of Embodiments 1 through 6, in the step (b), information relating to the device where a leasable battery pack exists, of the acquired information relating to the device, is displayed on the display screen, and information relating to the device where a leasable battery pack does not exist is not displayed on the display screen.

According to these, information relating to battery leasing devices where leasable battery packs do not exist is not displayed, so information relating to battery leasing devices where leasable battery packs exist can be comprehended more readily. The information relating to the device where a leasable battery pack does not exist may be included in the acquired information relating to the device or may not be included in the acquired information relating to the device.

(8) With regard to a control program according to Embodiment 8, in the control program according to any one of Embodiments 1 through 6, in the step (b), information relating to the device where a leasable battery pack exists, and information relating to the device where a leasable battery pack does not exist, of the acquired information relating to the device, are displayed on the display screen in a distinguishable manner.

With regard to a control method according to Embodiment 8, in the control method according to any one of Embodiments 1 through 6, in the step (b), information relating to the device where a leasable battery pack exists, and information relating to the device where a leasable battery pack does not exist, of the acquired information relating to the device, are displayed on the display screen in a distinguishable manner.

According to these, information relating to battery leasing devices where a leasable battery pack exists, and information relating to battery leasing devices where a leasable battery pack does not exist, are displayed in a distinguishable manner. Accordingly, information relating to battery leasing devices where leasable battery packs exist can be comprehended more readily.

(9) With regard to a control program according to Embodiment 9, in the control program according to any one of Embodiments 1 through 8, in the step (a), information relating to the battery pack existing at the device is also acquired from a server device via a network, and in the step (b), the acquired information relating to the device, and the acquired information relating to the battery pack, are displayed on the display screen together.

With regard to a control method according to Embodiment 9, in the control method according to any one of Embodiments 1 through 8, in the step (a), information relating to the battery pack existing at the device is also acquired from a server device via a network, and in the step (b), the acquired information relating to the device, and the acquired information relating to the battery pack, are displayed on the display screen together.

According to these, the user can obtain information relating to battery leasing devices and information relating to battery packs existing there together, so it is easier for the user to search for a desired battery leasing device.

(10) With regard to a control program according to Embodiment 10, in the control program according to any one of Embodiments 1 through 8, in the step (b), when a user selects the device, information relating to the battery pack existing at the selected device is acquired from the server device, and the acquired information relating to the battery pack existing at the selected device is displayed on the display screen.

With regard to a control method according to Embodiment 10, in the control method according to any one of Embodiments 1 through 8, in the step (b), when a user selects the device, information relating to the battery pack existing at the selected device is acquired from the server device, and the acquired information relating to the battery pack existing at the selected device is displayed on the display screen.

According to these, the user can obtain information relating to the battery leasing device, and additionally obtain information relating to battery packs that exist there, so it is easier for the user to search for a desired battery leasing device.

(11) With regard to a control program according to Embodiment 11, in control program according to either of Embodiment 9 and 10, in the step (b), the number of leasable battery packs, of the acquired information relating to the battery pack, is displayed on the display screen.

With regard to a control method according to Embodiment 11, in the control method according to either of Embodiment 9 and 10, in the step (b), the number of leasable battery packs, of the acquired information relating to the battery pack, is displayed on the display screen.

According to these, the user can search for a battery leasing device while looking at the number of leasable battery packs existing at the battery leasing devices, so it is easier for the user to search for a desired battery leasing device.

(12) With regard to a control program according to Embodiment 12, in the control program according to Embodiment 11, the number of leasable battery packs is classified according to each deterioration level of the leasable battery packs.

With regard to a control method according to Embodiment 12, in the control method according to Embodiment 11, the number of leasable battery packs is classified according to each deterioration level of the leasable battery packs.

According to these, the user can search for a battery leasing device while looking at the number of leasable battery packs existing at the battery leasing devices, classified according to each deterioration level, so it is easier for the user to search for a desired battery leasing device.

(13) With regard to a control program according to Embodiment 13, in the control program according to Embodiment 11, the number of leasable battery packs is a number of leasable battery packs that are of an equivalent deterioration level as a predetermined deterioration level.

With regard to a control method according to Embodiment 13, in the control method according to Embodiment 11, the number of leasable battery packs is a number of leasable battery packs that are of an equivalent deterioration level as a predetermined deterioration level.

According to these, the user can search for a battery leasing device while looking at how many leasable battery packs there are existing at the battery leasing devices that are of an equivalent deterioration level as the deterioration level of the battery pack that the user has, for example. Accordingly, it is easier for the user to search for a desired battery leasing device.

(14) With regard to a control program according to Embodiment 14, in the control program according to Embodiment 11, the number of leasable battery packs is a number of leasable battery packs that are of an equivalent deterioration level as a predetermined deterioration level or lower.

With regard to a control method according to Embodiment 14, in the control method according to Embodiment 11, the number of leasable battery packs is a number of leasable battery packs that are of an equivalent deterioration level as a predetermined deterioration level or lower.

According to these, the user can search for a battery leasing device while looking at how many leasable battery packs there are existing at the battery leasing devices that are of an equivalent deterioration level as or lower than the deterioration level of the battery pack that the user has, for example. Accordingly, it is easier for the user to search for a desired battery leasing device.

(15) With regard to a control program according to Embodiment 15, in the control program according to Embodiment 11, the number of leasable battery packs that are of an equivalent deterioration level as a predetermined deterioration level or lower is classified by each deterioration level.

With regard to a control method according to Embodiment 15, in the control method according to Embodiment 11, the number of leasable battery packs that are of an equivalent deterioration level as a predetermined deterioration level or lower is classified by each deterioration level.

According to these, the user can search for a battery leasing device while looking at how many leasable battery packs there are existing at the battery leasing devices that are of an equivalent deterioration level as or lower than the deterioration level of the battery pack that the user has, for example, for each deterioration level. Accordingly, it is easier for the user to search for a desired battery leasing device.

(16) With regard to a control program according to Embodiment 16, in the control program according to either of Embodiments 1 and 2, in the step (b), information relating to the device at which there exist leasable battery packs that are of an equivalent deterioration level as a predetermined deterioration level, of the acquired information relating to the battery pack, is displayed on the display screen.

With regard to a control method according to Embodiment 16, in the control method according to either of Embodiments 1 and 2, in the step (b), information relating to the device at which there exist leasable battery packs that are of an equivalent deterioration level as a predetermined deterioration level, of the acquired information relating to the battery pack, is displayed on the display screen.

According to these, the user can search for a battery leasing device while looking at information relating to a battery leasing device at which there exist leasable battery packs that are of an equivalent deterioration level as the deterioration level of the battery pack that the user has, for example. Accordingly, it is easier for the user to search for a desired battery leasing device.

(17) With regard to a control program according to Embodiment 17, in the control program according to either of Embodiments 1 and 2, in the step (b), information relating to the device at which there exist leasable battery packs that are of an equivalent deterioration level as a predetermined deterioration level or lower, of the acquired information relating to the battery pack, is displayed on the display screen.

With regard to a control method according to Embodiment 17, in the control method according to either of Embodiments 1 and 2, in the step (b), information relating to the device at which there exist leasable battery packs that are of an equivalent deterioration level as a predetermined deterioration level or lower, of the acquired information relating to the battery pack, is displayed on the display screen.

According to these, the user can search for a battery leasing device while looking at information relating to a battery leasing device at which there exist leasable battery packs that are of an equivalent deterioration level as or lower than the deterioration level of the battery pack that the user has, for example. Accordingly, it is easier for the user to search for a desired battery leasing device.

(18) With regard to a control program according to Embodiment 18, in the control program according to either of Embodiments 1 and 2, in the step (b), information relating to the devices of a certain order or less in closest order from the certain location, of the acquired information relating to the device, is displayed on the display screen.

With regard to a control method according to Embodiment 18, in the control method according to either of Embodiments 1 and 2, in the step (b), information relating to the devices of a certain order or less in closest order from the certain location, of the acquired information relating to the device, is displayed on the display screen.

According to these, the user can more easily search for a battery leasing device at a location where it is convenient to go.

(19) With regard to a control program according to Embodiment 19, in the control program according to Embodiment 18, in the step (b), information relating to the devices of a certain order or less, and the devices other than the devices of a certain order or less, are displayed on the display screen in a distinguishable manner.

With regard to a control method according to Embodiment 19, in the control method according to Embodiment 18, in the step (b), information relating to the devices of a certain order or less, and the devices other than the devices of a certain order or less, are displayed on the display screen in a distinguishable manner.

According to these, the user can more easily search for a battery leasing device at a location where it is convenient to go.

(20) With regard to a control program according to Embodiment 20, the control program according to either of Embodiments 1 and 2 further includes: (c) processing of acquiring information relating to a remaining charge in a battery pack mounted on an electric device that the user uses; and (d) processing of displaying the acquired information relating to the remaining charge in the battery pack on the display screen, wherein the step (c) and the step (d) are performed before the step (a).

With regard to a control method according to Embodiment 20, the control method according to either of Embodiments 1 and 2 further includes: (c) acquiring of information relating to a remaining charge in a battery pack mounted on an electric device that the user uses; and (d) displaying the acquired information relating to the remaining charge in the battery pack on the display screen, wherein the step (c) and the step (d) are performed before the step (a).

According to these, whether or not replacing a battery pack is necessary can be comprehended, so the user can avoid unnecessary work replacing the battery.

(21) With regard to a control program according to Embodiment 21, in the control program according to Embodiment 20, the (c) processing of acquiring is periodically executed each period that the user has set.

With regard to a control method according to Embodiment 21, in the control method according to Embodiment 20, the step (c) is periodically executed each period that the user has set.

According to these, the remaining charge of the battery pack is periodically notified, so a situation where the user forgets to replace the battery pack can be avoided.

(22) With regard to a control program according to Embodiment 22, the control program according to either of Embodiments 1 and 2 further includes: (e) processing of acquiring information relating to a remaining charge in a battery pack mounted on an electric device that the user uses; and (f) processing of displaying information indicating a low remaining charge, based on the acquired information relating to the remaining charge in the battery pack, on the display screen, wherein the step (e) and the step (f) are performed before the step (a).

With regard to a control method according to Embodiment 22, the control method according to either of Embodiments 1 and 2 further includes: (e) acquiring of information relating to a remaining charge in a battery pack mounted on an electric device that the user uses; and (f) displaying information indicating a low remaining charge, based on the acquired information relating to the remaining charge in the battery pack, on the display screen, wherein the step (e) and the step (f) are performed before the step (a).

According to these, the remaining charge of the battery pack can be comprehended, so a situation where the user forgets to replace the battery pack can be avoided.

(23) With regard to a control program according to Embodiment 23, in the control program according to Embodiment 22, the step (f) is executed in a case where the remaining charge in the battery pack is equal to or lower than a remaining charge that the user has set.

With regard to a control method according to Embodiment 23, in the control method according to Embodiment 22, the step (f) is executed in a case where the remaining charge in the battery pack is equal to or lower than a remaining charge that the user has set.

According to these, the user can receive notification at a desired remaining charge.

(24) With regard to a control program according to Embodiment 24, the control program according to any one of Embodiments 1 through 23 further includes: (g) processing of outputting, based on input performed to the effect that a battery pack existing at a predetermined one of the devices is to be reserved, an instruction of the reservation, to the network, wherein the step (g) is performed after the step (b).

With regard to a control method according to Embodiment 24, the control method according to any one of Embodiments 1 through 23 further includes: (g) outputting, based on input performed to the effect that a battery pack existing at a predetermined one of the devices is to be reserved, an instruction of the reservation, to the network, wherein the step (g) is performed after the step (b).

According to these, the user can also reserve a battery pack, thereby reducing the work load on the user for replacing the battery pack.

(25) With regard to a control program according to Embodiment 25, in the control program according to any one of Embodiments 9, 11 through 15, in the step (b), when a user selects the device, information relating to the battery pack existing at the selected device, of the acquired information relating to the battery pack, is displayed on the display screen.

With regard to a control method according to Embodiment 25, in the control method according to any one of Embodiments 9, 11 through 15, in the step (b), when a user selects the device, information relating to the battery pack existing at the selected device, of the acquired information relating to the battery pack, is displayed on the display screen.

According to these, the user can obtain information relating to the battery leasing device, and additionally obtain information relating to battery packs that exist there, so it is easier for the user to search for a desired battery leasing device.

The present disclosure is applicable to display on an information terminal of information relating to a device that leases battery packs.

What is claimed is:

1. A battery pack leasing system for managing battery pack leasing reservations, the battery pack leasing system comprising:
a battery leasing device configured to:
store and manage a plurality of battery packs;
electrically charge one or more of the stored plurality of battery packs;
acquire charge information relating to a remaining charge of each of the plurality of battery packs stored in the battery leasing device;
acquire deterioration level information indicating a deterioration level of each of the plurality of battery packs stored in the battery leasing device, the deterioration level being different from the remaining charge of a battery pack; and
determine battery class information for each of the plurality of battery packs based on the deterioration level information;
a server device configured to store information related to the battery leasing device,
wherein the battery pack leasing system allows a user to reserve a target battery pack stored at the battery leasing device, by an information terminal which is connected to the server device via a network,
wherein the information terminal specifies battery class information of a battery pack associated with the user,
wherein the battery leasing device transmits the battery class information including the deterioration level information indicating the deterioration level of each of the plurality of battery packs stored in the battery leasing device, to the server device,
wherein the server device receives, from each of a plurality of battery leasing devices, battery class information including the deterioration level information indicating deterioration levels of the plurality of battery packs,
wherein the server device stores battery management information including the battery class information that includes the deterioration levels of the plurality of battery packs,
wherein the battery pack leasing system is configured to perform:
identifying, among the plurality of battery packs, a candidate battery pack available for leasing to the information terminal when battery class information of the candidate battery pack matches with the battery class information of the battery pack associated with the user,
displaying, on a display screen of the information terminal and only for the candidate battery pack matching the battery class information of the battery pack associated with the user, a deterioration level of the candidate battery pack available for leasing,
transmitting candidate information that identifies the candidate battery pack available for leasing with corresponding deterioration level information to the information terminal of the user, the candidate information further including information which identifies a candidate battery leasing device that has the candidate battery pack, and
displaying, on the display device of the information terminal of the user, information of the candidate battery leasing device, and
receiving, via the network and from the information terminal, a reservation request for the target battery pack stored in the candidate battery leasing device, and the target battery pack being the candidate battery pack and having battery class information matching the battery class information of the battery pack associated with the user,
wherein the information terminal of the user transmits the reservation request, requesting reservation for the candidate battery pack, to the server device.

2. The battery pack leasing system according to claim 1, wherein the candidate battery leasing device is a battery leasing device which location is in an area set by the user,
wherein, in the displaying of the information of the candidate battery leasing device,
the candidate information includes information which indicates a location of the candidate battery leasing device, and
the location of the candidate battery leasing device is displayed on the display screen of the information terminal.

3. The battery pack leasing system according to claim 2, wherein the area is an area including at least part of a route from a certain location to a destination that the user has set.

4. The battery pack leasing system according to claim 2, wherein the area is an area within a range that the user has set from a certain location.

5. The battery pack leasing system according to claim 2, wherein the area is an area reachable within from a certain location within a time that the user has set.

6. The battery pack leasing system according to claim 2, wherein the area is an area including at least part of a route that the user has set.

7. The battery pack leasing system according to claim 1, wherein the battery pack leasing system is configured to perform
extracting a plurality of candidate battery packs, which are available battery packs for battery pack leasing stored across the plurality of battery leasing devices based on the the battery management information including the battery class information, wherein deterioration levels of the plurality of candidate battery packs correspond to the battery class information,
wherein, in the transmitting of the candidate information, the candidate information includes information which identifies a plurality of candidate battery leasing devices, each of the plurality of candidate battery leasing devices manages at least one of the plurality of candidate battery packs,
wherein, in the displaying of the information of the candidate battery leasing device, the battery pack leasing system is configured to perform:
displaying the plurality of candidate battery leasing devices to be selected, by the user, for reservation,
receiving an input, by the user, selecting a battery leasing device out of the plurality of candidate battery leasing devices,
wherein the reservation request is transmitted based on the selection of the battery leasing device.

8. The battery pack leasing system according to claim 1, wherein, in the transmitting of the candidate information, the candidate information includes candidate battery class information which indicates the deterioration level of the candidate battery pack, wherein, in the displaying of the information of the candidate battery leasing device, the battery pack leasing system is configured to perform:
displaying information indicating a deterioration level of the candidate battery pack on the display screen of the information terminal based on the candidate battery class information.

9. The battery pack leasing system according to claim 8, wherein the battery pack leasing system is configured to perform
updating the candidate battery class information of a battery pack based on at least one of date of manufacture, learning capacity and history of full charge of the battery pack.

10. A control method of an information terminal for reserving a battery pack leasing on a battery pack leasing system, the method comprising:
acquiring, from a server device of the battery pack leasing system via a network, battery pack inventory information and corresponding battery class information including deterioration level information of battery packs managed by a plurality of battery leasing devices, the deterioration level information indicating a deterioration level of each of the plurality of battery packs stored in the battery leasing device, the deterioration level being different from a remaining charge of a battery pack;
acquiring, from the information terminal, battery class information of a battery pack associated with the user;
identifying, among the battery packs managed by the plurality of battery leasing devices, a candidate battery pack available for leasing to the information terminal when battery class information of the candidate battery pack matches with the battery class information of the battery pack associated with the user,
displaying for selection, on a display screen provided on the information terminal, only a plurality of candidate battery leasing devices including the candidate battery pack having the battery class information that matches with the battery class information of the battery pack associated with the user, based on the acquired battery pack inventory information of the plurality of battery leasing devices and the battery class information of the battery pack associated with the user;
receiving an input, by a user, selecting a battery leasing device out of the plurality of candidate battery leasing devices displayed for selection; and
transmitting a reservation request for a target battery pack of a target deterioration level stored in the selected battery leasing device, to the server device, the target battery pack having a battery class information matching the battery class information of the battery pack associated with the user,
wherein the selected battery leasing device is configured to mechanically vends the reserved target battery pack.

11. The control method according to claim 10, the control method further comprising:
extracting the plurality of candidate battery leasing devices from the acquired plurality of battery leasing devices based on the battery class information of the battery pack associated with the user and the battery class information of the battery packs managed by the plurality of battery leasing devices,
wherein the battery class information of the battery pack associated with the user is related to a deterioration level of a battery pack to be leased for the user.

12. The control method according to claim 10, wherein, in the displaying of the plurality of candidate battery leasing devices,
further displaying information indicating a deterioration level of each of the candidate battery pack included in the candidate battery leasing devices.

13. The control method according to claim 11, wherein, in the displaying of the plurality of candidate battery leasing devices,
further displaying information indicating a recommended candidate battery leasing device, which is one of the plurality of candidate battery leasing devices, wherein a deterioration level indicated by battery class information of a candidate battery pack included in the recommended candidate battery leasing device is equal to a deterioration level indicated by the battery class information of the battery pack associated with the user.

14. The control method according to claim 11, wherein, in the displaying of the plurality of candidate battery leasing devices,
further displaying information indicating a recommended candidate battery leasing device, which is one of the plurality of candidate battery leasing devices, and
wherein, the recommended candidate battery leasing device is located within an area set by the user.

15. The control method according to claim 11, wherein, in the displaying of the plurality of candidate battery leasing devices,
further displaying information indicating a recommended candidate battery leasing device, which is one of the plurality of candidate battery leasing devices, and
wherein, the recommended candidate battery leasing device is closest, among the plurality of candidate battery leasing devices, to a home of the user.

16. The control method according to claim 11, wherein, in the receiving of the input, by the user, selecting the battery leasing device,
battery pack inventory information of the selected battery leasing device is displayed on the display screen.

17. The control method according to claim 11, wherein, in the displaying of the plurality of candidate battery leasing devices,
the plurality of candidate battery leasing devices is displayed on a map, and
battery leasing devices which are not included in the plurality of candidate battery leasing devices, are not displayed on the map.

18. The control method according to claim 11, wherein, in the displaying of the plurality of candidate battery leasing devices, the control method further comprising:
displaying a number of leasable battery packs managed by each one of the plurality of candidate battery leasing devices.

19. The control method according to claim 16, wherein the number of leasable battery packs is classified according to the battery class information of the leasable battery packs.

20. The control method according to claim 11, further comprising:
acquiring of charge information relating to a remaining charge in a battery pack mounted on an electric device that the user uses; and displaying the acquired charge information relating to the remaining charge in the battery pack on the display screen, wherein, in the transmitting of the reservation request, the reservation request is a request to swap the battery pack with the reserved battery pack.

21. The control method according to claim 11, wherein, in the displaying of the plurality of candidate battery leasing devices,
further displaying information indicating a recommended candidate battery leasing device, which is one of the plurality of candidate battery leasing devices,
wherein, the recommended candidate battery leasing device is closest, among the plurality of candidate battery leasing devices, to a certain location.

22. The battery pack leasing system according to claim 2, wherein the battery pack leasing system is configured to perform:
displaying, on the display screen of the information terminal, a map including the area, and
displaying the location of the candidate battery leasing device on the map.

23. The battery pack leasing system according to claim 1, wherein the battery class information of the battery pack associated with the user indicates a deterioration level of a battery pack currently equipped in the information terminal, and only a battery pack corresponding to the battery class information of the battery pack associated with the user is extracted as the candidate battery pack.

* * * * *